(12) United States Patent
Takada

(10) Patent No.: US 8,298,112 B2
(45) Date of Patent: Oct. 30, 2012

(54) DEVICE FOR SWITCHING BETWEEN NORMAL AND REVERSE DRIVE FORCE

(75) Inventor: Seiichi Takada, Kuwana (JP)

(73) Assignee: NTN Corporation, Osaka (JP)

( * ) Notice: Subject to any disclaimer, the term of this patent is extended or adjusted under 35 U.S.C. 154(b) by 685 days.

(21) Appl. No.: 12/310,492

(22) PCT Filed: Aug. 28, 2007

(86) PCT No.: PCT/JP2007/066638
§ 371 (c)(1),
(2), (4) Date: Oct. 15, 2009

(87) PCT Pub. No.: WO2008/026579
PCT Pub. Date: Mar. 6, 2008

(65) Prior Publication Data
US 2010/0120572 A1    May 13, 2010

(30) Foreign Application Priority Data

Aug. 28, 2006 (JP) ................................ 2006-230638
Mar. 30, 2007 (JP) ................................ 2007-093224
May 8, 2007 (JP) ................................ 2007-123512
Aug. 21, 2007 (JP) ................................ 2007-214779

(51) Int. Cl.
*F16H 3/44* (2006.01)
(52) U.S. Cl. ...................................... 475/324; 475/323
(58) Field of Classification Search ................. 475/323, 475/324; 192/45.004, 45.008, 47
See application file for complete search history.

(56) References Cited

U.S. PATENT DOCUMENTS 3,529,494 A * 9/1970 Matte ............................. 475/298
4,274,304 A * 6/1981 Curtiss ........................... 475/270
(Continued)

FOREIGN PATENT DOCUMENTS
JP          52-22878         2/1977
(Continued)

OTHER PUBLICATIONS

Informal Comments filed in the International (PCT) application of which the present application is the U.S. National Stage, in response to the Written Opinion of the International Searching Authority issued Dec. 11, 2007 in the PCT Application (with partial English translation).

(Continued)

*Primary Examiner* — David D Le
*Assistant Examiner* — Colby M Hansen
(74) *Attorney, Agent, or Firm* — Wenderoth, Lind & Ponack, LLP.

(57) ABSTRACT

A device transmits input member rotation in one direction to output member rotation in one or the opposite direction, and includes input and output gears and a switch mechanism. The switch mechanism includes planetary gear, control, and clutch mechanisms. The planetary gear mechanism includes a sun gear integral with a rotation shaft, an internal gear integral with the output gear, planetary gears between the sun gear and the internal gear, and a carrier. The control mechanism includes a control gear selectively locked and unlocked by an actuator. With the actuator off, the roller clutch is locked, the planetary gears only revolve, and the input and output rotation directions are the same. With the actuator on, the roller clutch is unlocked, the planetary gears only rotate, and input rotation in the forward rotation direction is converted to output in the reverse direction.

33 Claims, 45 Drawing Sheets

U.S. PATENT DOCUMENTS 5,152,726 A * 10/1992 Lederman ............... 475/324
6,019,697 A * 2/2000 Colletti ............... 475/303
7,128,315 B2 * 10/2006 Tsunematsu ............. 271/114

FOREIGN PATENT DOCUMENTS

| | | |
|---|---|---|
| JP | 52-142155 | 11/1977 |
| JP | 55-093172 | 7/1980 |
| JP | 5-45883 | 11/1993 |
| JP | 5-307290 | 11/1993 |

OTHER PUBLICATIONS

International Search Report issued Dec. 11, 2007 in the International (PCT) Application of which the present application is the U.S. National Stage.

* cited by examiner

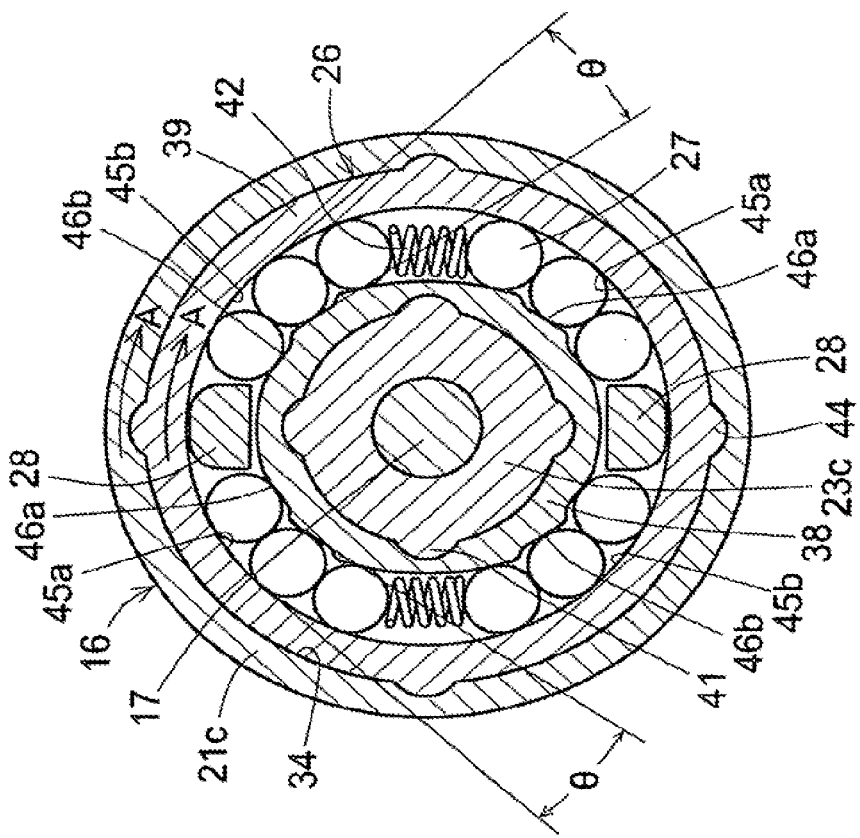

DEVICE FOR SWITCHING BETWEEN NORMAL AND REVERSE DRIVE FORCE

BACKGROUND OF THE INVENTION

1. Technical Field

This invention relates to a device for switching between normal and reverse drive force, a feeder for switching between normal and reverse directions using this device, and a driving device for paper feed rollers of e.g. office machines using this feeder.

2. Background Art

Since paper is ordinarily fed in a paper feeder of an office machine in one direction, its drive mechanism is driven by a motor that rotates in one direction only. In a more advanced paper feeder that can switch over the paper feed direction, a device for switching the motor drive rotation between normal and reverse had to be added if a conventional unidirectional motor is used for the machine (Patent Document 1).

As a mechanism for switching between normal and reverse drive force in such a case, a mechanism using three bevel gears shown in FIG. 54 is known (Non-Patent Document 1). In this mechanism, an output shaft 103 is provided near the flank of an input bevel gear 102 and perpendicularly to an input shaft 101, and a clutch 104 is axially slidably keyed to the output shaft 103. On both sides of the clutch 104, a pair of bevel gears 105 are rotatably fitted and meshed with the input bevel gear 102. Teeth 107 engaging the clutch 104 are formed on boss portions 106 provided on the opposed sides of the respective output bevel gears 105. In a circumferential groove 108 formed in the center of the clutch, a pin 110 for a rocking arm 109 is inserted. The other end of the rocking arm 109 is pivotally mounted on a on a fixed portion by means of a shaft 111.

When the rocking arm 109 is inclined to left or right, the clutch 104 slides in the axial direction and is engaged with the teeth 107 of the output bevel gear 105 on the side toward which the rocking arm 109 is inclined. Thus, the rotation of the input shaft 101 is transmitted to the output shaft 103. When the rocking arm 109 is inclined toward the other side, the clutch 104 is engaged with the output bevel gear 105 on the opposite side and the output shaft 103 rotates in the opposite direction.

Patent Document 1: Japanese Patent Publication 05-307290 A

Non-Patent Document 1: Page 81 of "Kinematic Mechanism of Machinery" published by Gihodo Shuppan Co., Ltd. on Oct. 15, 1957

In the above-mentioned device for switching over the drive force, since the input shaft 101 and the output shaft 103 extend perpendicular to each other, the layout of a motor on the input side and feed rollers on the output side was limited. Also, the diameter of the input bevel gear 102 became larger and the control mechanism of the rocking arm 109 became complicated. Further, means for synchronizing the rotation phase of the teeth 107 was required when switching the clutch to avoid collision of the teeth.

SUMMARY OF THE INVENTION

Considering these problems, this invention aims at providing a compact device for switching between normal and reverse drive force in which the input and output shafts are laid out parallel to each other.

To solve the above-mentioned problems, the device for switching normal and reverse drive force according to this invention comprises, as shown in FIG. 1, an input gear 11, an output gear 12 and a switch mechanism 13 that selectively switches the drive torque applied to the input gear 11 and transmitted to the output gear 12, with the following configuration.

The switch mechanism 13 comprises a planetary gear mechanism 14, control mechanism 15 and a clutch mechanism 16.

The planetary gear mechanism 14 comprises a rotation transmission shaft 18 supported by a fixed shaft 17, a sun gear 18 coaxially integrated with the rotation transmission shaft 18, an internal gear 21 coaxially provided around the sun gear 19 and integrated with the output gear 12, planetary gears 22 provided between the sun gear 19 and the internal gear 21, and a carrier 23 of the planetary gears 22 provided coaxially with the rotation transmission shaft 18.

The control mechanism 15 is provided rotatably and coaxially with the fixed shaft 17 and comprises a control gear 25 that can be selectively locked and unlocked by an external actuator 24. The control gear 25 is integrated with the carrier 23.

The clutch mechanism 16 comprises a unidirectional roller clutch 26 provided between radially opposed surfaces of the rotation transmission shaft 18 and a clutch-mounting portion 34 provided in the carrier 23. Lock release pins 28 provided on the control gear 25 are provided at the ends to which the wedge angle θ narrows in the roller clutch 26, leaving predetermined clearances to adjacent rollers 27. The input gear 11 is integrated with the rotation transmission shaft 18.

In a device for switching between normal and reverse drive force with the configuration described above, when a drive torque in the normal rotation direction A is applied to the input gear 11 while the actuator 24 is off and the control gear 25 is unlocked, an inner race 38 of the roller clutch 26 rotates in the same direction and this makes the roller clutch 26 locked. By this locking, the planetary gear mechanism 14 only revolves in the normal rotation direction A, and this rotates the output gear 12 in the same direction.

In this state, when the actuator 24 is switched on and the control gear 25 becomes locked, the clutch 26 is locked and the carrier 23 stops. The planetary gears 22, which are supported by the carrier 23, thus stop revolving and only rotate. As a result, the output gear 12 rotates in the reverse rotation direction B (see FIG. 6).

This invention is as described above, and the following effects can be obtained.

a) Since all the component parts are mounted to the one fixed shaft 17, the device can be quickly and easily mounted in a target machine only by fixing the fixed shaft to the target machine. Also, since the fixed shaft 17 becomes the center of the rotation, mounting accuracy can be achieved more easily and this leads to reduction of rotation failure.

b) The entire device can be made compact since the planetary gear mechanism 14 can be mounted on the radially inner side of the input gear 11.

c) Lock release function by the lock release pins 28 provided on the control gear 25 or the sun gear 19 is added to the unidirectional clutch 26. This function is controlled directly in the case of the lock release pins 28 provided on the control gear 25, or through the planetary gears 22 supported by the control gear 25 in the case of the lock release pins 28 provided on the sun gear 19. In both cases, rotation direction can be switched solely by turning the actuator 24 on or off, which makes control easier.

d) Mechanism such as a solenoid or electromagnetic clutch can be used for the actuator 24 since it can be operated from a radial direction of the control gear 25.

e) In the case that cam surfaces 46 are formed on the inner race 38 constituting the unidirectional clutch 26, the inner-diameter surface of the outer race 39 contacts the rollers 27. With this configuration, contact pressure to the rollers 27 is reduced and allowable torque become larger compared with the configuration in which the cam surfaces 46 are formed on the inner-diameter surface of the outer race 39.

f) By controlling the control gear 25, the output rotation can be reversed.

g) Since the planetary gear mechanism 14 is used, the output rotation rate can be gained or reduced according to the rotation direction.

h) Because the input shaft and the output shaft can be arranged parallel to each other, the input/output mechanism can be constructed with transmission of spur gears.

BRIEF DESCRIPTION OF THE DRAWINGS

FIG. 6 is a sectional view of Embodiment 1 when the actuator is on;

FIG. 14 is a sectional view of Embodiment 2 when the actuator is on;

FIG. 15 is a sectional view taken along line $X_7$-$X_7$ of FIG. 14;

FIG. 16 is a sectional view taken along line $X_8$-$X_8$ of FIG. 14;

FIG. 22 is a sectional view of Embodiment 3 when the actuator is on;

FIG. 31 is a sectional view of Embodiment 4 when the actuator is on;

FIG. 39 is a sectional view of Embodiment 5 when the actuator is on;

FIG. 48 is a sectional view of Embodiment 6 when the actuator is on;

DETAILED DESCRIPTION OF THE INVENTION

Figure 1:
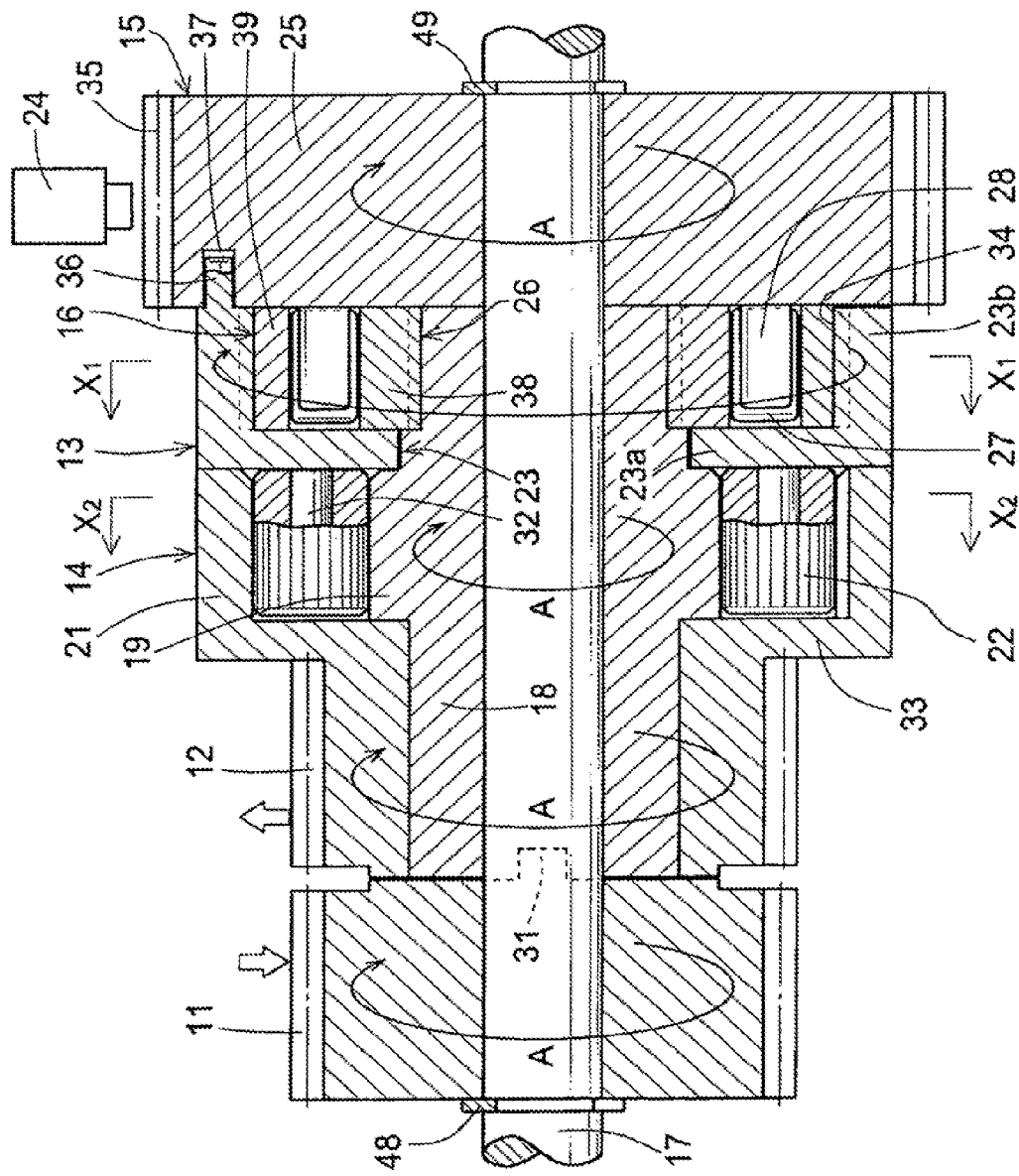
FIG. 1 is a sectional view of Embodiment 1 when the actuator is off.

Embodiments of the device for switching between normal and reverse drive force according to this invention are described below.

Embodiment 1

FIGS. 1 to 8 show Embodiment 1 which basically comprises an input spur gear 11, an output spur gear 12, and a switch mechanism 13 that transmits the rotation of the input gear 11 to the output gear 12 to selectively rotate the output gear 12 in the forward or backward direction. This device is supported by a fixed shaft 17 extending through the center of the device. The switch mechanism 13 comprises a planetary gear mechanism 14, a control mechanism 15 and a clutch mechanism 16.

In Embodiment 1, from left to right in FIG. 1, the input gear 11, the output gear 12, the planetary gear mechanism 14, the clutch mechanism 16 and the control mechanism 15 are mounted on the fixed shaft 17.

The input gear 11 is rotatably fitted around one end of the fixed shaft 17. One end face of a rotation transmission shaft 18, which is a part of the planetary gear mechanism, abuts against the inner end face of the input gear 11. The input gear 11 and the rotation transmission shaft 18 are rotationally fixed to each other by axial projection/recess engaging portions 31.

Figure 3:
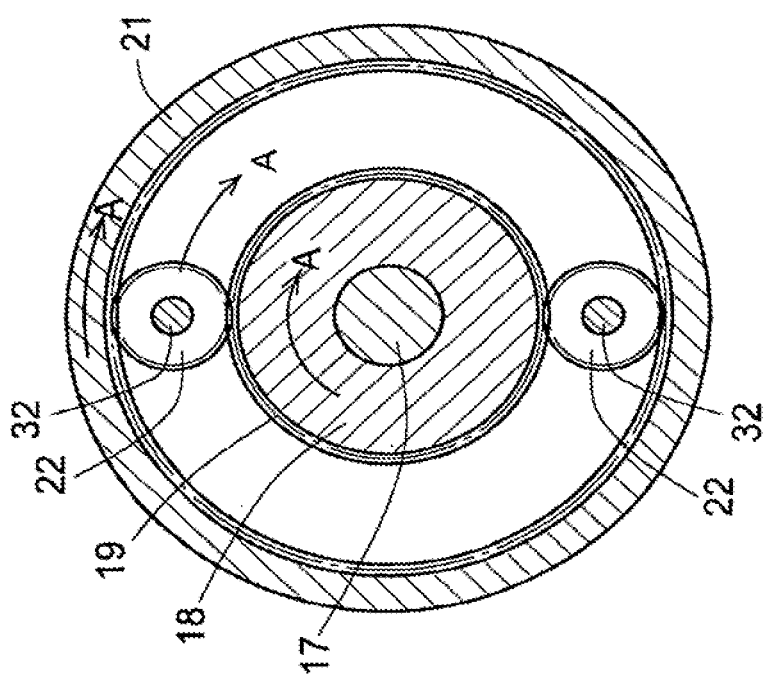
FIG. 3 is a sectional view taken along line $X_2$-$X_2$ of FIG. 1.
Figure 4:
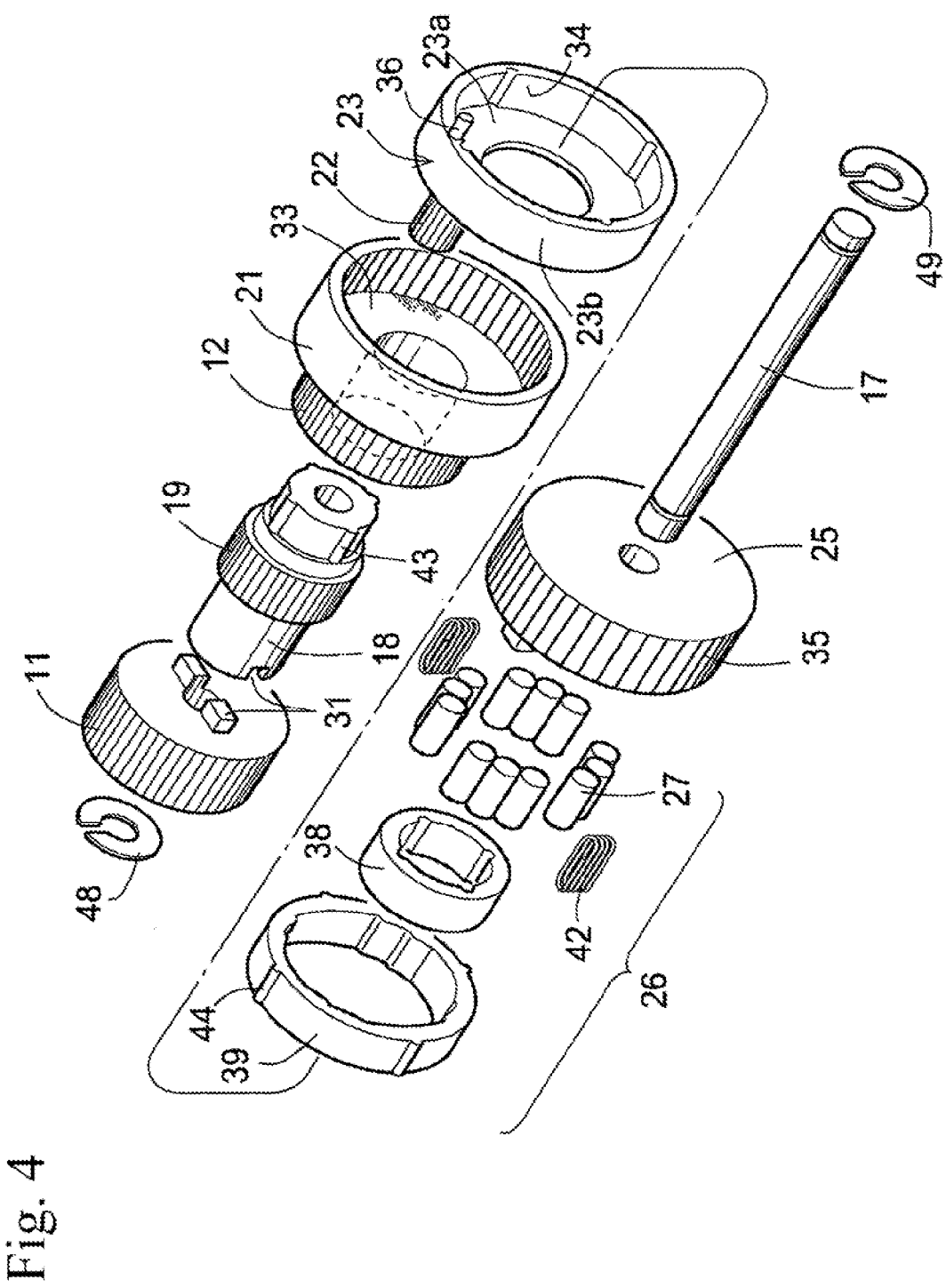
FIG. 4 is an exploded perspective view of Embodiment 1.

As shown in FIG. 3, the planetary gear mechanism 14 comprises the rotation transmission shaft 18 supported by the fixed shaft 17, a sun gear 19 integrally formed on the middle portion of the outer surface of the rotation transmission shaft 18, an internal gear 21 coaxially provided around the sun gear 19, two planetary gears 22 axisymmetrically provided in the space between the sun gear 19 and the internal gear 21 and meshing with the gears 19 and 21, and a carrier 23 supporting rotary shafts 32 of the respective planetary gears 22. The other end face of the rotation transmission shaft 18 is in contact with the inner end face of a control gear 25.

The output gear 12 is rotatably fitted around the outer-diameter surface of the rotation transmission shaft 18 between its face on the side of the input gear 11 and the sun gear 19 (see FIG. 1). The output gear 12 and the internal gear 21, which has a larger diameter than the output gear 12, are integrally formed through a step 33. The internal gear 21 is supported by the output gear 12 through the step 33. The planetary gears 22 face to the inner face of the step 33. The step 33 thus prevents the planetary gears 22 from coming off the rotary shafts 32.

The carrier 23 comprises a disk portion 23a and a cylindrical portion 23b extending from the outer edge of the disk portion 23a toward the control gear 25. A clutch-mounting portion 34 is formed on the radially inner surface of the cylinder portion 23b.

The control mechanism 15 comprises the control gear 25 in contact with the other end face of the rotation transmission shaft 18 and rotatably fitted around the fixed shaft 17. On the radially outer surface of the control gear 25, an engaging surface 35 comprising protrusions and recesses such as gear teeth or serrations is formed. An external actuator 24 is provided facing the engaging surface 35, and the control gear 25 is selectively locked and unlocked as the actuator 25 is on or off.

The actuator 24 shown comprises a plunger that protrudes and retracts by a solenoid, thereby coming into and out of engagement with the engaging surface 35. But instead, this mechanism may comprise an electromagnetic clutch or an electromagnetic brake and an auxiliary gear to restrict the control gear with a predetermined braking torque, not only in this embodiment but each of the subsequent embodiments.

Figure 5A:
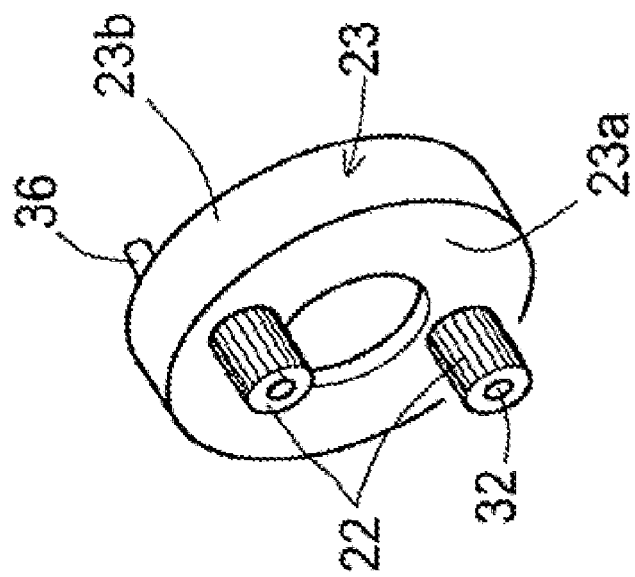
FIG. 5(a) is a perspective view of the clutch-mounting portion of Embodiment 1.
Figure 5B:
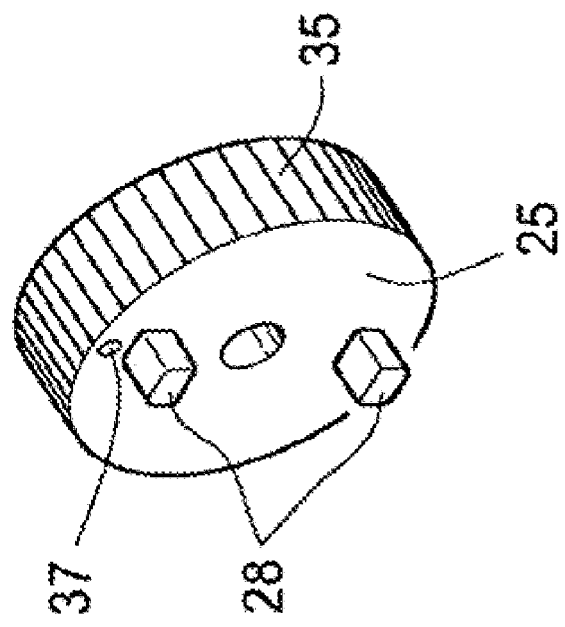
FIG. 5(b) is a perspective view of the control gear of Embodiment 1.

A pair of lock release pins 28 are provided symmetrically with respect to the center on the face of the control gear 25 facing the carrier 23 (see FIG. 5(b)). An engaging recess 37 is provided on the radially outer side of one lock release pin 25, and a corresponding engaging projection 36 is provided on the end face of the cylinder member 23b. When the engaging projection 36 engages in the engaging recess 37 (see FIG. 1), the control gear 25 is integrated with the carrier 23 in the rotation direction.

The clutch mechanism 16 comprises a unidirectional roller clutch 26 set up between the portion of the outer-diameter surface of the rotation transmission shaft 18, defined by the end faces of the sun gear 18 and the control gear 25, and the inner-diameter surface of the clutch-mounting portion 34. The roller clutch 26 comprises an inner race 38, an outer race 39, rollers 27 and bias springs 42 provided between the inner and outer races.

The inner race 38 is fitted to the outer-diameter surface of the rotation transmission shaft 18 through anti-rotation arrangements 43 (see FIG. 2), and the outer race 39 is also fitted to the inner-diameter surface of the clutch-mounting portion 34 through anti-rotation arrangements 44. Four roller receiving spaces 45a, 45b of different directivities provided between the opposed outer and inner-diameter surfaces of the inner race 38 and the outer race 39, each roller receiving space provided in a circumferentially quarter segment. In other words, the two roller receiving spaces 45a are provided in two segments that are symmetrical about the axis, and the other two roller receiving spaces 45b with the opposite directivity to that of the roller receiving spaces 45a are provided respectively in the segments between the roller receiving spaces 45a.

On the inner-diameter surface of the outer race 39 defining the respective roller receiving spaces 45a, 45b, cam surfaces 46a, 46b, each comprising three continuous inclined faces, are formed. Three rollers 27 contacting each other in the circumferential direction are received on each cam surface 46a, 46b. The inclined faces of the cam surface 46a in each roller receiving space 45a and the cam surface 46b in each roller receiving space 45b are formed so that their directions are circumferentially opposite. As a result, the expansion directions of the wedge angles θ defined by the tangential lines at the contact points of the rollers 27 fitted to the respective cam surfaces 46a and 46b become opposite to each other.

The bias springs 42 are provided between the ends of the roller receiving spaces 45a, 45b toward which the wedge angle θ expands. By these bias springs 42, the rollers 27 provided in the roller receiving spaces 45a, 45b are biased in the directions in which the respective wedge angles θ narrow. The lock release pins 28 are inserted in the spaces between the ends of the roller receiving spaces 45a, 45b toward which the wedge angles θ narrow, with small gaps defined between each lock release pin 28 and the rollers 27 on both sides of the lock release pin 28. In this manner, the roller clutch with clutch receiving spaces 45a or 45b in which the spaces having the same wedge angle θ directions have the same directional characteristics is formed.

Figure 48:
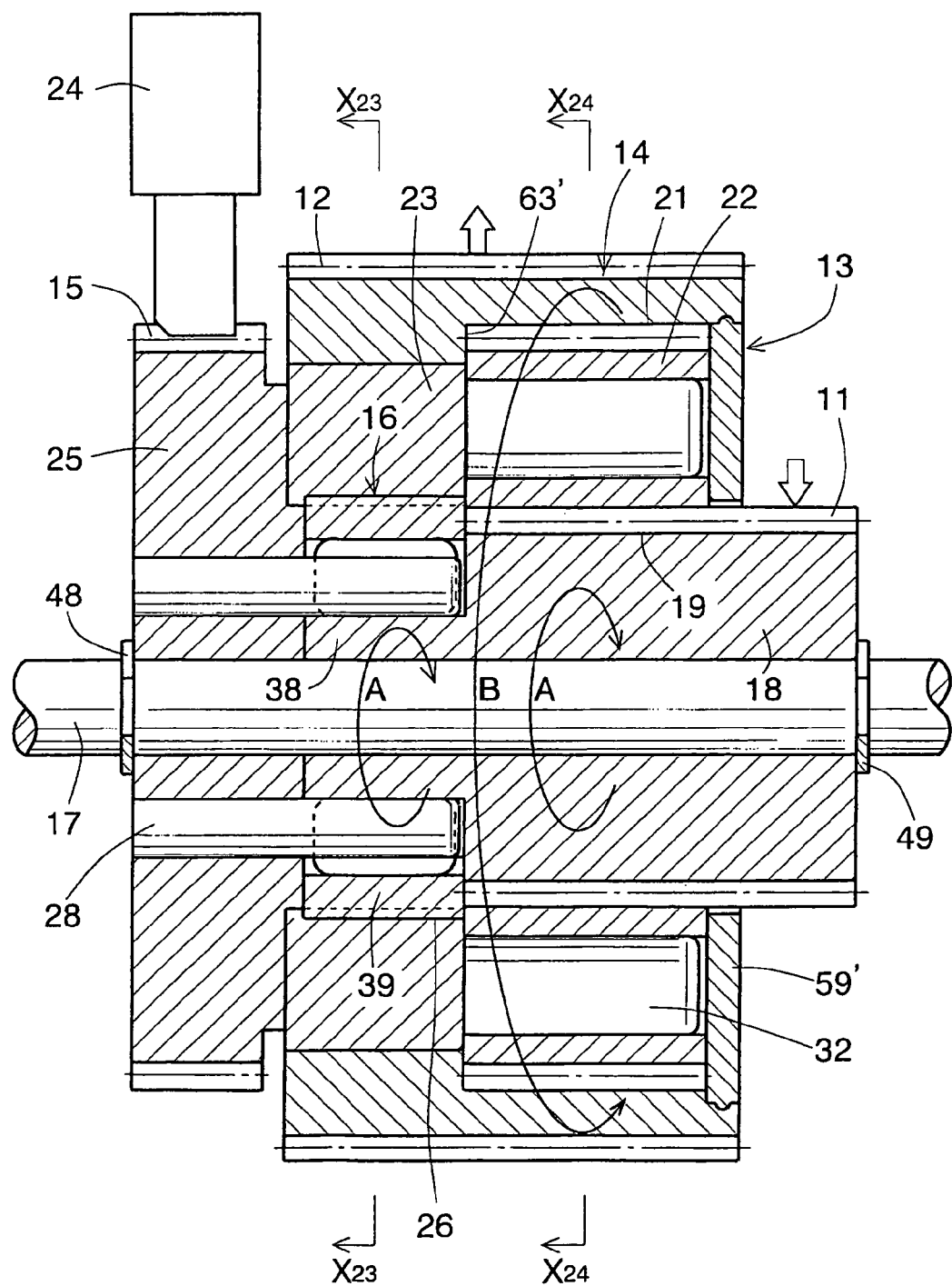
Figure 49:
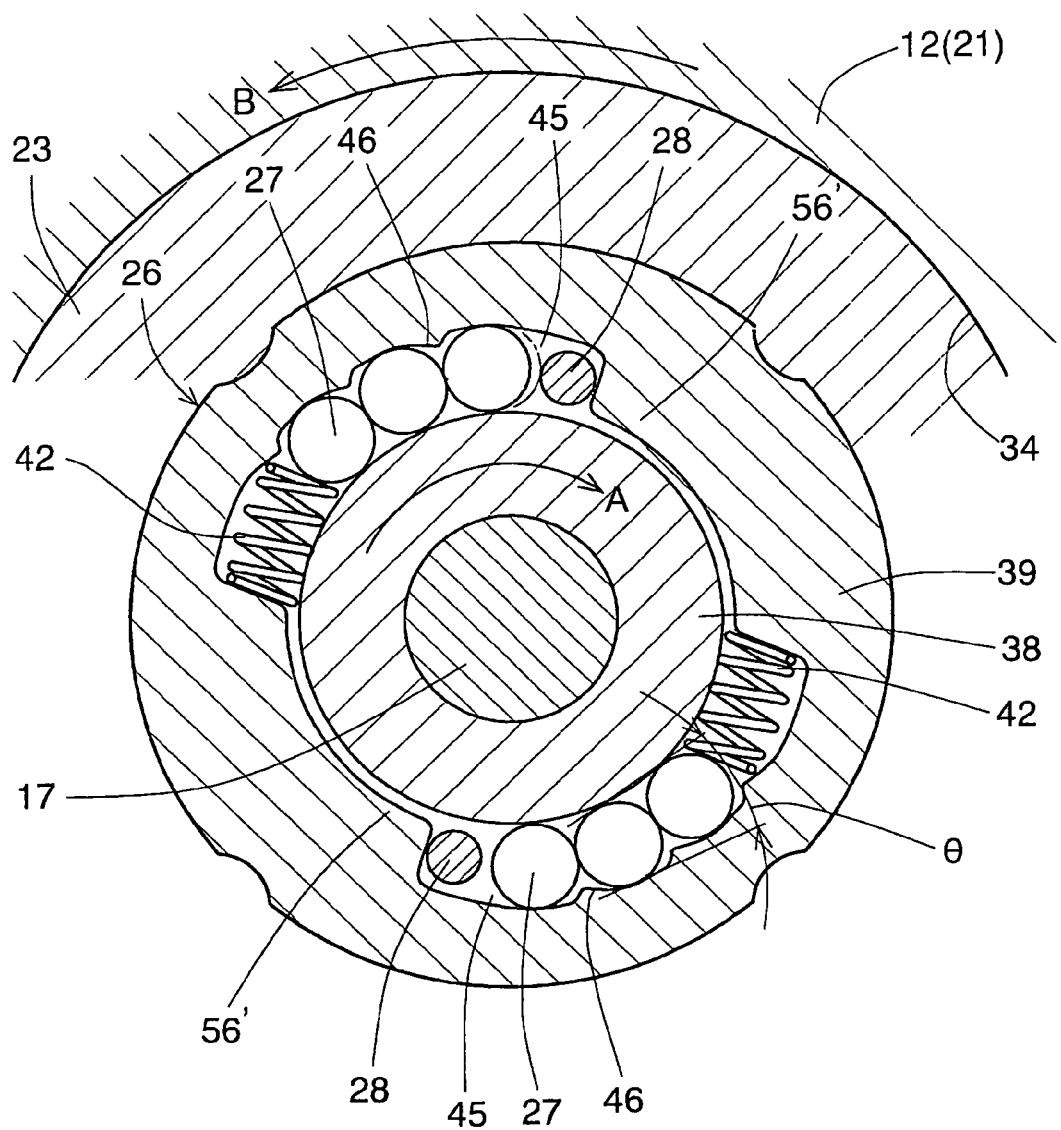
FIG. 49 is a sectional view taken along line $X_{23}$-$X_{23}$ of FIG. 48.
Figure 50:
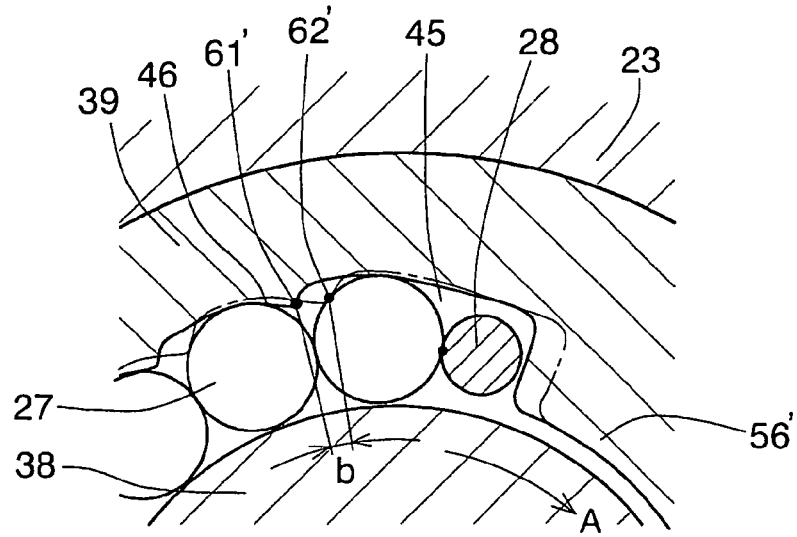
FIG. 50 is a sectional view of the roller clutch of Embodiment 6.
Figure 51:
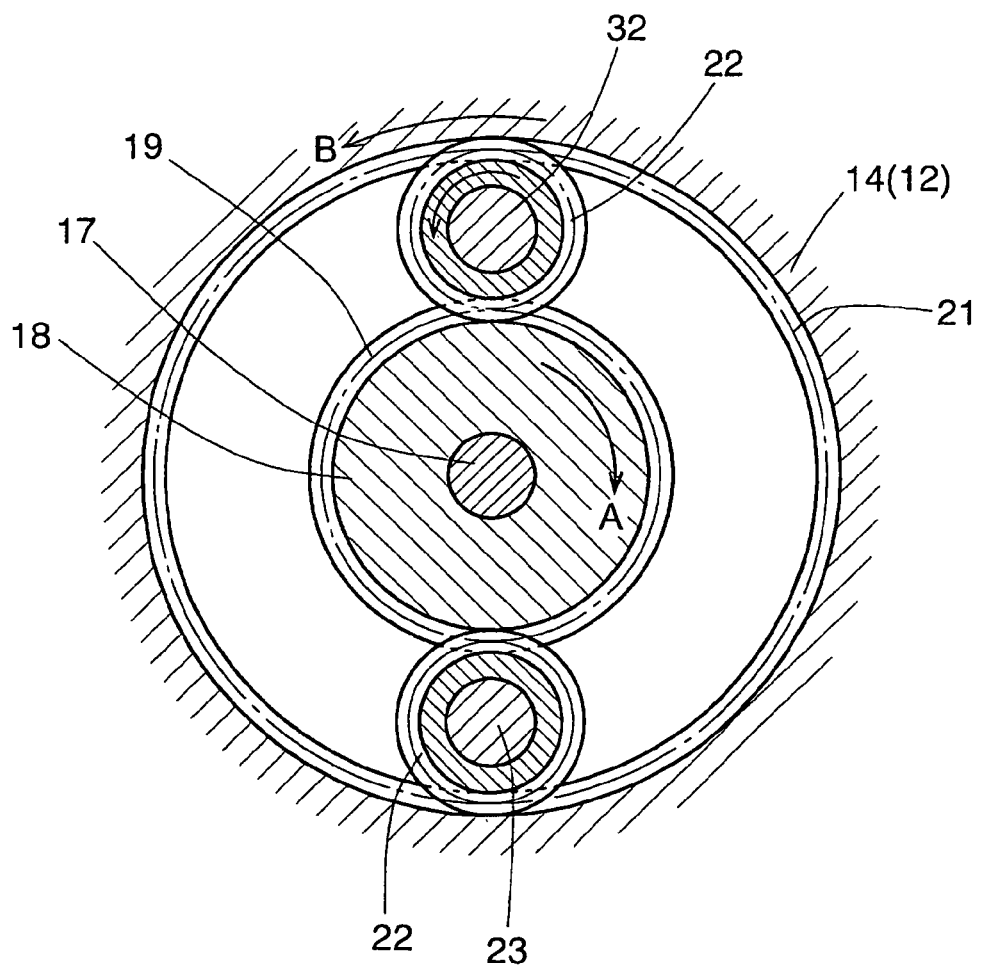
FIG. 51 is a sectional view taken along line $X_{24}$-$X_{24}$ of FIG. 48.

In FIGS. 1, 48 and 49 are snap rings for the input gear 11 and the control gear 25, respectively.

The device for switching between normal and reverse drive force in Embodiment 1 is as described above, and it can be called a "sun gear input type" since the input gear 11 is connected to the sun gear 19. The operation of Embodiment 1 is now described.

As shown in FIG. 1, when the actuator 24 is off and the control gear 25 is not locked, drive torque in the normal rotation direction A (clockwise when viewed from the right side of the device in FIG. 1) is applied to the input gear 11, and the rotation transmission shaft 18, the sun gear 19 and the inner race 38 of the roller clutch 26 rotate integrally with the input gear 11 in the normal rotation direction A.

Figure 2:
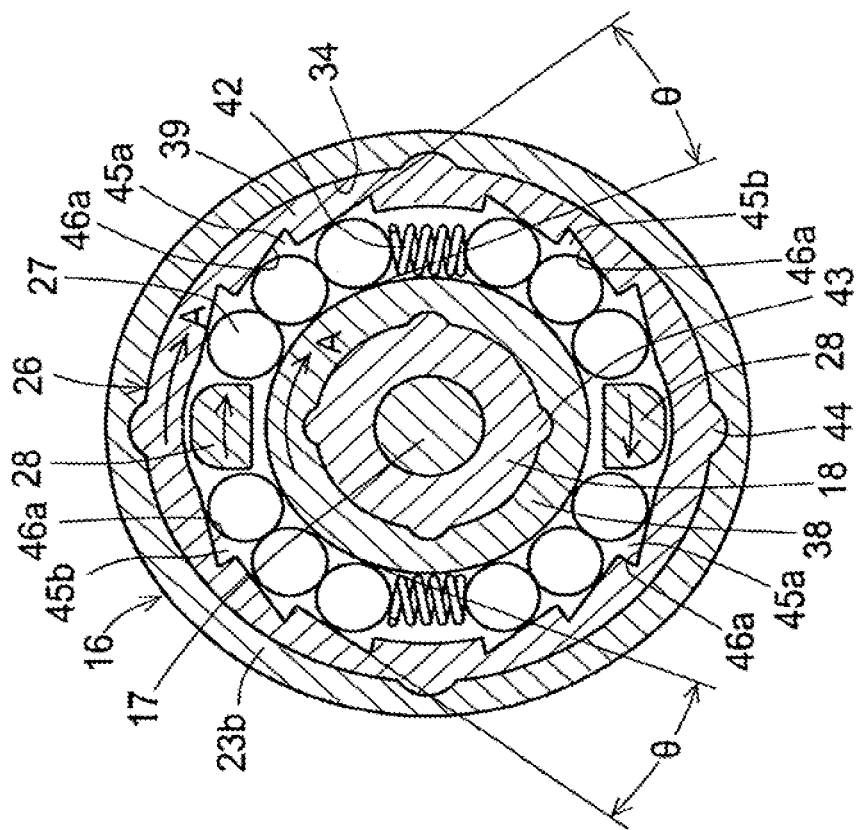
FIG. 2 is a sectional view taken along line $X_1$-$X_1$ of FIG. 1.

In the roller clutch 26, as shown in FIG. 2, while the rotation of the inner race 38 in the normal direction A releases the lock of the rollers 27 in the roller receiving spaces 45a, the rollers 27 in the other roller receiving spaces 45b are moved toward the narrower side of the wedge angle θ, and thus locked. This makes the roller clutch 26 locked as a whole. That is, the roller clutch 26 has the unidirectional characteristics, because it is locked by the rotation of the inner race 38 in the normal rotation direction A. However, in the case of Embodiment 1, as described afterward, the roller clutch 26 has bi-directional characteristics, because it is locked by the roller receiving spaces 45a when the inner race 38 rotates in the opposite direction, namely, the reverse rotation direction B.

As described above, as the roller clutch 26 is locked, the carrier 23 and the control gear 25 are rotated in the normal rotation direction A, and the lock release pins 28 provided on the control gear 25 rotate in the same direction. The roller clutch 26 is not unlocked by the rotation of the lock release pins 28 in the same direction.

As the roller clutch 26 is locked, the sun gear 19 and the carrier 23 are integrated, and the planetary gears 22 only revolve, without rotating, in the normal rotation direction A along with the rotation of the sun gear 19 (see FIG. 3). Simultaneously, the internal gear 21 and the output gear 12, which is integrated with the internal gear 21, rotate in the normal rotation direction A at the same rotational speed as the input gear 11, and drive torque in the normal rotation direction A is produced from the output gear 12 (see the white arrow on the output gear 12 in FIG. 1).

Figure 6:
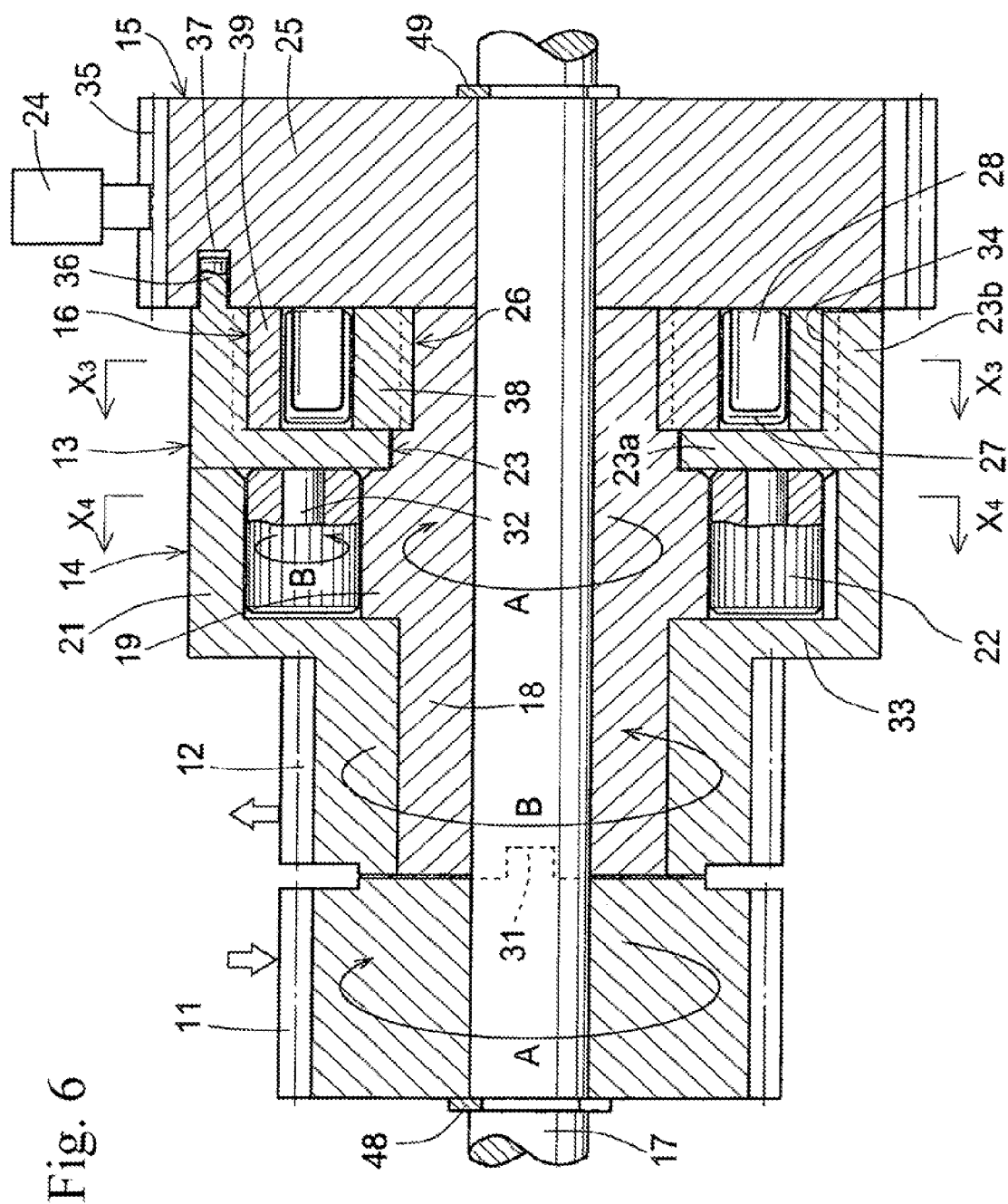
Figure 7:
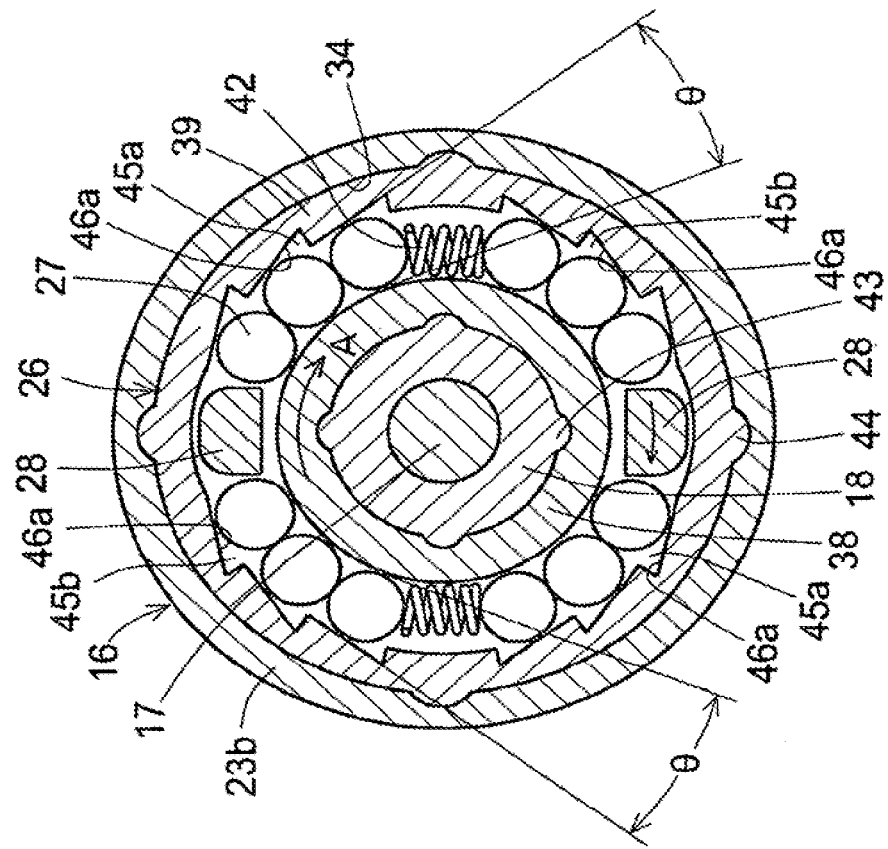
FIG. 7 is a sectional view taken along line $X_3$-$X_3$ of FIG. 6.

While the device is rotating as described above, if the actuator 24 is switched on and the control gear 25 is locked as shown in FIG. 6, the lock release pins 28 integrated with the control gear 25 stop. On the other hand, since the input gear 11, the rotation transmission shaft 18 and the inner race 38 are still rotating in the normal rotation direction A, the rollers 27 in the roller receiving spaces 45a of the roller clutch 26 are moved in the direction in which the wedge angle θ is expanded and thus the lock is released (see FIG. 7).

At the same time, in the other roller receiving spaces 45b, while the rollers 27 are moved in the direction in which the wedge angle θ narrows, the torque of the inner race 38 overcomes the brake torque (corresponding to relatively lower load torque such as paper feeding, the brake torque is set to be substantially low) of the actuator 24 that locks the outer race 39, the carrier 23 and the control gear 25, and the entire roller clutch 26 rotates in the normal rotation direction A. This makes the rollers 27 stopped by the lock release pins 28 and pushed back in the direction in which the wedge angle θ is expanded, and the lock is released. As a result, the roller clutch 26 becomes unlocked as a whole.

Figure 8:
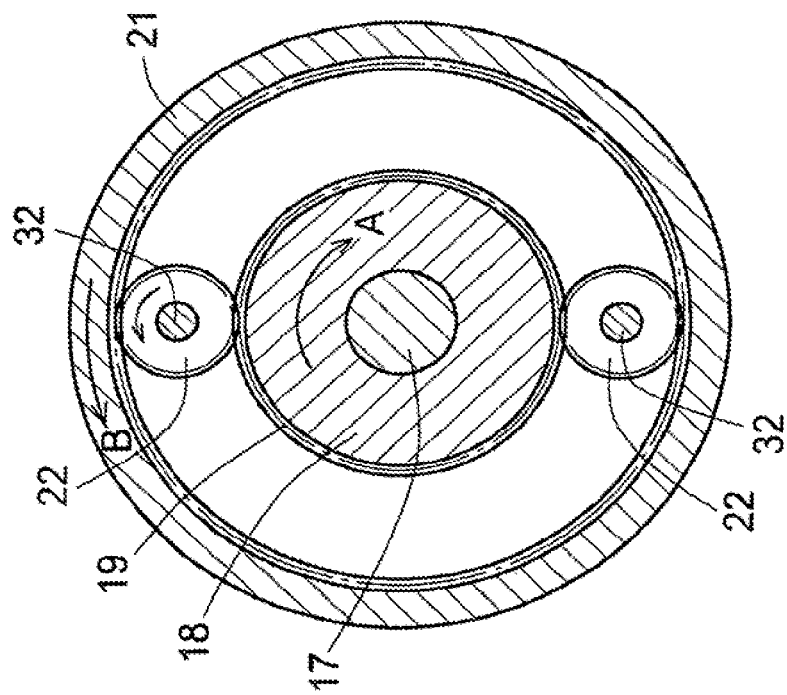
FIG. 8 is a sectional view taken along line $X_4$-$X_4$ of FIG. 6.

Since the carrier 23 is integrated with the control gear 25 by engagement between the projection 36 and the recess 37, the carrier 23 stops when the control gear 25 is stopped, and the planetary gears 22 supported by the carrier 23 rotate without revolution (see FIG. 8). As a result, in the reverse rotation direction B which is the opposite of the input, the drive torque decelerated with the planetary gear mechanism 14 is produced from the output gear 12 (see the white arrow on the output gear 12 in FIG. 6).

While the description above explains the case when the drive torque in the normal rotation direction A is applied to the input gear 11, since the roller clutch 26 is bi-directional as mentioned above, the rotation direction is switched by the same mechanism as described above when the torque in the reverse rotation direction B is applied to the input gear 11 too.

A unidirectional roller clutch 26 may be used if the input torque is limited to one rotation direction.

Embodiment 2

While Embodiment 2 shown in FIGS. 9 to 12 has the same basic structure as with Embodiment 1 described above, there are some differences such as the structures of the input gear 11, the output gear 12, the rotation transmission shaft 18 and the carrier 23.

Figure 9:
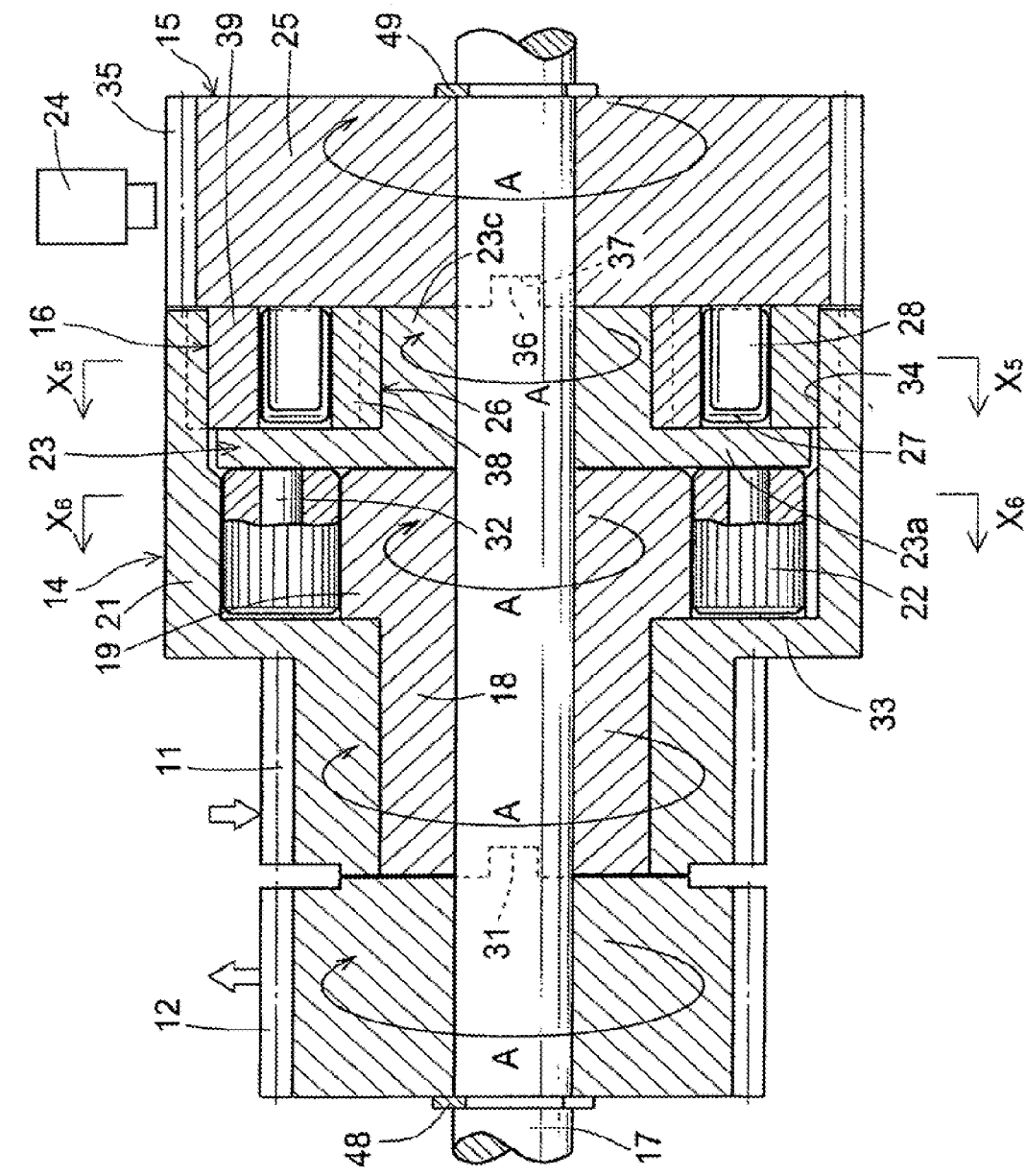
FIG. 9 is a sectional view of Embodiment 2 when the actuator is off.

That is, in Embodiment 2, the positions of the input gear 11 and the output gear 12 are interchanged, with the output gear 12 placed on the left end of the device shown in FIG. 9, fitted on the fixed shaft 17 at this position. Also, the input gear 11 is fitted on the outer-diameter surface of the rotation transmission shaft 18 and integrated with the internal gear 21 through a step portion 33. This type is called internal gear input type.

In this case, the rotation transmission shaft 18 is different from that of Embodiment 1, in that it does not extend beyond the sun gear 19, and the end face of the sun gear 19 abuts the end face of the carrier 23. The other end of the rotation transmission shaft 18 is engaged with the output gear 12 by engaging projection/recess engaging portions 31 so that the transmission shaft can rotate integrally with the output gear 12.

Also, from the end of the internal gear 21, a cylindrical portion 21a having the same outer diameter extends, and the bore of the cylindrical portion 21a serves as the clutch-mounting portion 34 open to the control gear 25 side. Inside the clutch-mounting portion 34, the carrier 23 is received. The carrier 23 comprises a disk portion 23a and a boss portion 23c provided in the center of the end face of the disk portion 23a facing the control gear 25. Anti-rotation arrangements 41 are provided on the outer-diameter surface of the boss portion 23c (see FIGS. 10 and 12).

Figure 13A:
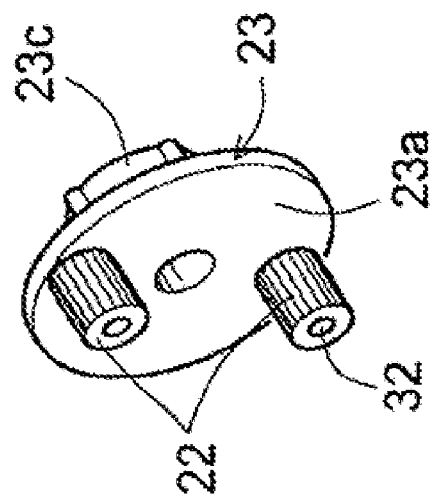
FIG. 13(a) is a perspective view of the carrier of Embodiment 2.
Figure 13B:
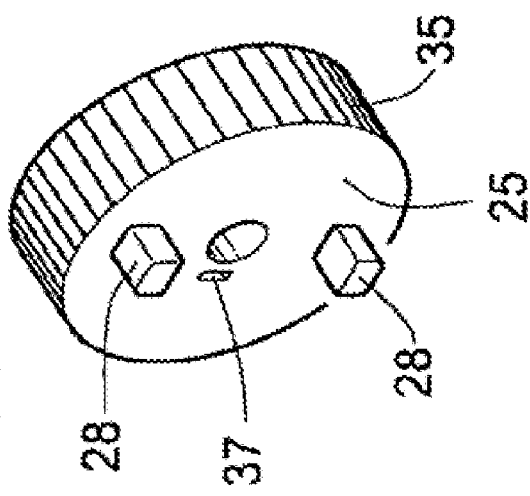
FIG. 13(b) is a perspective view of the control gear of Embodiment 2.

A projection 36 is provided on the end face of the boss portion 23c (see FIG. 12), and a corresponding recess 37 is provided on the control gear 25 (see FIG. 13(b)). In the same manner as Embodiment 1, the projection 36 engages in the socket 37, and the carrier 23 and the control gear 25 are integrated in the rotation direction. Also, as with Embodiment 1, a pair of lock release pins 28 are provided on the inner end face of the control gear 25.

Figure 10:
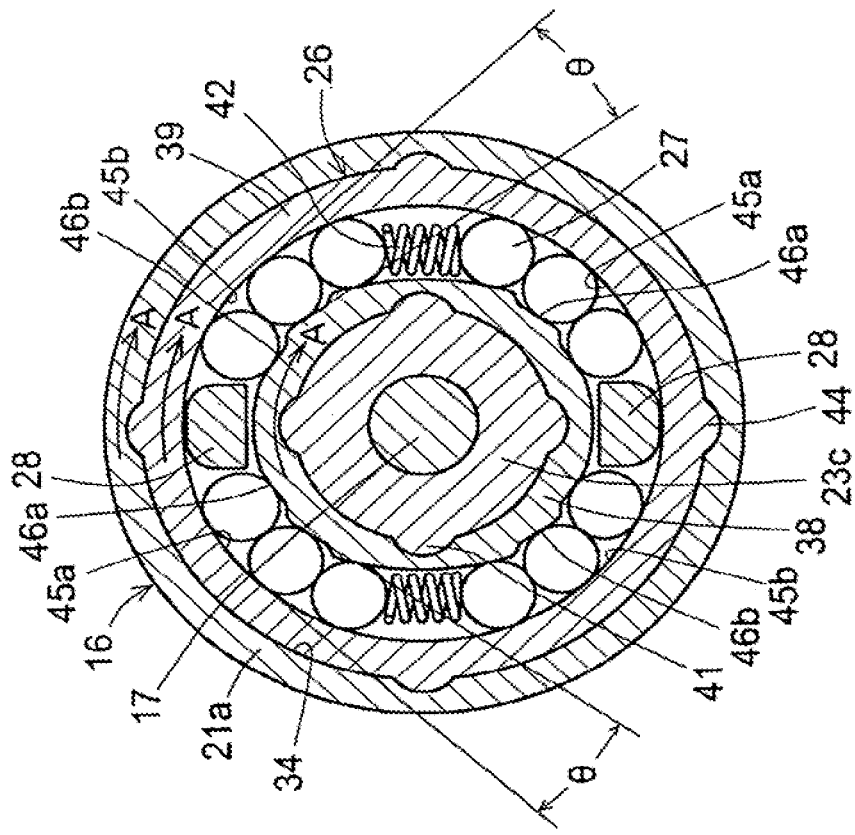
FIG. 10 is a sectional view taken along line $X_5$-$X_5$ of FIG. 9.
Figure 11:
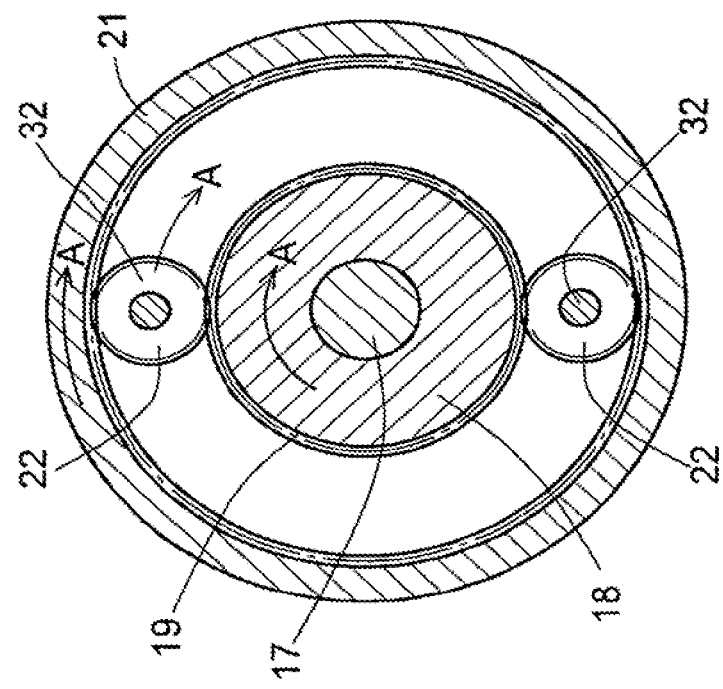
FIG. 11 is a sectional view taken along line $X_6$-$X_6$ of FIG. 9.
Figure 12:
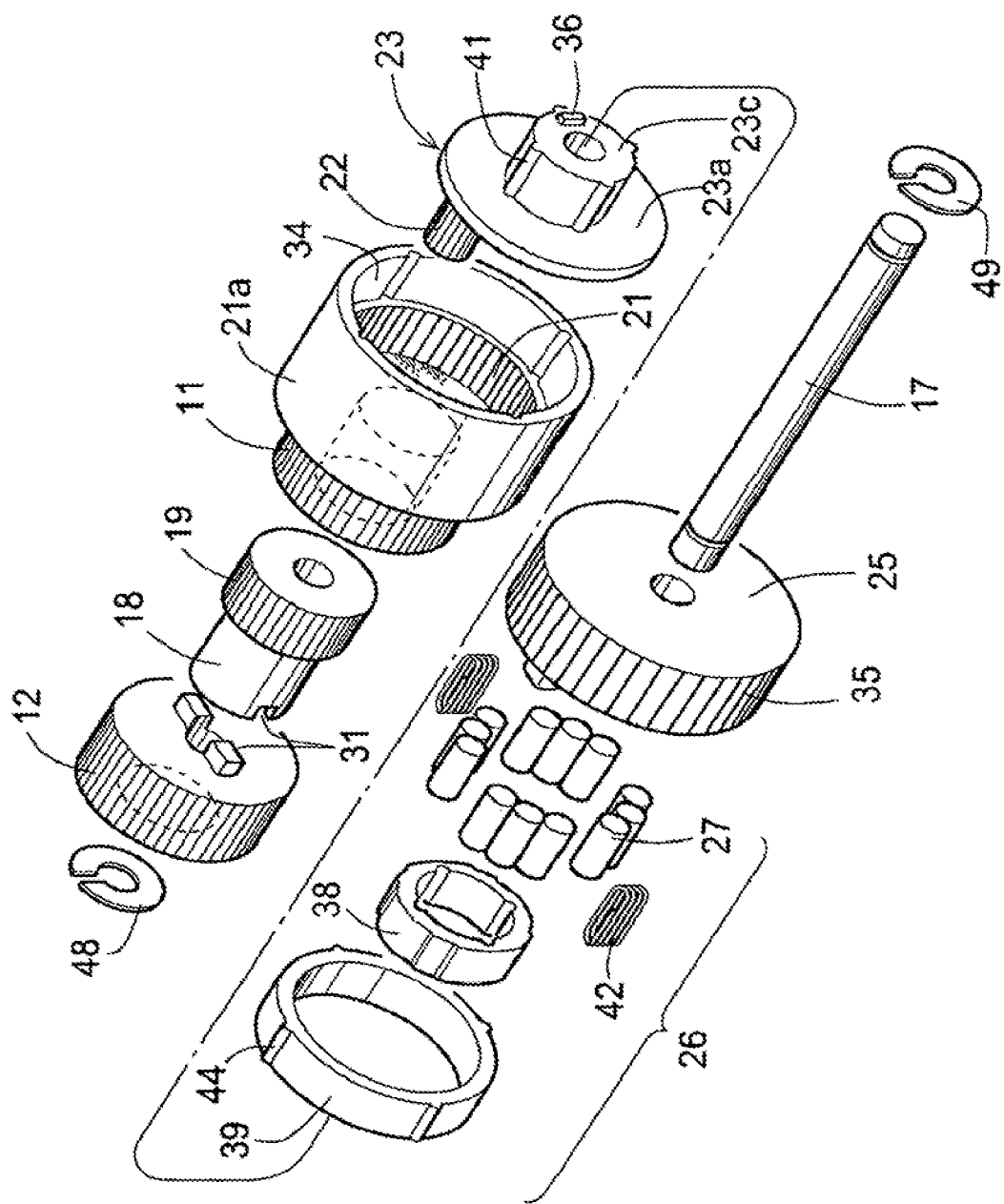
FIG. 12 is an exploded perspective view of Embodiment 2.

The roller clutch 26 is mounted between the outer-diameter surface of the boss portion 23c of the carrier 23 and the inner-diameter surface of the clutch-mounting portion 34. While the basic structure of the roller clutch 26 is the same as that of Embodiment 1, it is different from the Embodiment 1 in that the cam surfaces 46a, 46b are formed on the outer-diameter surface of the inner race 38, as shown in FIG. 10. The rest of the configuration is the same as that of Embodiment 1.

The device for switching between normal and reverse drive force in Embodiment 2 is as described above, and the operation of Embodiment 2 is now described.

As shown in FIG. 9, with the actuator 24 off and the control gear 25 not locked, when drive torque in the normal rotation direction A is applied to the input gear 11 (see the white arrow on the input gear 11 in FIG. 9), the internal gear 21 is rotated integrally in the same direction. At the same time, the outer race 39 of the roller clutch 26 is rotated in the normal rotation direction A.

At this time, the inner race 38 does not rotate, though the outer race 39 rotates in the normal rotation direction A, since the load is applied to the inner race 38 through the carrier 23, the planetary gears 22, the sun gear 19, the rotation transmission shaft 18 and the output gear 12. Therefore, the rollers 27 in the roller receiving spaces 45b are moved in the direction in which the wedge angle θ expands and the lock is released. In the other roller receiving spaces 45a, the rollers 27 are moved in the direction in which the wedge angle θ narrows, and the clutch is locked. Thus, the roller clutch 26 is locked as a whole.

As the roller clutch 26 is locked, the carrier 23 and the control gear 25 rotate in the same direction, and thus the lock release pins 28 are also rotated in the same direction. The roller clutch 26 is thus kept locked.

Since the roller clutch 26 is locked and the internal gear 21 and the carrier 23 are integrally rotated, the planetary gears 22 only revolve, without rotating, in the normal rotation direction A along with the rotation of the internal gear (see FIG. 11), and at the same time, rotate the sun gear 19 and the output gear 12 in the normal rotation direction A. That is, the output at the same speed and in the same normal rotation direction A as the input drive torque is obtained (see the white arrow on the output gear 12 in FIG. 9).

Figure 14:
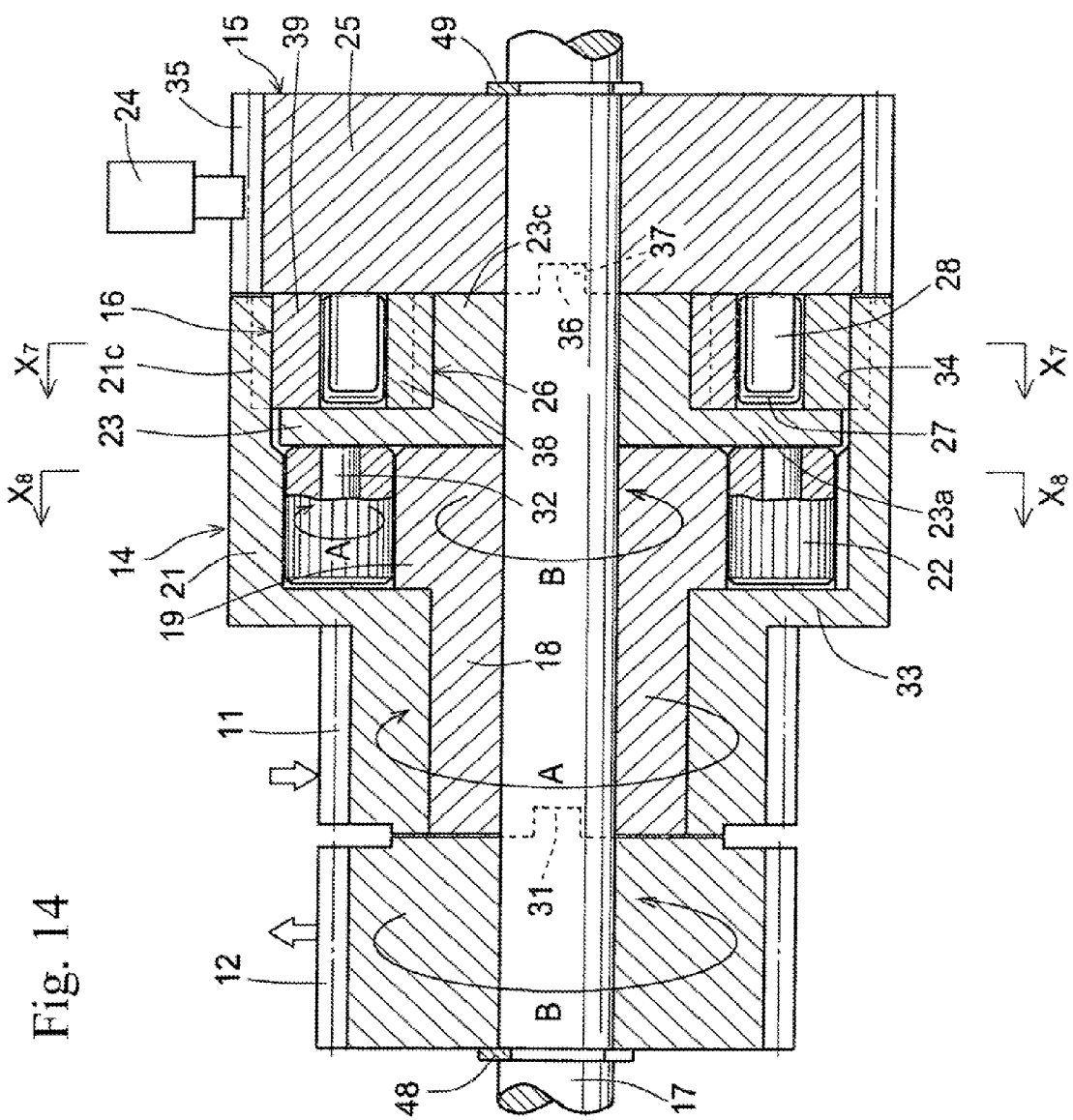

In this rotating state, when the actuator 24 is switched on and the control gear 25 becomes locked as shown in FIG. 14, the lock release pins 28, the carrier 23 and the inner race 38, which are integrated with the control gear 25, stop. On the other hand, because the input gear 11, the internal gear 21 and the outer race 39 are still rotating in the normal rotation direction A, the rollers 27 in the roller receiving spaces 45b of the roller clutch 26 are moved in the direction in which the wedge angle θ is expanded as shown in FIG. 15, and the lock is released.

At the same time, in the other roller receiving spaces 45a, in the same manner as Embodiment 1, while the rollers 27 are moved in the direction in which the wedge angle θ narrows, the torque of the inner race 38 overcomes the brake torque of the actuator 24 that locks the outer race 39, the carrier 23 and the control gear 25, and the entire roller clutch 26 rotates in the normal rotation direction A. This makes the rollers 27 stopped by the lock release pins 28 and pushed back in the direction in which the wedge angle θ is expanded, and the lock is released. As a result, the roller clutch 26 becomes unlocked as a whole.

Since the carrier 23 is integrated with the control gear 25 by engagement between the projection 36 and the recess 37, the carrier 23 stops when the control gear 25 is stopped, and the planetary gears 22 supported by the carrier 23 rotate without revolution. Along with this rotation, the sun gear 19 and the output gear 12 are rotated in the reverse rotation direction B. As a result, the drive torque in the reverse rotation direction B which is the opposite to the input, decelerated with the planetary gear mechanism 14, is produced from the output gear 12 (see the white arrow on the output gear 12 in FIG. 14).

While the description above explains the case when the drive torque in the normal rotation direction A is applied to the input gear 11, the rotation direction is switched over by the same mechanism when the torque in the reverse rotation direction B is applied to the input gear 11 too. In this case, the roller clutch 26 is locked in the roller receiving spaces 45b.

Embodiment 3

Embodiment 3 shown in FIGS. 17 to 25 is the same as previous embodiments in that it comprises an input gear 11, an output gear 12 and a switch mechanism 13 that selectively switches the direction of the drive torque applied to the input gear 11 and transmitted to the output gear, and that the switch mechanism 13 comprises a planetary gear mechanism 14, a control mechanism 15 and a clutch mechanism 16.

However, in Embodiment 3, the planetary gear 14 is mounted in the radially inner side of the input gear 11, and the clutch mechanism 16 is integrally provided in the radially inner side of the output gear 12. This makes the device compact in the axial direction. In this device, from left to right in FIG. 17, the control mechanism 15, the input gear 11 in which the planetary gear mechanism 14 is mounted, and the output gear 12 in which the clutch mechanism 16 is mounted are arranged.

Figure 17:
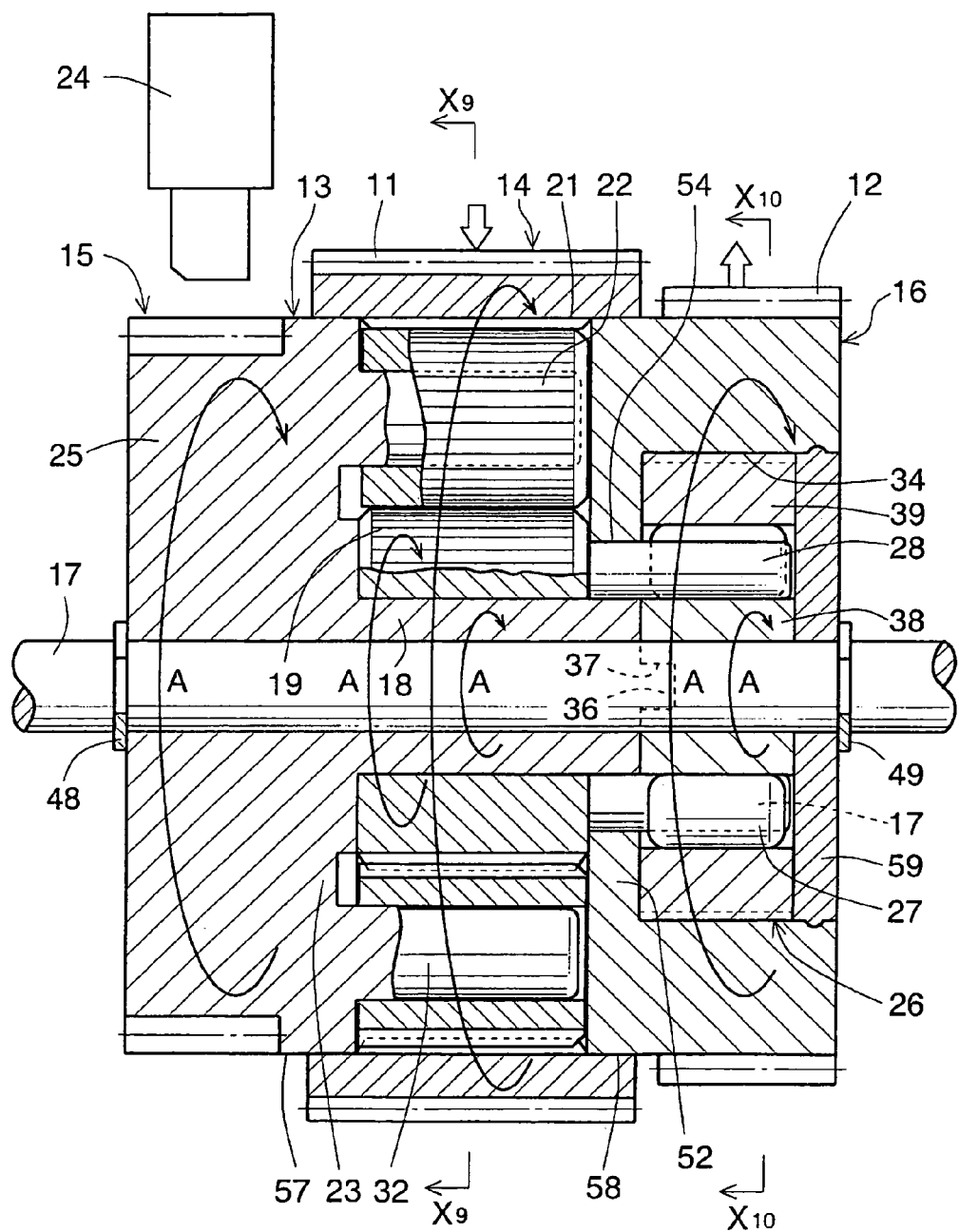
FIG. 17 is a sectional view of Embodiment 3 when the actuator is off.
Figure 20:
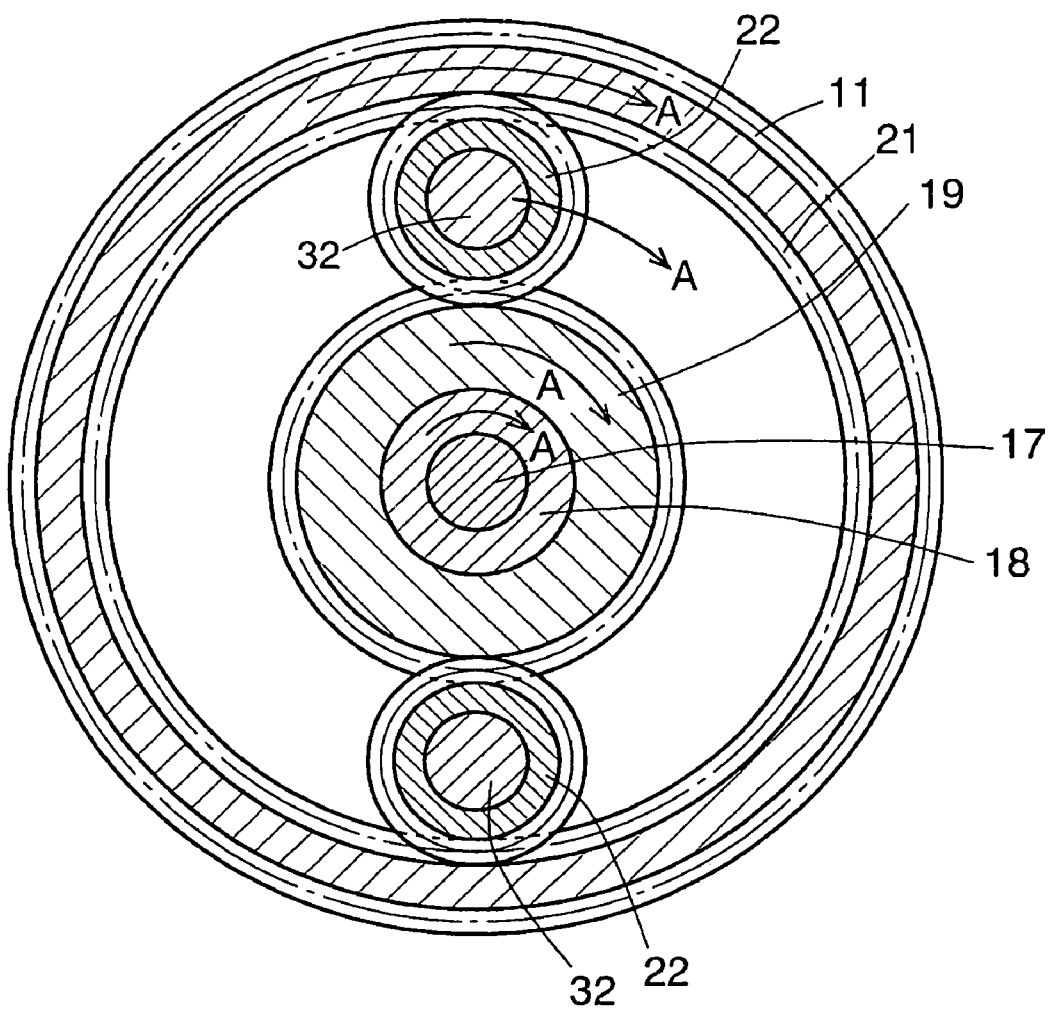
FIG. 20 is a sectional view taken along line $X_9$-$X_9$ of FIG. 17.

The planetary gear mechanism 14 comprises, as shown in FIG. 17 and FIG. 20, a rotation transmission shaft 18 supported by a fixed shaft 17, a sun gear 19 rotatably fitted to the rotation transmission shaft 18, an internal gear 21 provided around and coaxially with the sun gear 19, planetary gears 22 provided between the sun gear 19 and the internal gear 21, and a carrier 23 coaxially provided and integrated with the rotation transmission shaft 18. The carrier 23 is integrated with the inner end face of the control gear 25.

The internal gear 21 is integrated with the inner-diameter surface of the input gear 11. The fixed shaft 17 extends through the centers of the control gear 25, the carrier 23 and the rotation transmission shaft 18.

Figure 18:
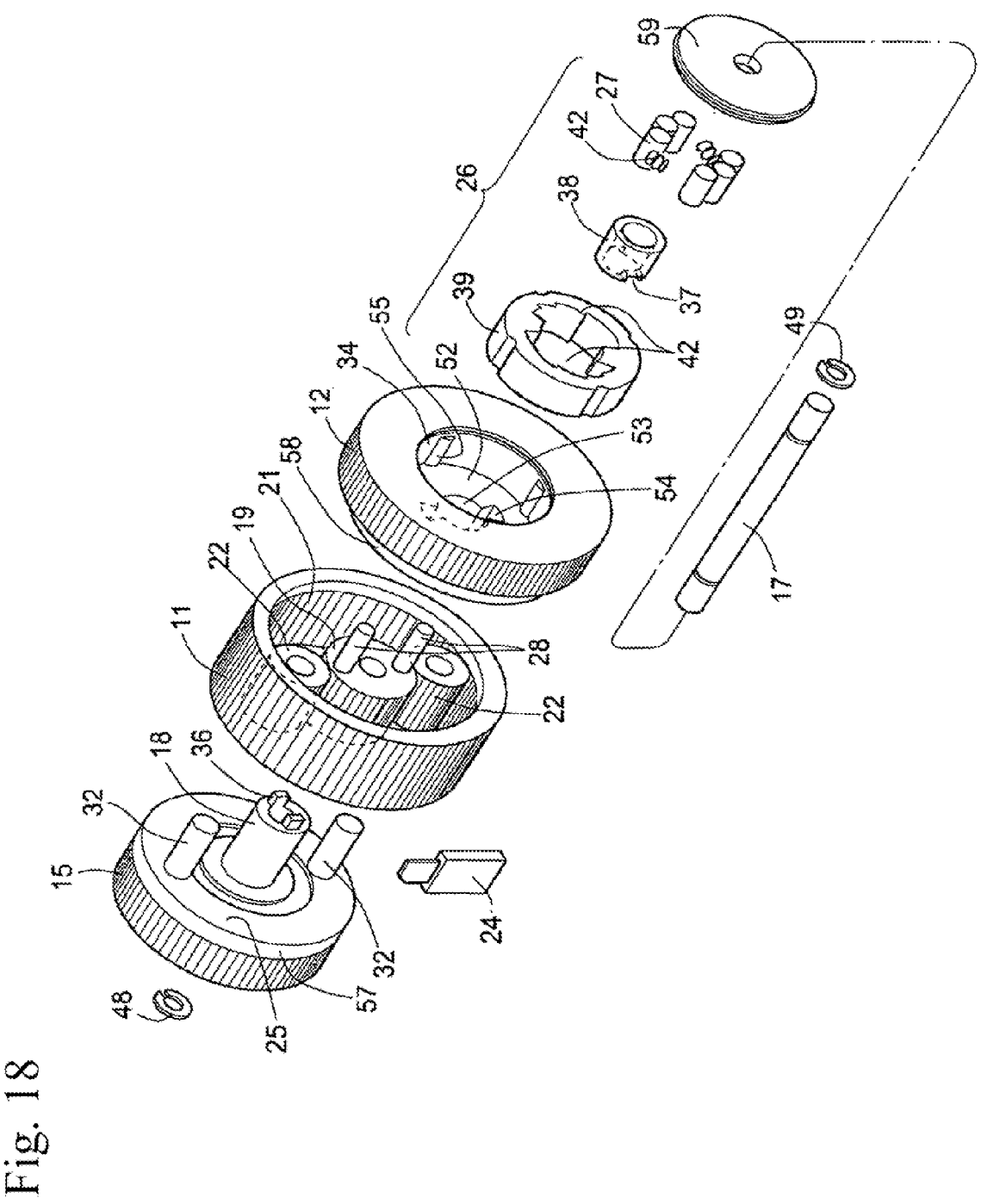
FIG. 18 is an exploded perspective view of Embodiment 3.

Rotary shafts 32 of the planetary gears 22 protrude in the axial direction from the inner end face of the carrier 23 (see FIG. 18). Also on the clutch mechanism 16 side end face of the sun gear 19, lock release pins 28 protrude in the axial direction from two positions axially symmetrical with each other.

The control mechanism 15 comprises, as described above, the control gear 25 integrated with the carrier 23, and is selectively locked or unlocked by the actuator 24 in the same manner as the previous embodiments.

The clutch mechanism 16 comprises, as shown in FIG. 17, a unidirectional roller clutch 26 mounted in a clutch-mounting portion 34 of the output gear 12. The clutch-mounting portion 34 is formed in the center of the output gear 12 and opens to the outer end face thereof. The clutch-mounting portion 34 has an inner annular support portion 52. The output gear 12 is rotatably fitted on the rotation transmission shaft 18 through a center hole 53 formed in the support portion 52.

Figure 19A:
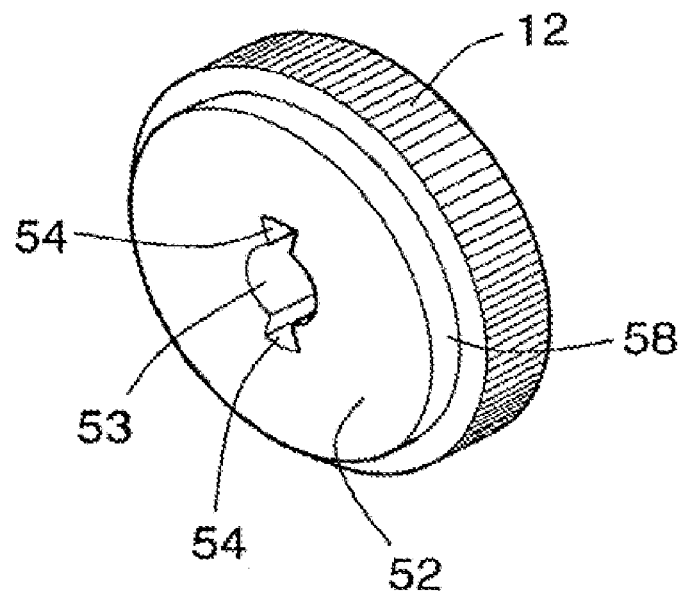
FIG. 19(a) is a sectional view of the output gear of Embodiment 3.

On two positions axially symmetrical with each other on the center hole 53 of the support member 52, fan-shaped engaging grooves 54 are formed (see FIG. 19(a)). The width of these engaging slots 54 in the rotation direction is set so that the lock release pins 28 can be axially inserted with clearance (see FIG. 19(b)). The sun gear 19 and the planetary gears 22 of the planetary gear mechanism 14 are in abutment with the inner end face of the output gear 12 so that they do not come off.

Figure 21:
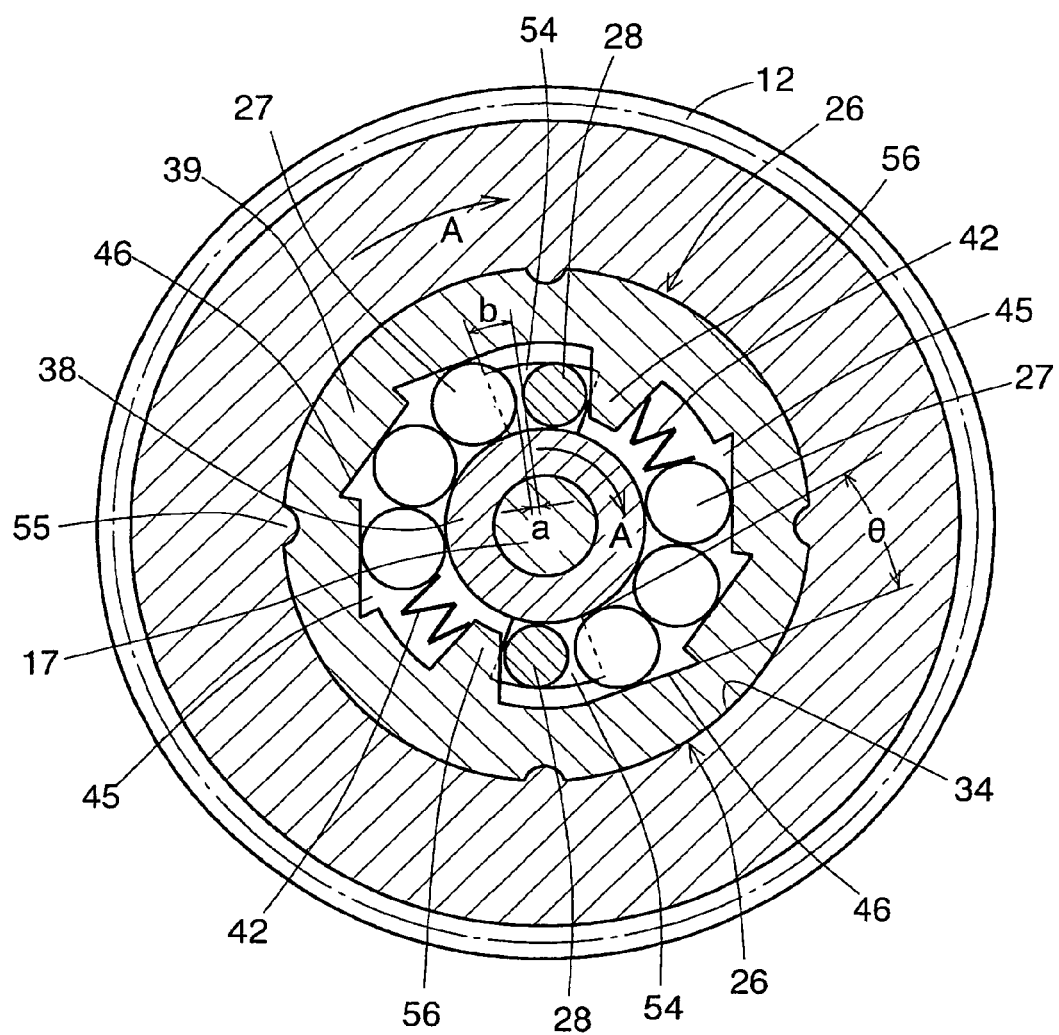
FIG. 21 is a sectional view taken along line $X_{10}$-$X_{10}$ of FIG. 17.

The roller clutch 26 is, as shown in FIG. 21, a unidirectional clutch comprising an inner race 38 rotatably fitted on the fixed shaft 17, an outer race 39 inserted in the inner-diameter surface of the clutch-mounting portion 34 through anti-rotation arrangements 55, and rollers 27 and bias springs 42 provided between the inner race 38 and the outer race 39.

On the inner-diameter surface of the outer race 39, two roller receiving spaces 45 are defined by pillar members 56 provided on the positions axially symmetrical with each other. In each roller receiving space 45, three cam surfaces 46 inclined in one direction are formed on the inner-diameter surface of the outer race 39. A roller 27 is disposed between each cam surface 46 and the outer-diameter surface of the inner race 38. The wedge angle on the contact point of each roller 27 is shown as θ. The bias springs 42 biasing the respective rollers 27 in the direction in which the wedge angle θ narrows (the normal rotation direction A) are each provided between the roller 27 at the end of the direction in which the wedge angle θ expands and the pillar portion 56.

In each roller receiving space 45 of the roller clutch 26, one of the lock release pins 28 is inserted in the axial direction between the roller 27 on the end of the direction in which the wedge angle θ narrows and the pillar portion 56 circumferentially facing that roller 27.

Figure 19B:
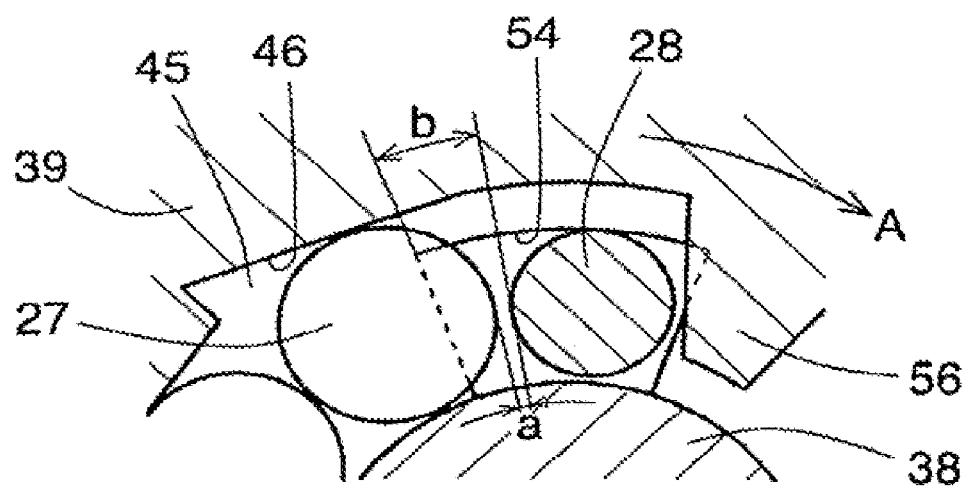
FIG. 19(b) is a sectional view of the roller clutch of Embodiment 3.

In the portion where each lock release pin 28 is inserted in the engaging groove 54, as shown in FIG. 19(b), in a locked status, a clearance in the rotation direction, namely, a control clearance b, is provided between the inner wall of the groove 54 on the lagging side of the normal rotation direction A and the lock release pin 18. This control clearance b is formed so that it is slightly larger than the clearance a defined between the lock release pin 28 and the roller 27 in the locked status (b>a).

After the roller clutch 26 is mounted in the clutch-mounting portion 34, its open end is closed by a lid 59. The lid 59 is rotatably fitted on the fixed shaft 17 and supports the outer end of the output gear 12.

As shown in FIG. 17, on the outer-diameter surface of the inner end of the control gear 25 integrated with the carrier 23 and on the outer-diameter surface of the inner end of the output gear 12 axially facing that outer-diameter surface of the control gear 25, guide faces 57 and 58 with the same outer diameter are defined, respectively. The input gear 11 integrated with the internal gear 21 is supported by these guide faces 57 and 58 so as to be rotatable relative to these guide surfaces.

The device for switching between normal and reverse drive force in Embodiment 3 is as described above, and its operation is now described.

As shown in FIG. 17, with the actuator 24 off and the control gear 25 not locked, when drive torque in the normal rotation direction A is applied to the input gear 11 (see the white arrow on the input gear 11 in FIG. 17), the internal gear 21 integrated with the input gear 11 as well as the planetary gears 22 are rotated in the normal rotation direction A (see FIG. 20). This rotates the carrier 23 and the control gear 25 in the normal rotation direction A. By the rotation of the control gear 25, the rotation transmission shaft 18 integrated with the control gear 25 and the inner race 38 rotate in the normal rotation direction A, and the roller clutch 26 is locked (see FIG. 21).

When the roller clutch 26 is locked, the outer race 39 and the output gear 12 are rotated in the normal rotation direction A. That is, the drive torque in the same normal rotation direction A and at the same speed as the input drive torque is produced (white arrow on the output gear 12 in FIG. 17).

In this operation, rotation torque acts on the planetary gears 22, and it provides torque in the reverse rotation direction B to the sun gear 19. While this makes the lock release pins 28 integrated with the sun gear 19 impart the force in the lock releasing direction to the rollers 27, because the rollers 27 are biased by the bias springs 42, the lock release pins 28 receive the spring force. This prevents the sun gear 19 from rotating in the reverse rotation direction B, and therefore lock is not released by the lock release pins 28. Also, the planetary gears 22 only revolve in the normal rotation direction A without rotating, and the sun gear 19 rotates in the same direction along with this revolution (see the normal rotation direction A for the sun gear 19 in FIG. 20).

Figure 22:
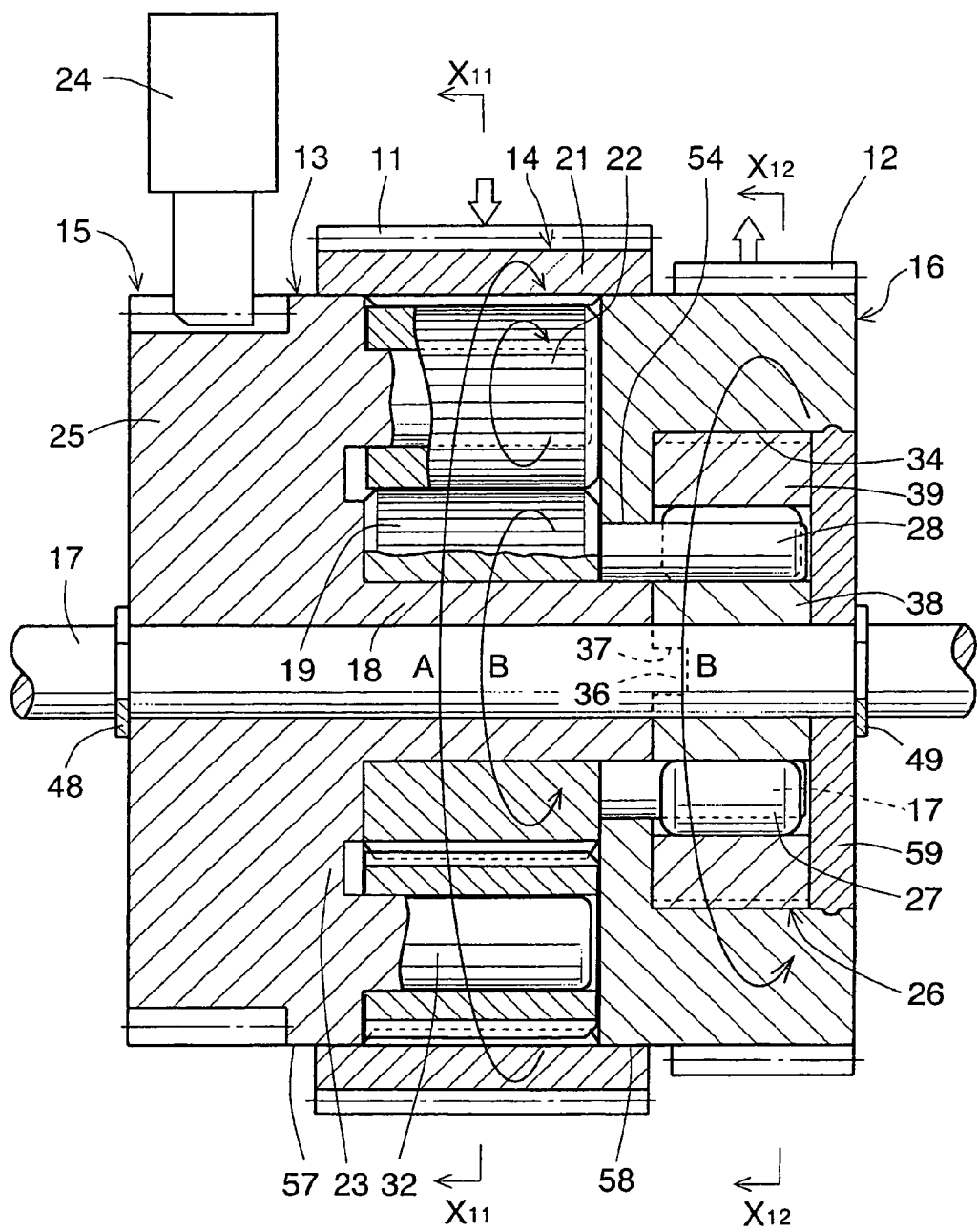
Figure 23:
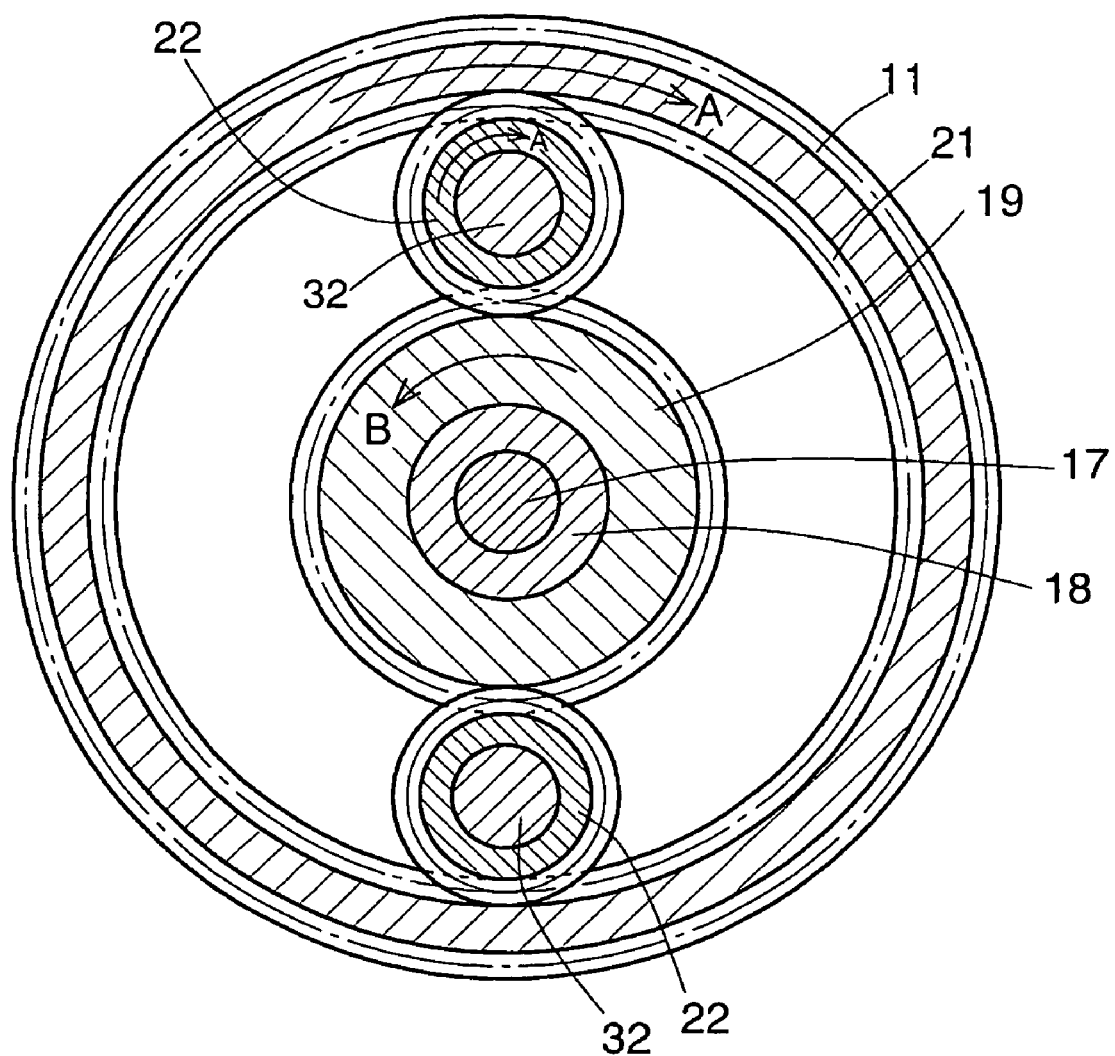
FIG. 23 is a sectional view taken along line $X_{11}$-$X_{11}$ of FIG. 22.
Figure 24:
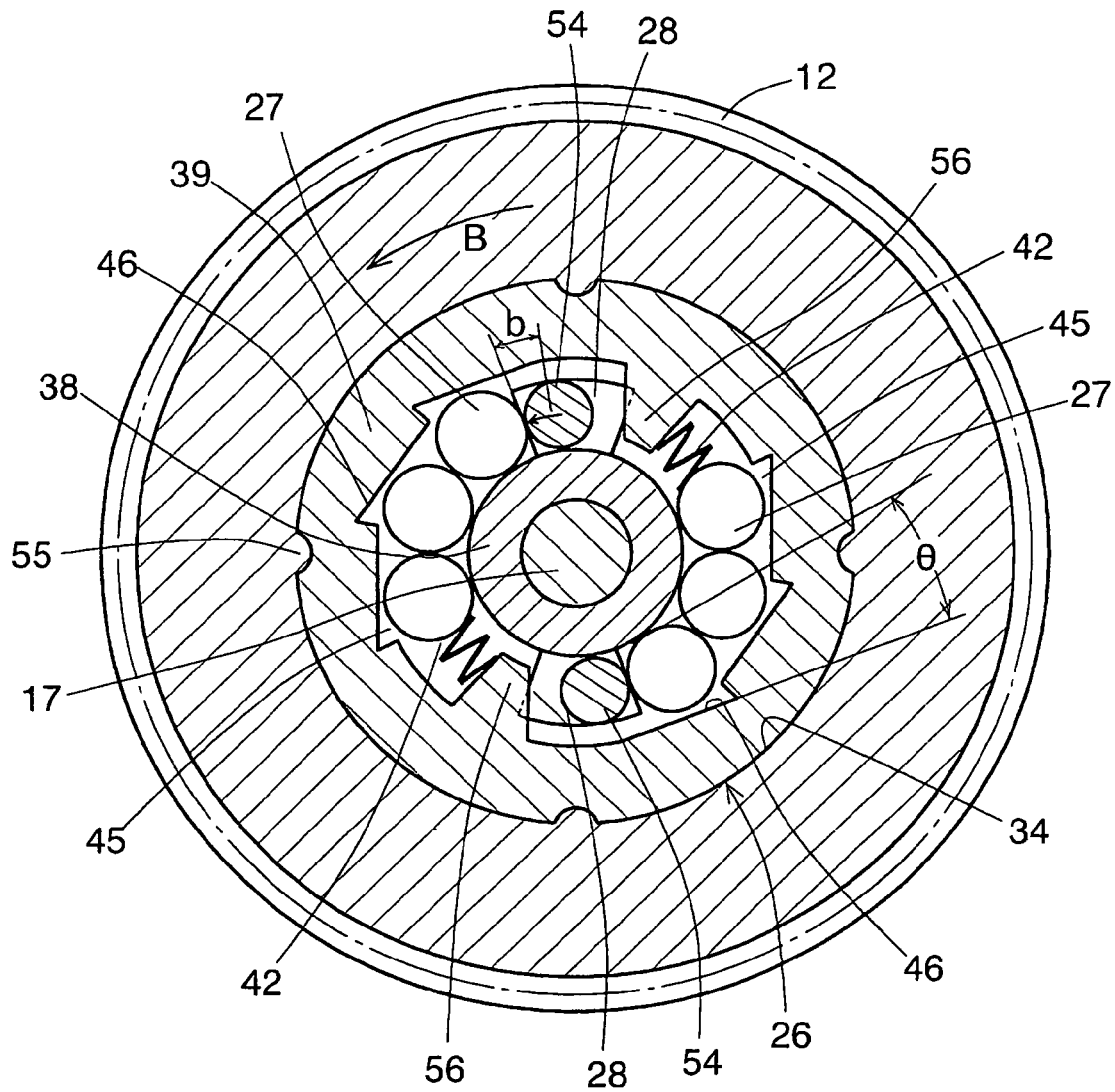
FIG. 24 is a sectional view taken along line $X_{12}$-$X_{12}$ of FIG. 22.
Figure 25:
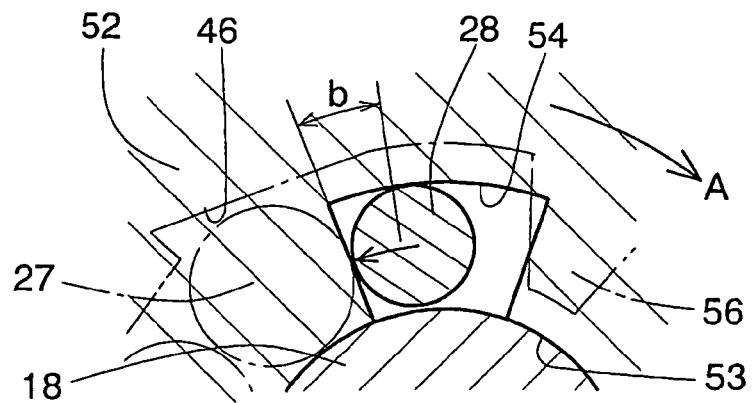
FIG. 25 is a sectional view of the roller clutch of Embodiment 3.

In this rotating state, when the actuator 24 is switched on and the control gear 25 becomes locked as shown in FIG. 22, the rotation transmission shaft 18 integrated with the control gear 25 and the inner race 38 of the roller clutch 26 engaged with the rotation transmission shaft 18 stop. Also, the revolution of the planetary gears 22 supported by the carrier 23 integrated with the control gear 25 stops. Thus, the planetary gears 22 only rotate.

The input gear 11 and the integrated internal gear 21 continue to rotate in the normal rotation direction A, and since the planetary gears 22 only rotate, the rotation of the sun gear 19 is switched in the reverse rotation direction B.

As the sun gear 19 rotates in the reverse rotation direction B, the lock release pins 28 provided on the sun gear 19 rotate beyond the clearance a (see FIG. 19(b)) and move the rollers 27 in the direction in which the wedge angle θ expands. This makes the roller clutch 26 unlocked. Thus, the torque transmission path through the roller clutch is blocked.

After lock is released, when the lock release pins 28 advance and contact the side walls of the engaging slots 54, the control clearances b decrease to zero (see FIG. 25), and the lock release pins 28 engage the support member 52 and the output gear 12 integral with the support member 52. This makes the output gear 12 rotate in the reverse rotation direction B. In other words, the rotation of the drive torque in the normal rotation direction A input to the input gear 11 is switched over to the reverse rotation direction B (see the white arrow on the output gear 12 in FIG. 22).

By setting the control clearance b larger than the clearance a (b>a), the smaller clearance is reduced to zero first, thus releasing the lock of the roller clutch 26 when the sun gear 19 rotate in the reverse rotation direction B. Then, the control clearance b decreases to zero and the output gear 12 begins to rotate in the reverse rotation direction B. By providing such a time difference, unlocking of the roller clutch 26 is reliably performed. This feature is the same in the next Embodiment 4.

If the direction of the roller clutch 26 is opposite, the output in the normal rotation direction A is obtained from the input in the reverse rotation direction B.

Embodiment 4

Embodiment 4 shown in FIGS. 26 to 33 is the same as the previous embodiments in that it comprises an input gear 11, an output gear 12 and a switch mechanism 13 that selectively switches the direction of the drive torque applied to the input gear 11 and transmitted to the output gear, and that the switch mechanism 13 comprises a planetary gear mechanism 14, a control mechanism 15 and a clutch mechanism 16.

However, in Embodiment 4, the planetary gear 14 is mounted in the radially inner side of the input gear 11 and the clutch mechanism 16 is mounted in the radially inner side of the control mechanism 15, and further the control mechanism 15 is provided between the input gear 11 and the output gear 12. The device of this embodiment is therefore compact in the axial direction.

Figure 26:
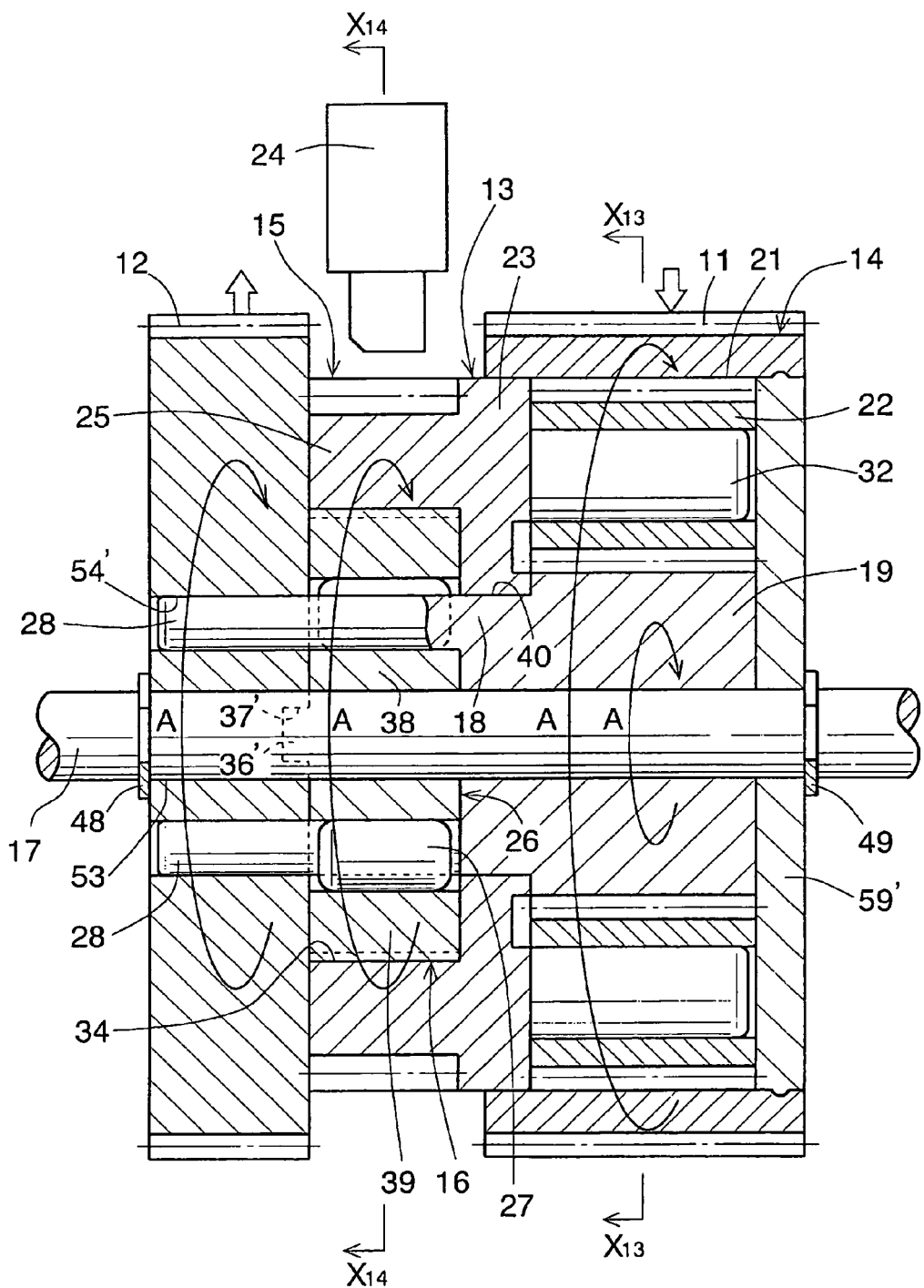
FIG. 26 is a sectional view of Embodiment 4 when the actuator is off.

The device of this embodiment comprises, as shown in FIG. 26, from left to right, the output gear 12, the control mechanism 15 in which the clutch mechanism 16 is mounted, and the input gear 11 in which the planetary gear mechanism 14 is mounted.

Figure 29:
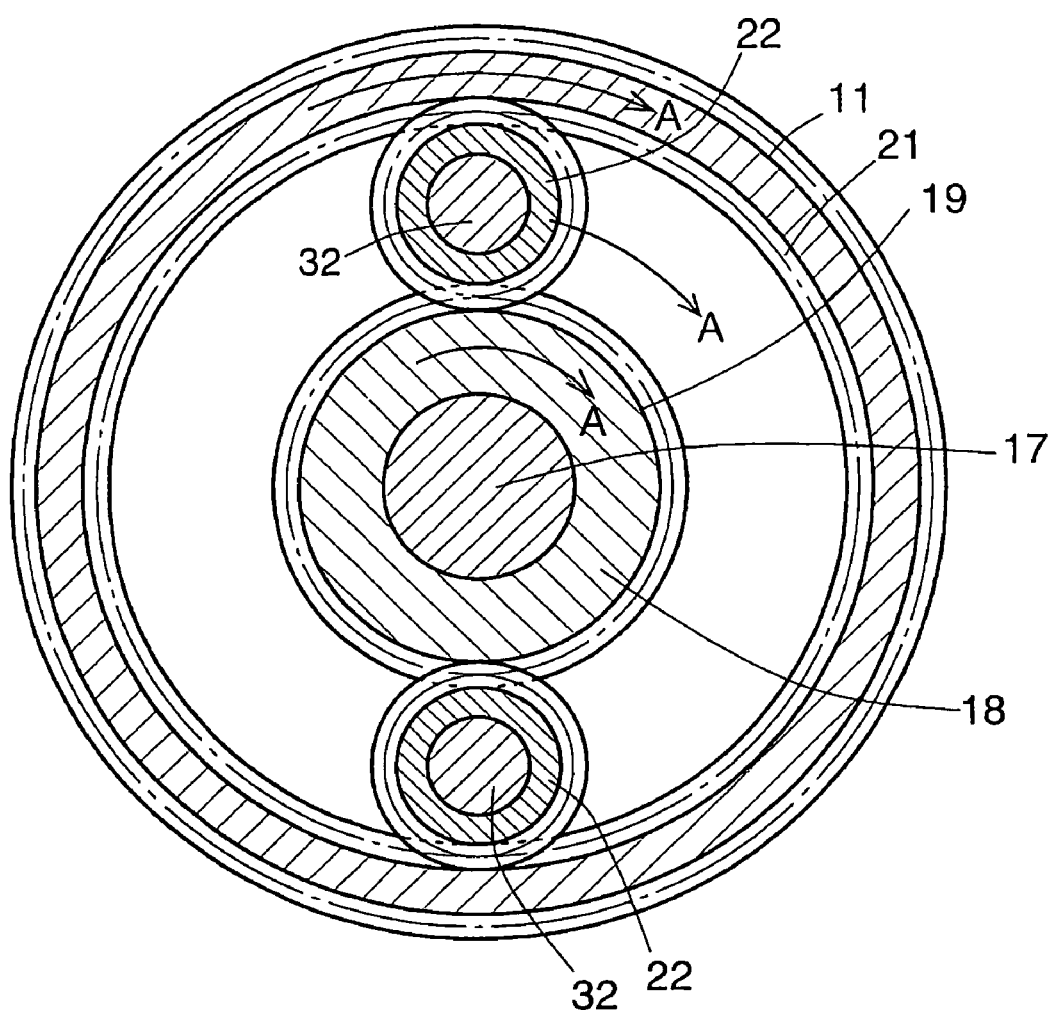
FIG. 29 is a sectional view taken along line $X_{13}$-$X_{13}$ of FIG. 26.

The planetary gear mechanism 14 comprises, as shown in FIGS. 26 and 29, a rotation transmission shaft 18 rotatably fitted on a fixed shaft 17, a sun gear 19 integrally provided on the outer-diameter surface of the rotation transmission shaft 18, an internal gear 21 provided around and coaxially with the sun gear 19, planetary gears 22 provided between the sun gear 19 and the internal gear 21, and a carrier 23 of the planetary gears 22 provided coaxially with and rotatably fitted to the outer-diameter surface of the rotation transmission shaft 18. The internal gear 21 is annularly formed and the input gear 11 is integrated on the outer-diameter surface of the internal gear 21.

A lid 59' is fitted to the open end of the internal gear 21 to occlude the planetary gears 22 and the peripheral members and to rotatably support the input gear 11 on the fixed shaft 17. The inner end of the inner-diameter surface of the input gear 11 is fitted on the outer-diameter surface of the carrier 23 to rotatably support the input gear 11 relative to the carrier 23.

The carrier 23 is integrated with the control gear 25 in the axial direction and rotatably fitted on the rotation transmission shaft 18. Rotary shafts 32 of the planetary gears 22 protrude in the axial direction from the end face of the carrier 23 on the side of the planetary gear mechanism 14. Lock release pins 28 protrude in the axial direction from two positions that are axially symmetrical with each other on the end face of the rotation transmission shaft 18 integrated with the sun gear 19 on the side of the clutch mechanism 16.

The control mechanism 15 comprises, as described above, the control gear 25 integrated with the carrier 23 of the planetary gear mechanism 14, and can be locked and unlocked by an actuator 24. On the center of the control gear 25, a clutch-mounting portion 34 open to the output gear 12 is provided. In the carrier 23 which forms the inner end wall of the clutch-mounting portion 34, a center hole 40 is formed (see FIGS. 26 and 27), and the center hole 40 is rotatably fitted on the rotation transmission shaft 18.

Figure 27:
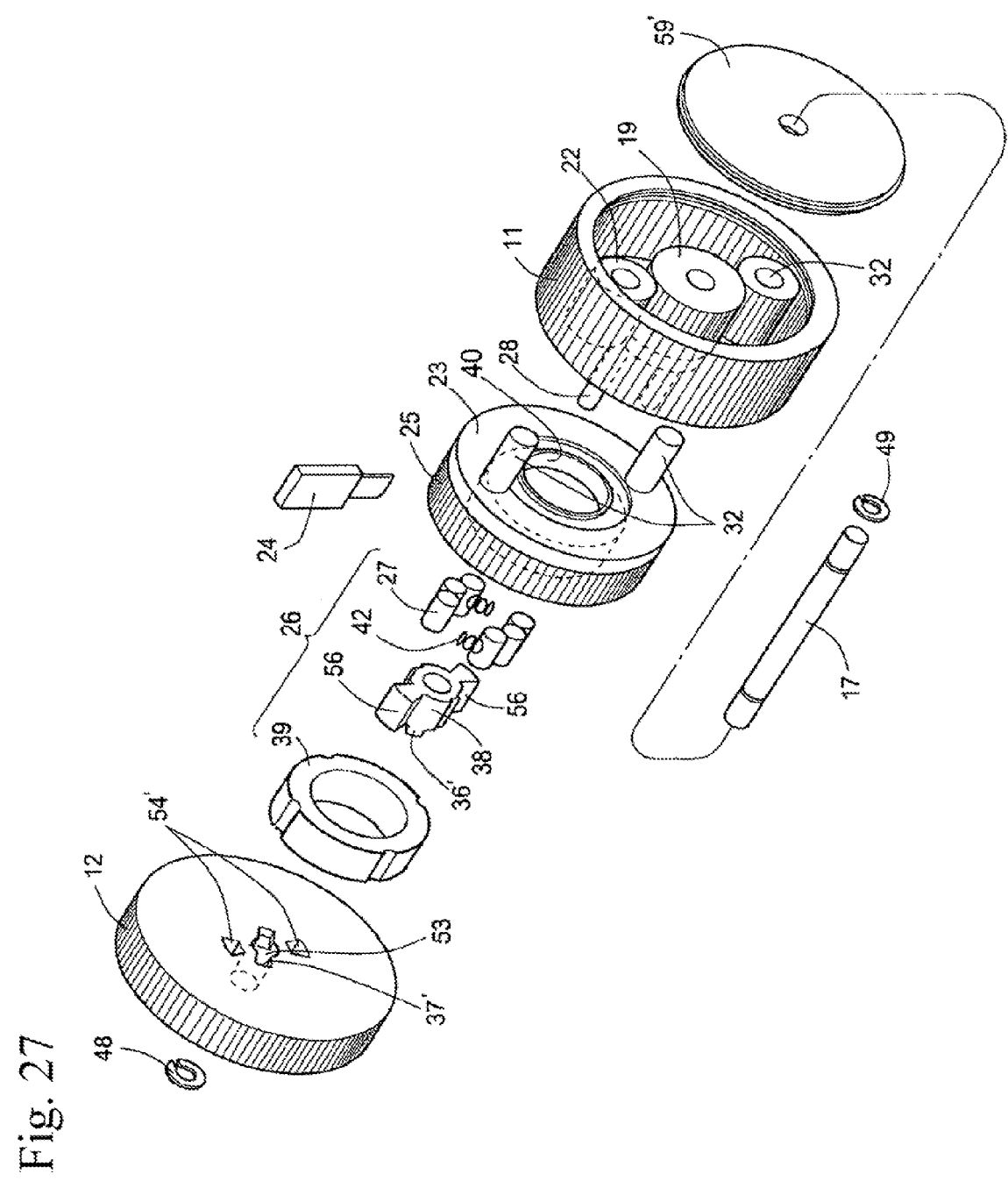
FIG. 27 is an exploded perspective view of Embodiment 4.

A pair of engaging holes 54' are formed on two positions axially symmetrical with each other on the output gear 12, as shown in FIG. 27. The width of these engaging holes 54' in the rotation direction is set so that the lock release pins 28 can be axially inserted with clearance (see FIG. 28(a)).

Figure 30:
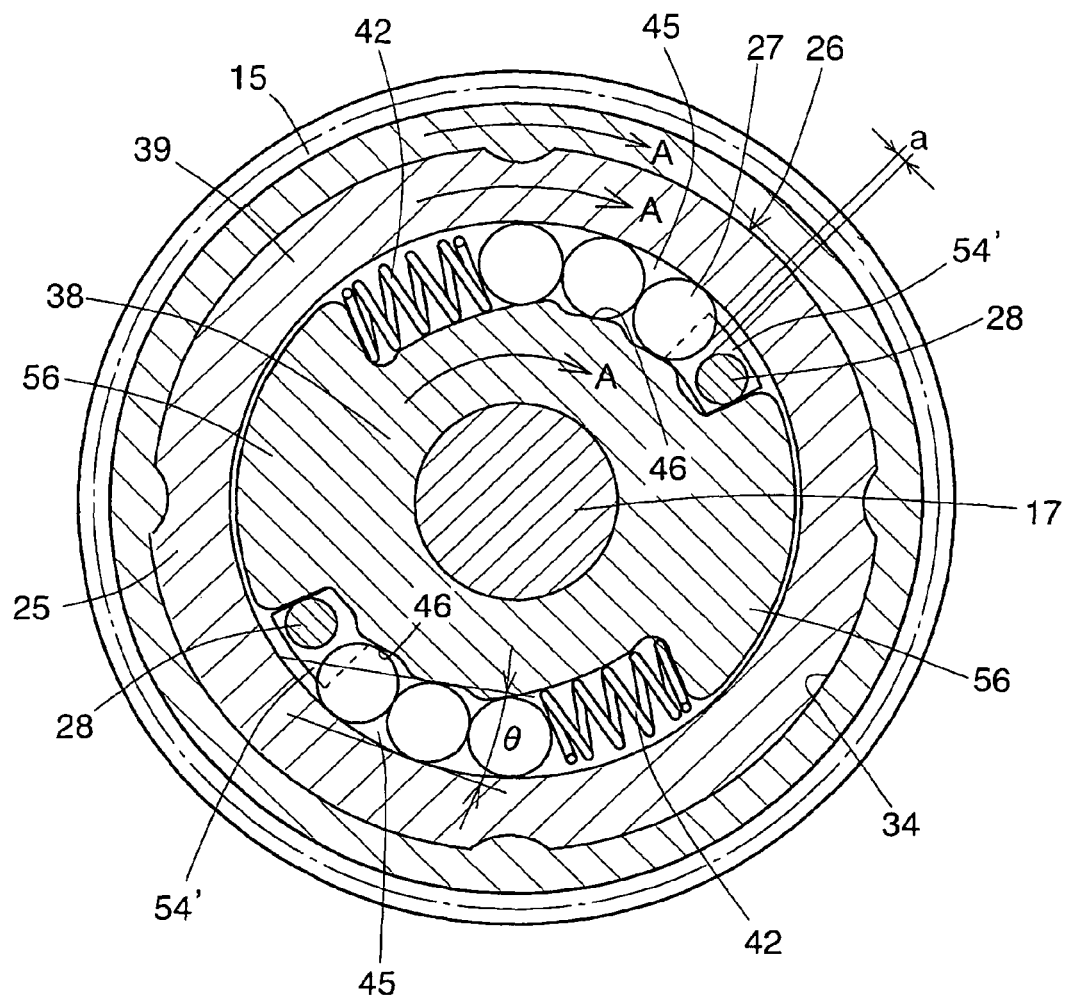
FIG. 30 is a sectional view taken along line $X_{14}$-$X_{14}$ of FIG. 26.

The roller clutch 26 is, as shown in FIG. 30, a unidirectional clutch comprising an inner race 38 rotatably fitted on the fixed shaft 17, an outer race 39 inserted in the inner-diameter surface of the clutch-mounting portion 34 through anti-rotation arrangements, and rollers 27 and bias springs 42 provided between the inner race 38 and the outer race 39.

On the inner-diameter surface of the outer race 39, two roller receiving spaces 45 are defined by pillar members 56 provided on the positions axially symmetrical with each other. In each roller receiving space 45, three cam surfaces 46 inclined in one direction are formed on the inner-diameter surface of the outer race 39. A roller 27 is disposed between each cam surface 46 and the outer-diameter surface of the inner race 38. The wedge angle on the contact point of each roller 27 is shown as θ. The bias springs 42 biasing the respective rollers 27 in the direction in which the wedge angle θ narrows (the normal rotation direction A) are each provided between the roller 27 at the end of the direction in which the wedge angle θ expands and the pillar portion 56.

In each roller receiving space 45 of the roller clutch 26, the lock release pin 28 is inserted in the axial direction between the roller 27 on the end of the direction in which the wedge angle θ narrows and the pillar portion 56 circumferentially facing that roller 27.

Figure 28A:
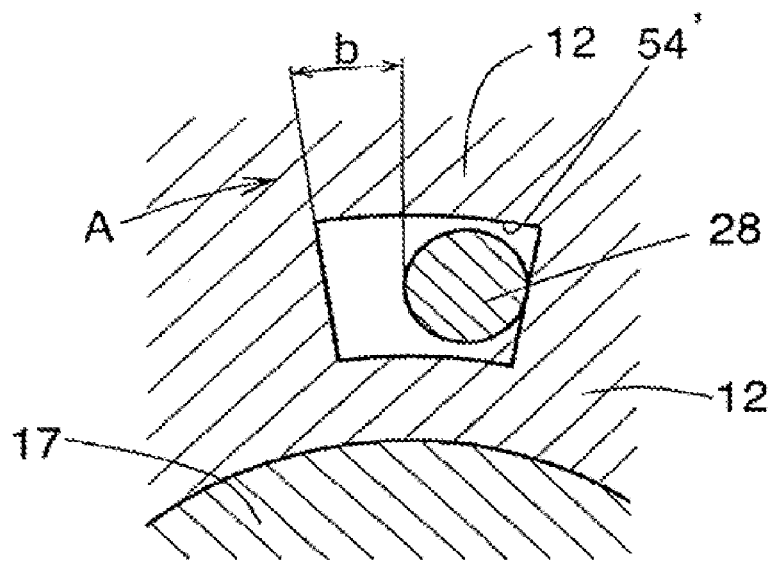
FIG. 28(a) is a sectional view of the output gear of Embodiment 4.
Figure 28B:
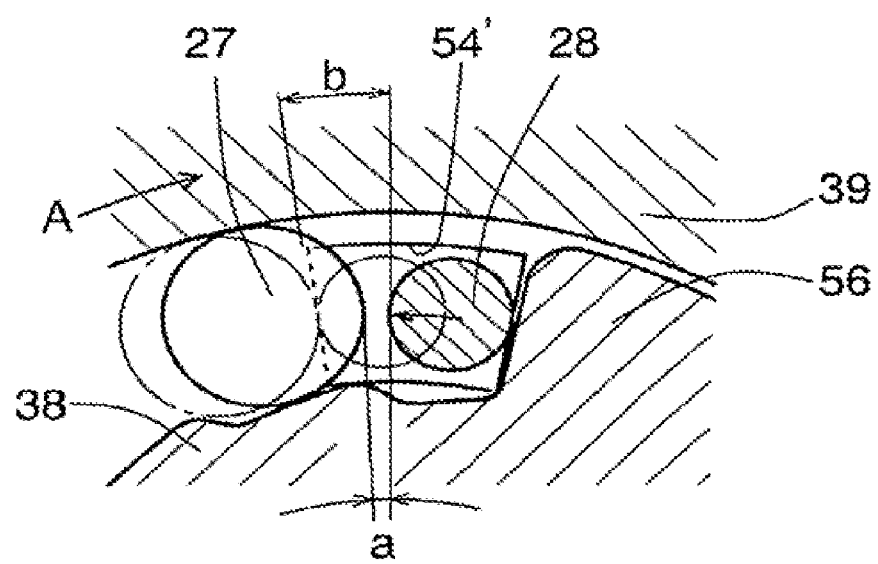
FIG. 28(b) is a sectional view of the roller clutch of Embodiment 4.

In the portion where the lock release pin 28 is inserted in the engaging hole 54', as shown in FIGS. 28(a) and 28(b), in a locked status, a control clearance b is provided between the inner wall of hole 54' on the lagging side of the normal rotation direction A and the lock release pin 18. This control clearance b is formed so that it is larger than the clearance a defined between the lock release pin 28 and the roller 27 in a locked status (b>a).

The inner race 38 of the roller clutch 26 and the output gear 12 are rotationally integrated with each other by the engagement of an engaging projection 36' and an engaging recess 37' (see FIG. 26).

The device for switching between normal and reverse drive force of Embodiment 4 is as described above, and its operation is now described.

As shown in FIG. 26, with the actuator 24 off and the control gear 25 not locked, when drive torque in the normal rotation direction A is applied to the input gear 11 (see the white arrow on the input gear 11 in FIG. 26), the planetary gears 22 only revolves in the normal rotation direction A, thus rotating the control gear 25 in the normal rotation direction A. As the control gear 25 rotates in the normal rotation direction A, the outer race 39 integrated with the control gear 25 rotates in the normal rotation direction A, and the roller clutch is locked (see FIG. 30).

When the roller clutch 26 is locked, the outer race 39, the rollers 27, the inner race 38 and the output gear 12 engaged with the inner race 38 are rotated in the normal rotation direction A. That is, the drive torque in the same normal rotation direction A as the input torque and increased by the planetary gear mechanism 14 is produced (white arrow on the output gear 12 in FIG. 26).

In this operation, rotation torque acts on the planetary gears 22, and it provides torque in the reverse rotation direction B to the sun gear 19. While this makes the lock release pins 28 integrated with the sun gear 19 impart the force in the lock releasing direction to the rollers 27, because the rollers 27 are biased by the bias springs 42, the lock release pins 28 receive the spring force. This prevents the sun gear 19 from rotating in the reverse rotation direction B, and therefore lock is not released. Also, the planetary gears 22 only revolve in the normal rotation direction A without rotating, and the sun gear 19 also rotates in the same direction along with this revolution (see the normal rotation direction A for the sun gear 19 in FIG. 29).

Figure 31:
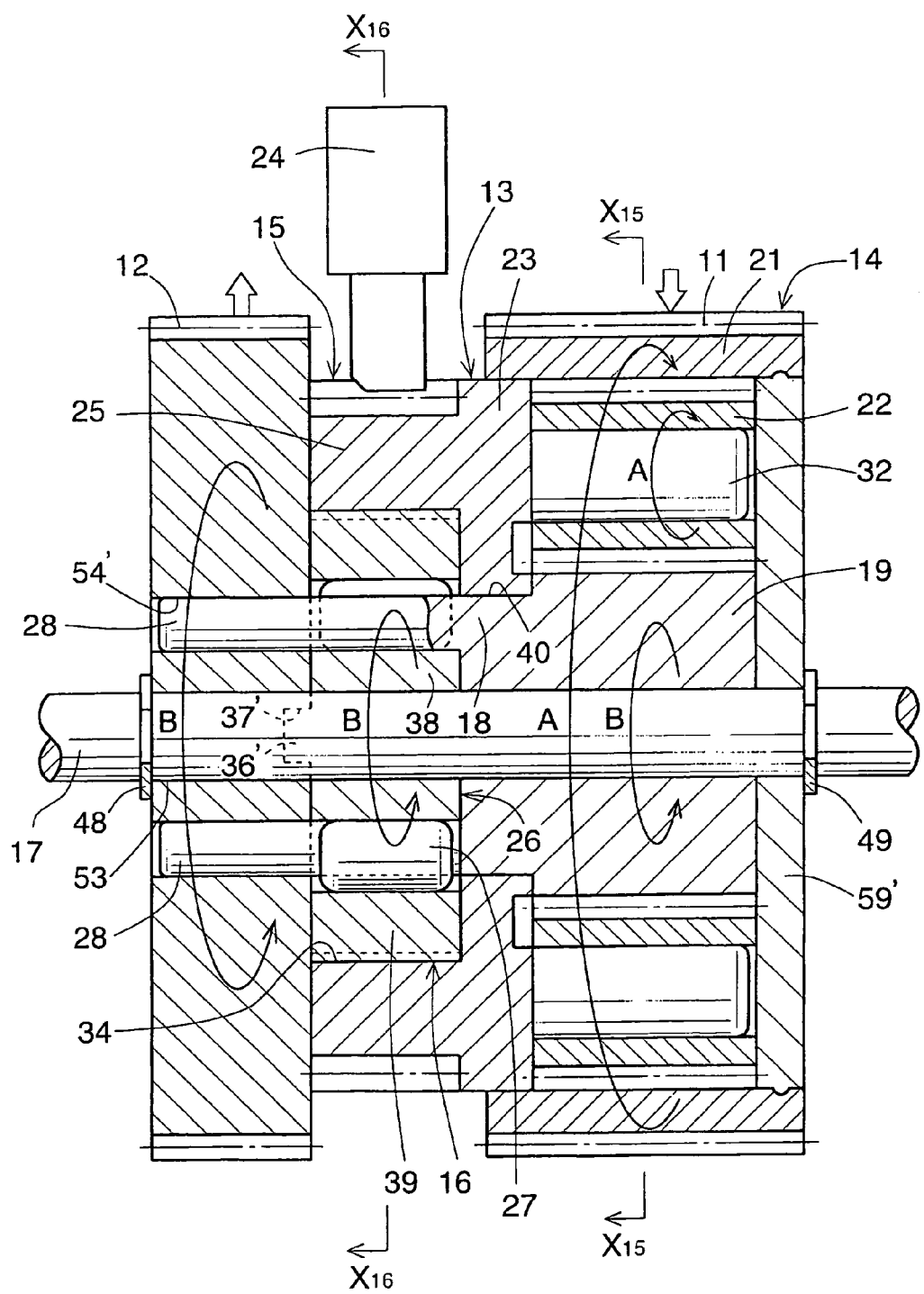
Figure 32:
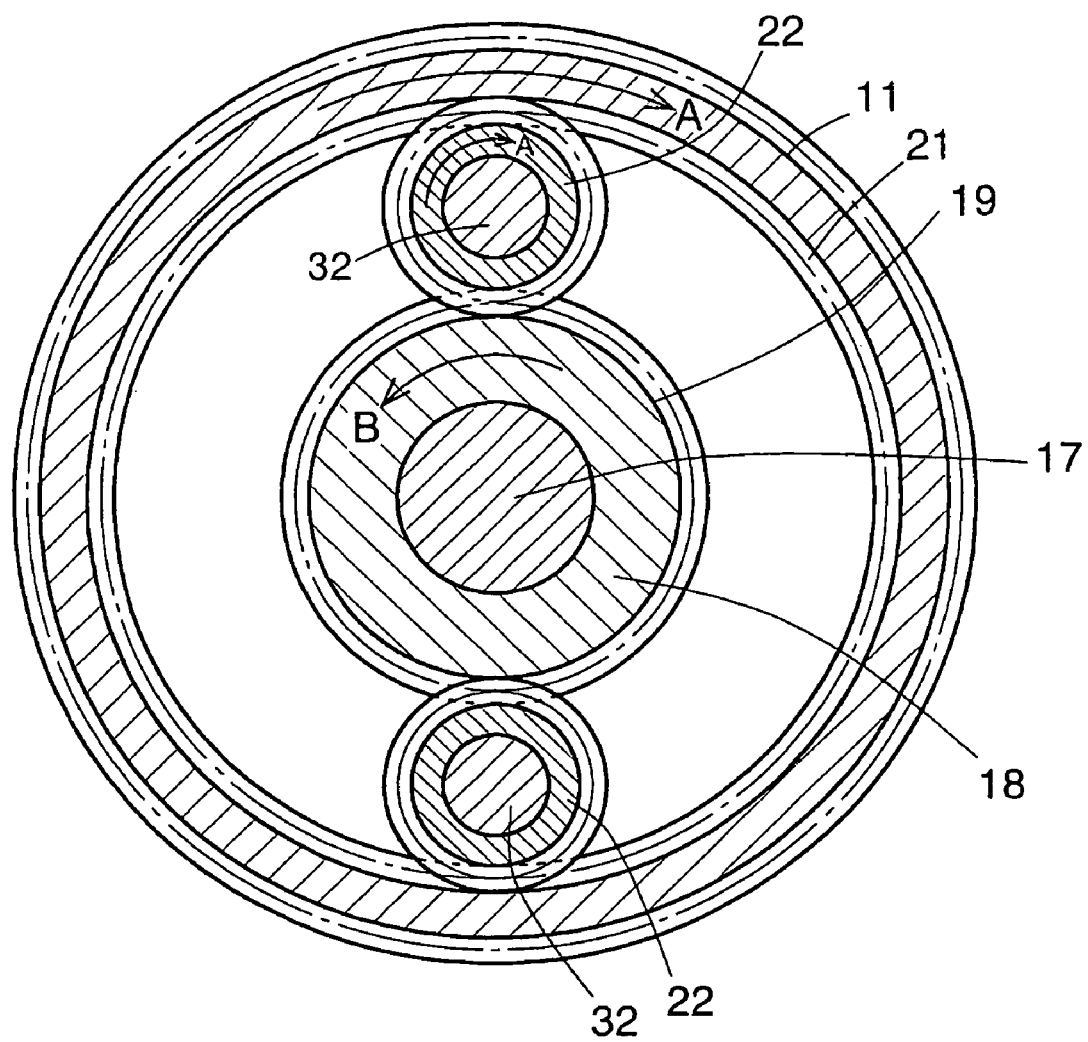
FIG. 32 is a sectional view taken along line $X_{15}$-$X_{15}$ of FIG. 31.
Figure 33:
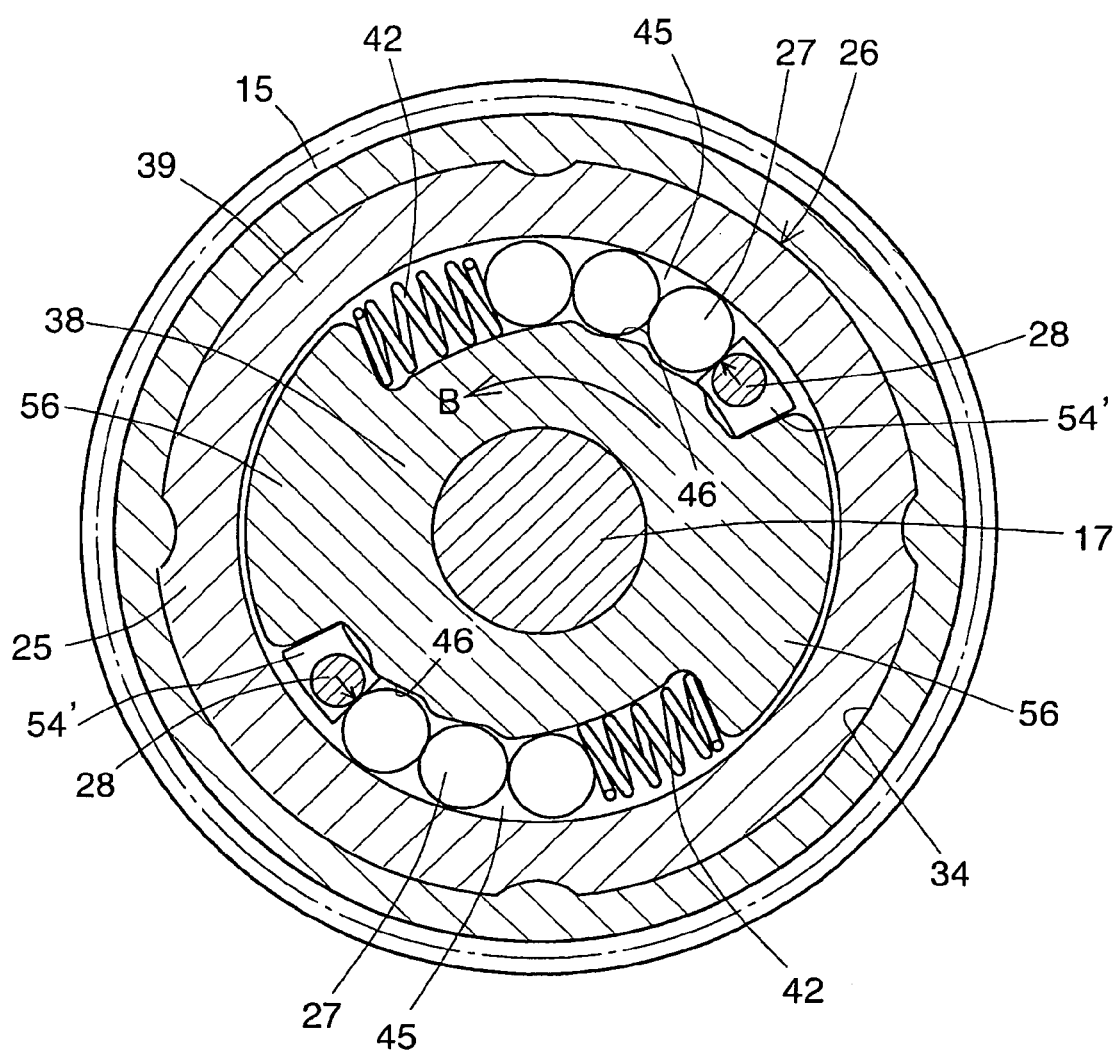
FIG. 33 is a sectional view taken along line $X_{16}$-$X_{16}$ of FIG. 31.

In this state, when the actuator 24 is turned on and the control gear 25 becomes locked as shown in FIG. 31, the outer race 39 integrated with the control gear 25 stops. Also, the revolution of the planetary gear 22 supported by the carrier 23 integrated with the control gear 25 stops and the planetary gears 22 only rotate.

The input gear 11 and the integrated internal gear 21 continue to rotate in the normal rotation direction A, and since the planetary gears 22 only rotate, the rotation of the sun gear 19 is switched to the reverse rotation direction B.

As the sun gear 19 rotates in the reverse rotation direction B, the lock release pins 28 provided on the sun gear 19 rotate beyond the clearance a (see FIG. 28(b)) and move the rollers 27 in the direction in which the wedge angle θ expands. This makes the roller clutch 26 unlocked. Thus, the torque transmission path through the roller clutch is blocked.

After lock is released, when the lock release pins 28 advance and contact the side walls of the engaging holes 54', the control clearances b decrease to zero and the lock release pins 28 engage the output gear 12. This makes the output gear 12 rotate in the reverse rotation direction B. In other words, the rotation of the drive torque in the normal rotation direction A input to the input gear 11 is switched to the reverse rotation direction B (see the white arrow on the output gear 12 in FIG. 31).

When the direction of the roller clutch 26 is opposite, the output in the normal rotation direction A is obtained from the input in the reverse rotation direction B.

Embodiment 5

Embodiment 5 shown in FIGS. 34 to 42 is the same as the previous embodiments in that it comprises an input gear 11, an output gear 12 and a switch mechanism 13 that selectively switches the direction of the drive torque applied to the input gear 11 and transmitted to the output gear 12, and that the switch mechanism 13 comprises a planetary gear mechanism 14, a control mechanism 15 and a clutch mechanism 16.

However, in Embodiment 5, the planetary gear mechanism 14 and the clutch mechanism 16 are both integrally mounted in the radially inner side of the input gear 11.

Figure 34:
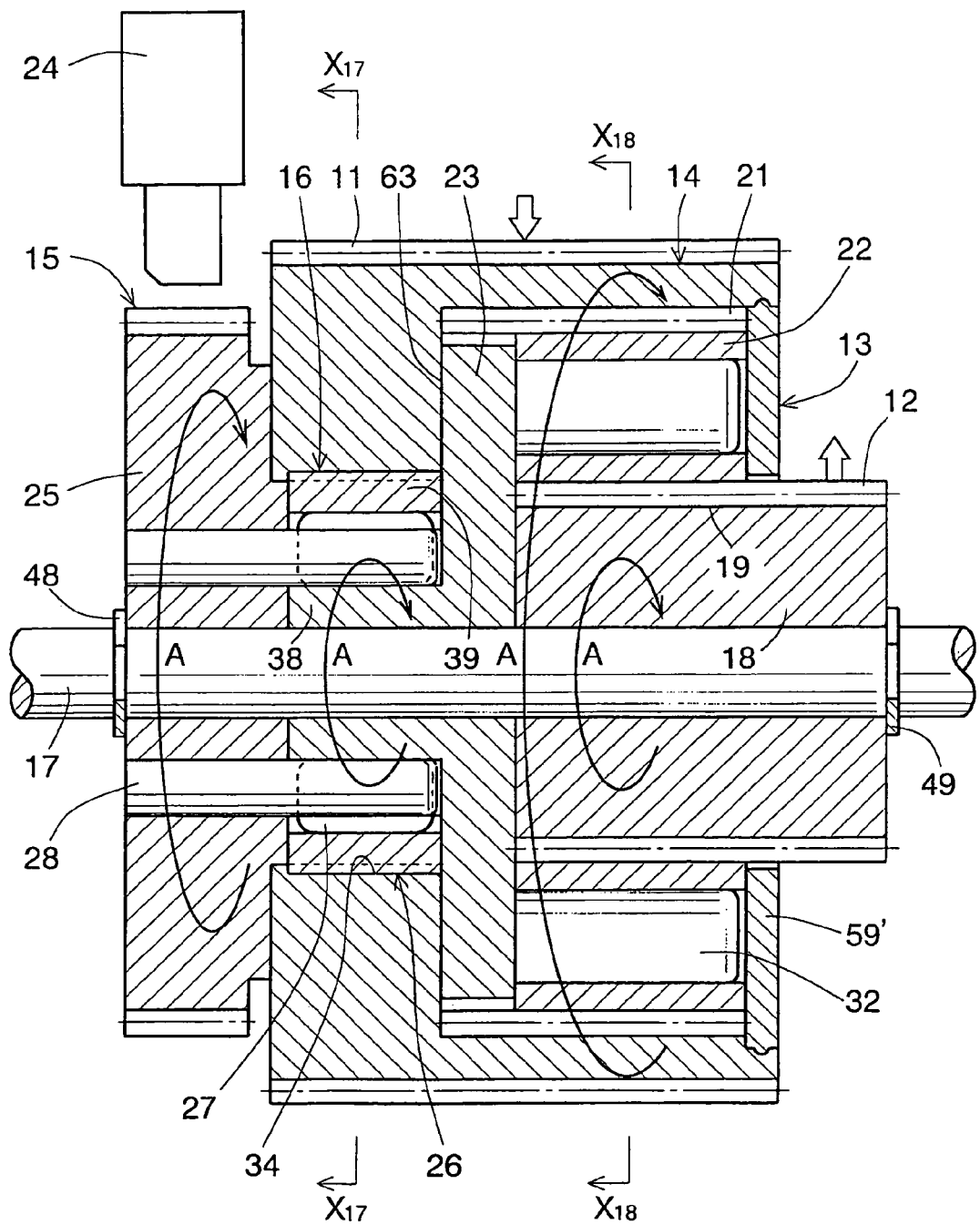
FIG. 34 is a sectional view of Embodiment 5 when the actuator is off.
Figure 35A:
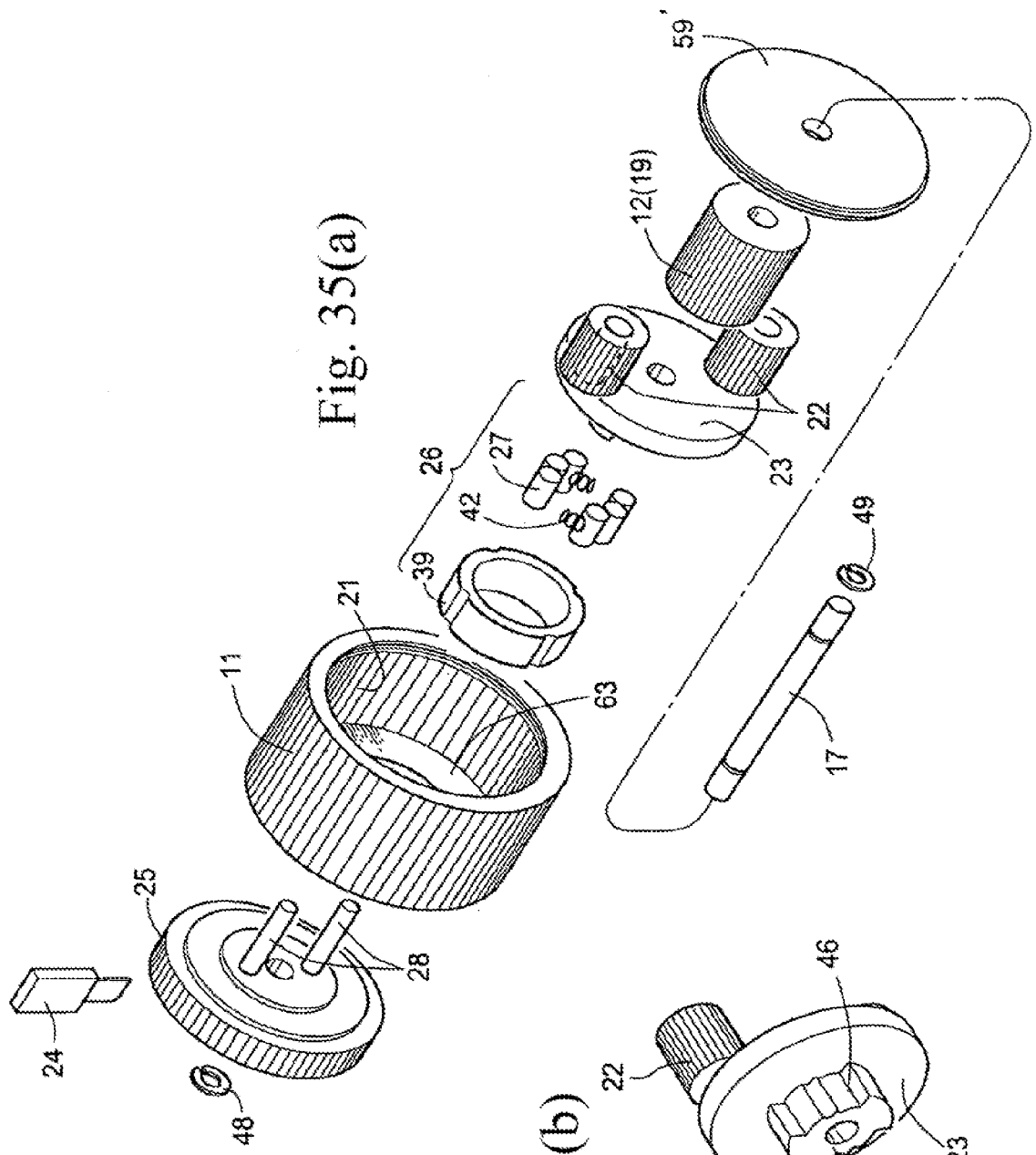
FIG. 35(a) is an exploded perspective view of Embodiment 5.
Figure 35B:
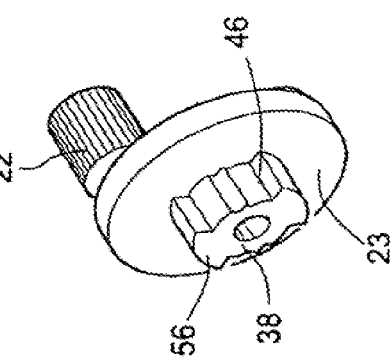
FIG. 35(b) is a perspective view of the carrier of Embodiment 5.

But in this embodiment, as shown in FIG. 34, the control mechanism 15, the clutch mechanism 16 and the planetary gear mechanism 14 provided axially next to the clutch mechanism 16 are mounted in the input gear 11.

The input gear 11 is relatively long in the axial direction, and an internal gear 21 of the planetary gear mechanism 14 is provided integrally in the range slightly more than half of its inner-diameter surface. On the inner-diameter surface of the remaining portion of the input gear 11, which has a smaller diameter than the internal gear 21 because of a shoulder 63, a clutch-mounting portion 34 is provided.

The planetary gear mechanism 14 comprises a rotation transmission shaft 18 rotatably fitted on a fixed shaft 17, a sun gear 19 integrated with the outer-diameter surface of the rotation transmission shaft 18 and facing the internal gear 21 in the diametrical direction, planetary gears 22 provided between the sun gear 19 and the internal gear 21, and a carrier 23 rotatably fitted on the outer-diameter surface of the fixed shaft 17.

The carrier 23 is rotatably provided between opposed the shoulder 63 of the input gear 11 and the surfaces of the rotation transmission shaft 18 and the sun gear 19 that axially face the shoulder 63. Rotary shafts 32 protrude from the side of the carrier 23 on the side of the rotation transmission shaft 18, and the planetary gears 22 are fitted on and supported by the respective rotary shafts 32.

A lid 59' is fitted to the open end of the internal gear 21 at its portion where planetary gears 22 are provided to prevent the planetary gears 22 from coming off. A portion of the sun gear 19 protrudes from the inner-diameter surface of the lid 59', and this protruding portion serves as the output gear 12.

An inner race 38 forming the clutch mechanism 16 is integrated with the carrier 23 at the central portion of its end face on the side of the shoulder 63. The inner race 38, an outer race 39, rollers 27 and bias springs 42 provided between the inner and outer races 38 and 39 are mounted between the fixed shaft 17 and the clutch-mounting portion 34.

Figure 36:
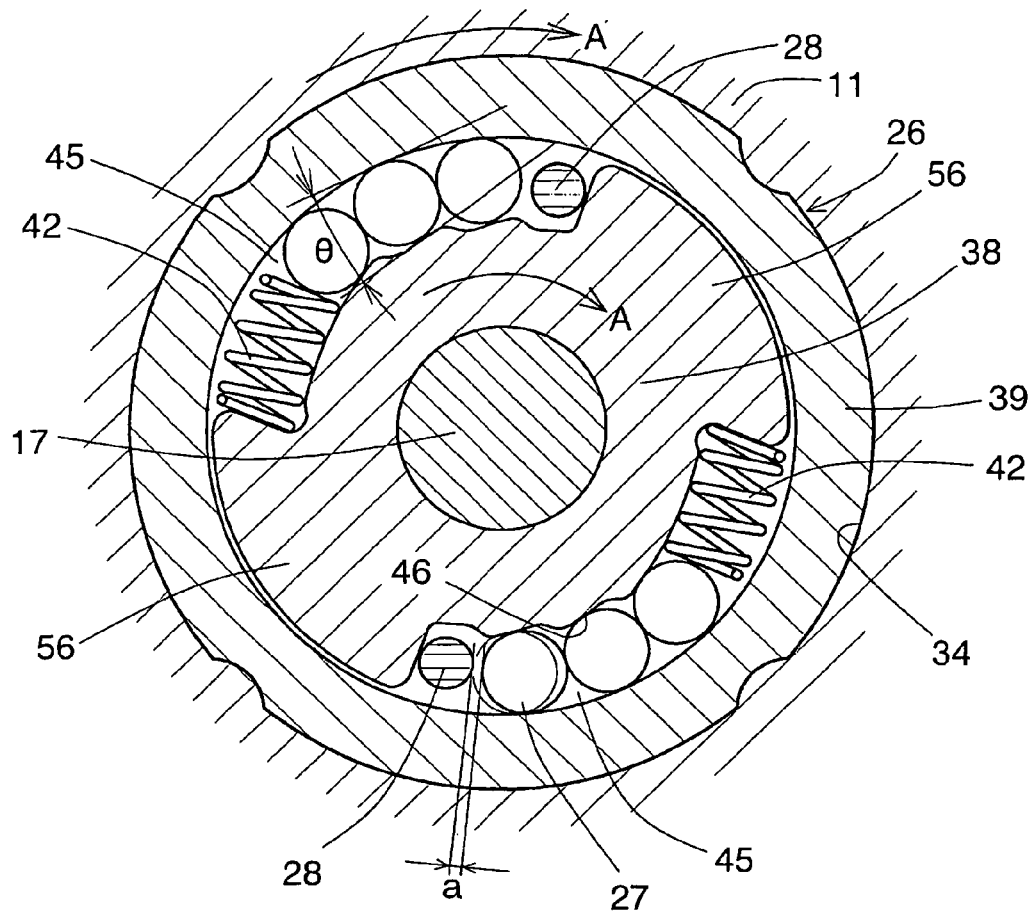
FIG. 36 is a sectional view taken along line $X_{17}$-$X_{17}$ of FIG. 34.

On the outer-diameter surface of the inner race 38, two roller receiving spaces 45 are defined by pillar members 56 provided on the positions axially symmetrical with each other (see FIG. 36). In each roller receiving space 45, three cam surfaces 46 inclined in one direction are formed on the outer-diameter surface of the inner race 38. One of the rollers 27 is disposed between each cam surface 46 and the inner-diameter surface of the outer race 39. The wedge angle on the contact point of each roller 27 is shown as θ. The bias springs 42 biasing each roller 27 in the direction in which the wedge angle θ narrows (the normal rotation direction A) are each provided between the roller 27 on the end of the direction in which the wedge angle θ expands and the pillar portion 56 circumferentially facing that roller 27.

In each roller receiving space 45 of the roller clutch 26, one of the lock release pins 28 is inserted in the axial direction between the roller 27 on the end of the direction in which the wedge angle θ narrows and the pillar portion 56 circumferentially facing that roller 27. The lock release pins 28 protrude in the axial direction from the inner end face of the control gear 25.

Figure 37:
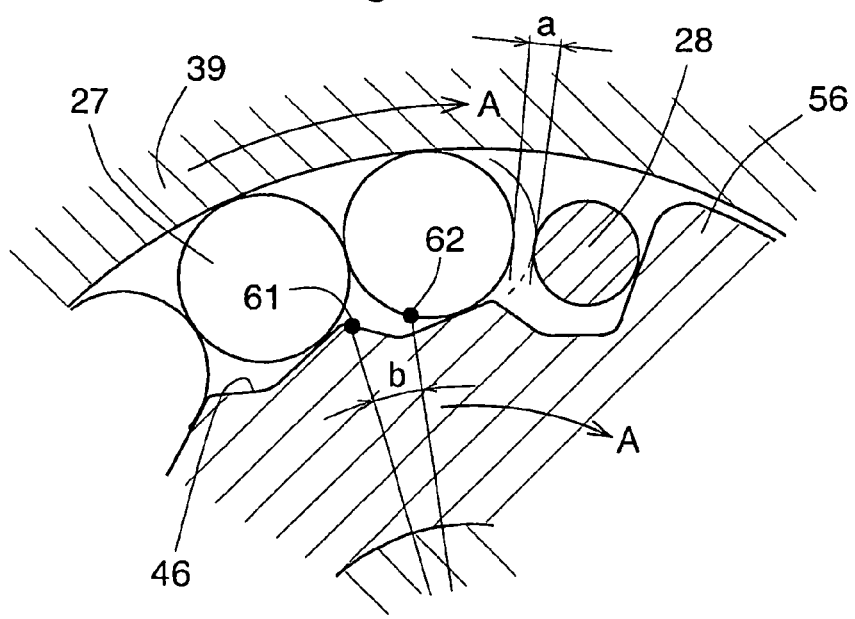
FIG. 37 is a sectional view of the roller clutch of Embodiment 5.
Figure 38:
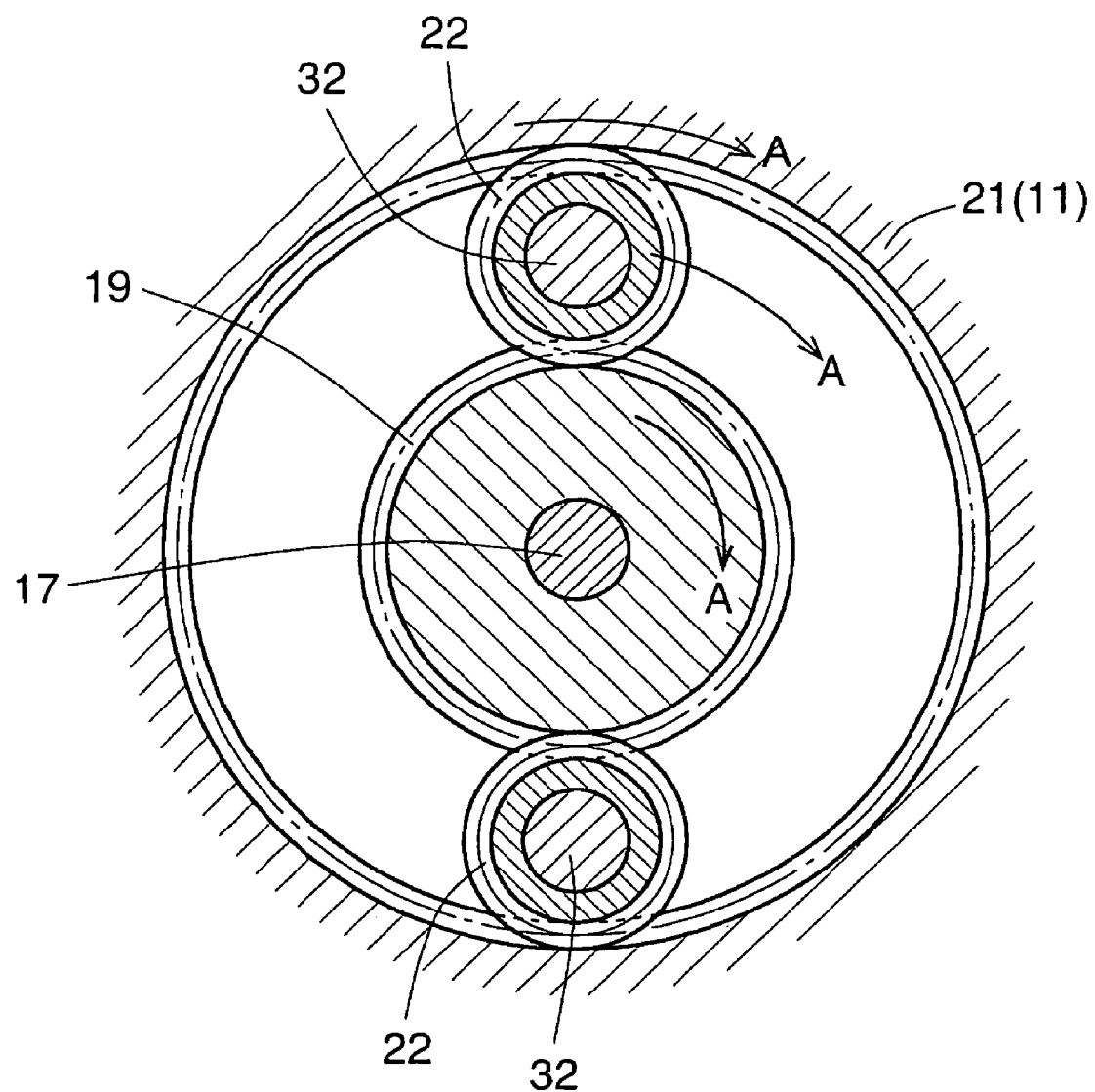
FIG. 38 is a sectional view taken along line $X_{18}$-$X_{18}$ of FIG. 34.

In a portion where each lock release pin 28 is inserted in the roller clutch 26, a predetermined clearance is provided in the rotation direction as shown in FIG. 37. Also when the roller clutch 26 is locked, a predetermined control clearance b (b>a) is provided between a shoulder portion 61 of each cam surface 46 to which the wedge angle θ expands and a portion 62 of the corresponding roller 27.

The device for switching between normal and reverse drive force in Embodiment 5 is as described above, and its operation is now described.

As shown in FIG. 34, with the actuator 24 off and the control gear 15 not locked, when drive torque in the normal rotation direction A is applied to the input gear 11 (see the white arrow on the input gear 11 in FIG. 34), the outer race 39 integrated with the input gear 11 rotates in the normal rotation direction A and the roller clutch 26 is locked (see FIG. 36).

At this time, the torque is applied also to the planetary gears 22 through the internal gear 21 which is integrated with the input gear 11. However, since a load is being applied to the sun gear 19 through the output gear 12, the planetary gears 22 neither rotate nor revolve. Therefore, the carrier 23 and the inner race 38 integrated with the carrier 23 are at a stop.

Since the roller clutch 26 is locked in this state, the outer race 39, the rollers 27, the inner race 38 and the carrier 23 integrated with the inner race 38 are rotated in the normal rotation direction A. The planetary gears 22 only revolve in the normal rotation direction A and rotate the sun gear 19 in the same direction (see FIG. 38). As a result, a drive torque in the same normal rotation direction A as the input drive torque is produced from the output gear 12 (see the white arrow on the output gear 12 in FIG. 34).

At this time, since the control gear 25 is unlocked, the lock release pins 28 are pushed by the rollers 27 in the roller clutch 26, which are rotating in the normal rotation direction A, and rotated in the same direction (see the dot-dashed line in FIG. 36). Therefore, while the clearance a is zero in this state, the control clearance b exists between the portion 62 of the roller 27 and the shoulder portion 61 of the cam surface 46 (see FIG. 37) because the roller clutch 26 is locked.

Figure 39:
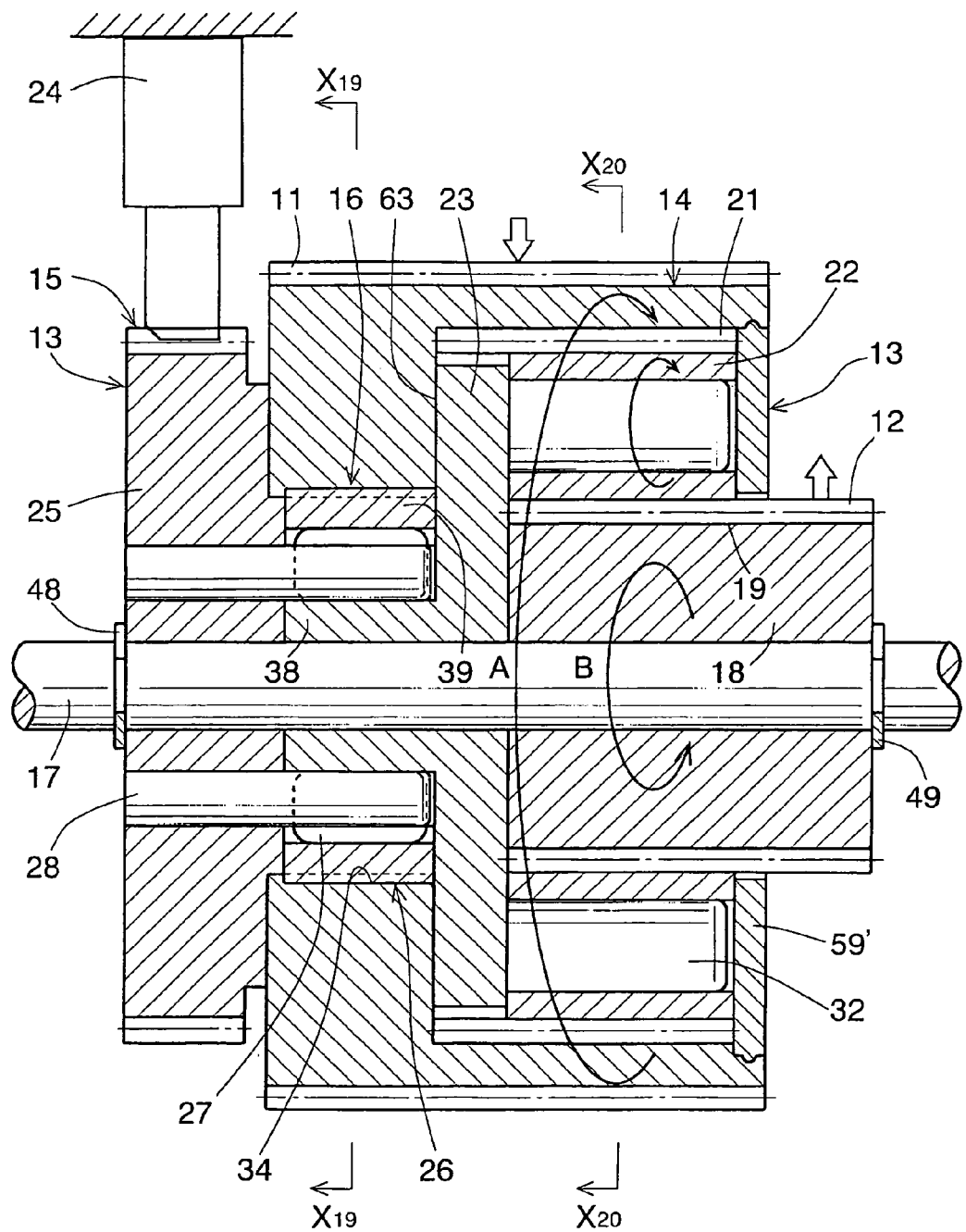
Figure 40:
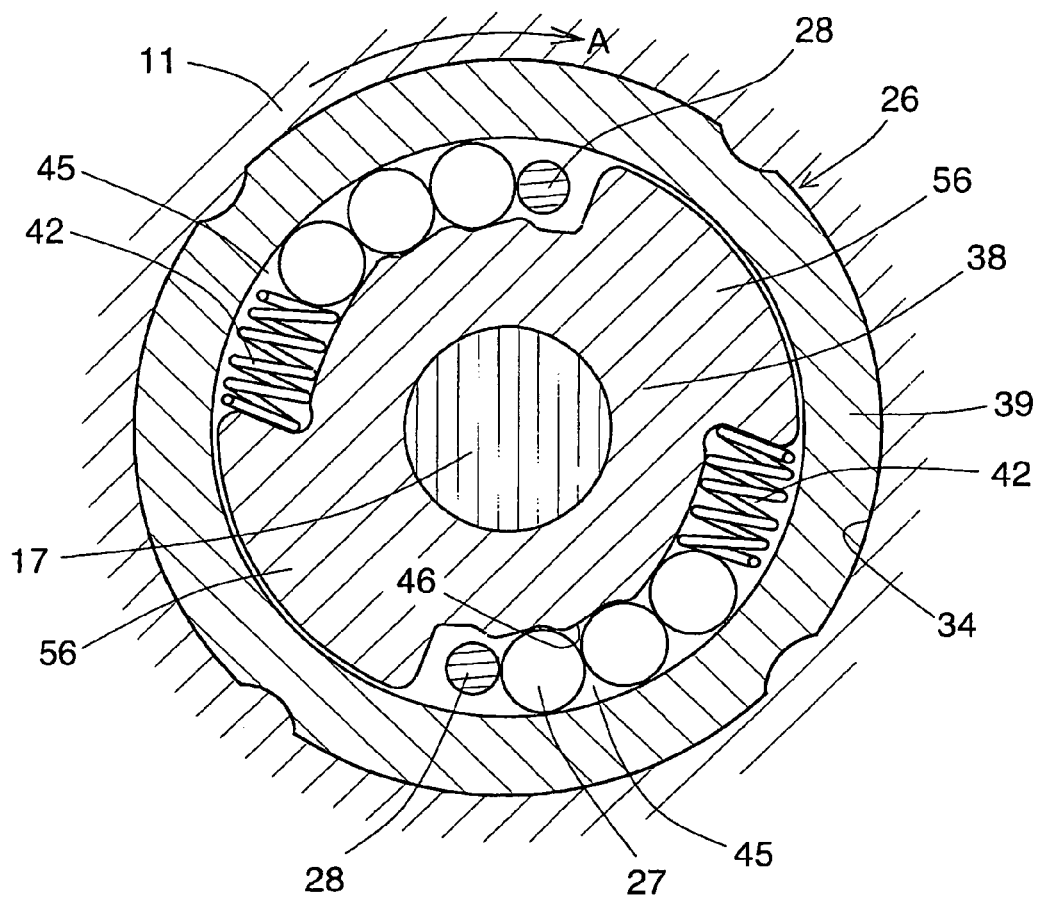
FIG. 40 is a sectional view taken along line $X_{19}$-$X_{19}$ of FIG. 39.
Figure 41:
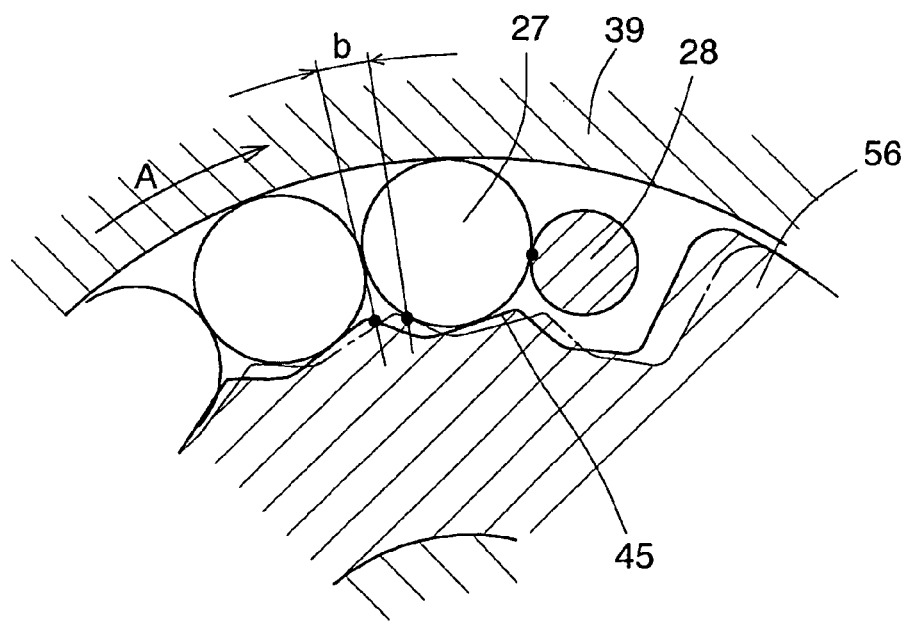
FIG. 41 is a sectional view of the roller clutch of Embodiment 5.
Figure 42:
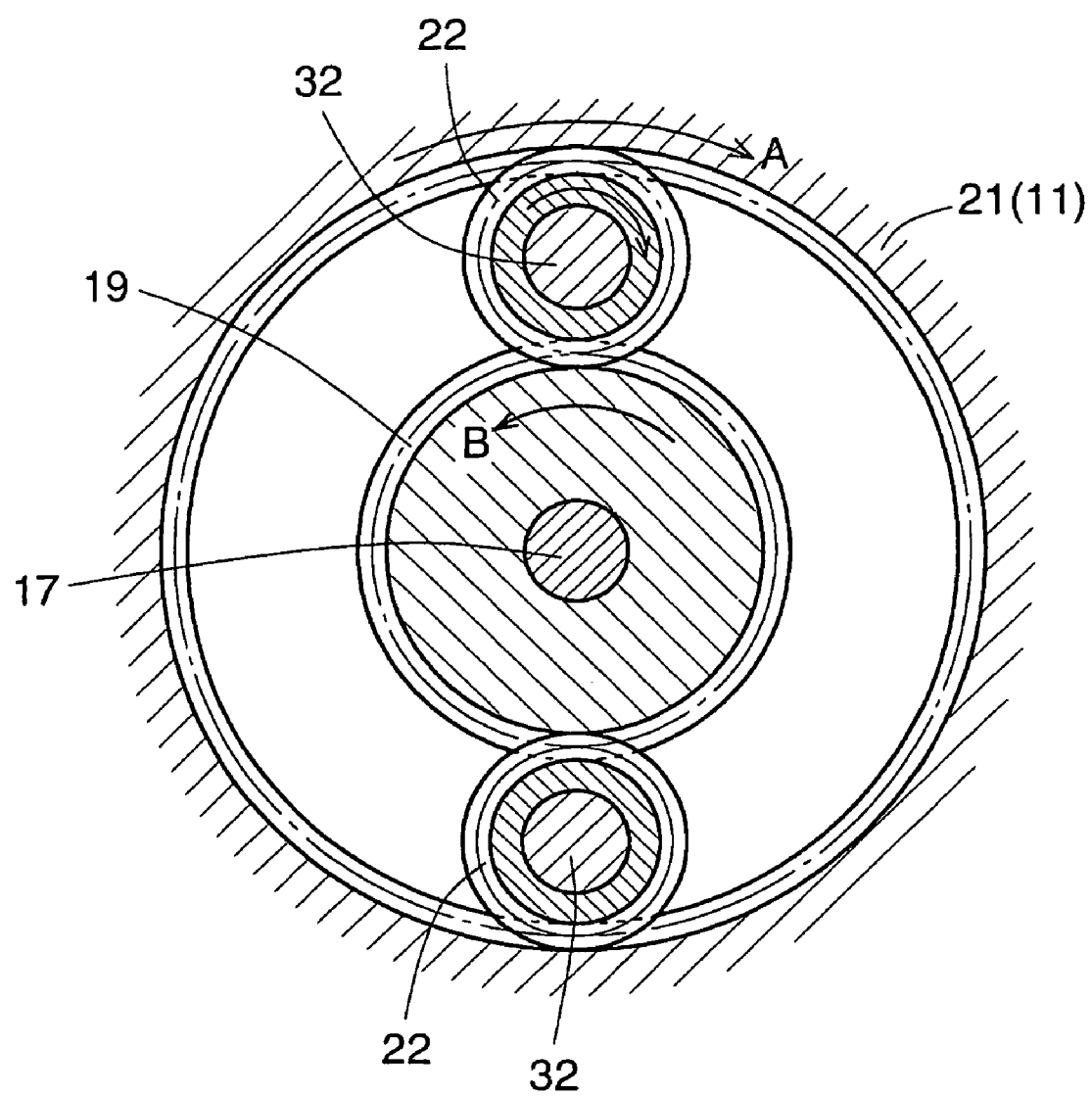
FIG. 42 is a sectional view taken along line $X_{20}$-$X_{20}$ of FIG. 39.

In this state, when the actuator 24 is turned on and the control gear 25 becomes locked as shown in FIG. 39, the lock pins integrated with the control gear 25 is locked. Since the roller clutch 26 is continuously rotating in the normal rotation direction A, the rollers 27 are relatively pushed back by the lock release pins 28 until the control clearance b becomes zero, and the roller clutch 26 is stopped (see FIGS. 40 and 41). When the roller clutch 26 stops, the carrier 23 integrated with the inner race 38 also stops.

When the carrier 23 stops, revolution of the planetary gears 22 supported by the carrier 23 is stopped, and the planetary gears 22 only rotate. Since the input gear 11 and the internal gear 21 integrated with the input gear 11 are continuously rotating in the normal rotation direction A, and the planetary gears 22 only rotate, the sun gear 19 and the output gear 12 integrated with the sun gear 11 are rotated in the reverse rotation direction B (see the white arrow on the output gear in FIG. 39).

In Embodiment 5, when the actuator 24 is switched on, since the control clearance exists even if the clearance a is zero, a time difference can be provided from the unlock of the roller clutch 26 to stop. Even if the clearance is not zero, since the control clearance b is set larger than a (b>a), this time difference is reliably provided.

Embodiment 6

Embodiment 6 shown in FIGS. 43 to 51 is basically the as the previous embodiments, especially Embodiment 5, in that it comprises an input gear 11, an output gear 12 and a switch mechanism 13 that selectively switches the direction of the drive torque applied to the input gear 11 and transmitted to the output gear 12, and that the switch mechanism 13 comprises a planetary gear mechanism 14, a control mechanism 15 and a clutch mechanism 16.

However, in Embodiment 6, both the planetary gear mechanism 14 and the clutch mechanism 16 are mounted integrally in the radially inner side of the output gear 12.

That is, the output gear 12 is relatively long in the axial direction, and an internal gear 21 of the planetary gear mechanism 14 is provided integrally in the range slightly more than half of its inner-diameter surface. In the remaining portion of the inner-diameter surface of the input gear 11, which has a smaller diameter than the internal gear 21 because of a shoulder 63', a carrier 23 described below is rotatably fitted.

The planetary gear mechanism 14 comprises a rotation transmission shaft 18 rotatably fitted on a fixed shaft 17, a sun gear 19 integrated with the outer-diameter surface of the rotation transmission shaft 18 and facing the internal gear 21 in the diametrical direction, planetary gears 22 provided between the sun gear 19 and the internal gear 21, and the carrier 23 fitted on to the inner-diameter surface of the output gear 12. Rotary shafts 32 axially protrude from the carrier 23, to which the planetary gears 22 are fitted. In the radially inner side of the carrier 23, a clutch-mounting portion 34 is provided.

A lid 59' is fitted to the open end of the internal gear 21 at its portion where the planetary gears 22 are provided to prevent the planetary gears 22 from coming off. A portion of the sun gear 19 protrudes from the inner-diameter surface of the lid 59', and this protruding portion serves as the input gear 11.

The clutch mechanism 16 is a unidirectional roller clutch 26 comprising an inner race 38, an outer race 39, and rollers 27 and bias springs 42 provided between the inner and outer races 38 and 39. The inner race 38 is integrated with the rotation transmission shaft 18 in the axial direction. The roller clutch 26 including the inner race 38 is mounted in the clutch-mounting portion 34 of the carrier 23 through anti-rotation arrangements.

Figure 45:
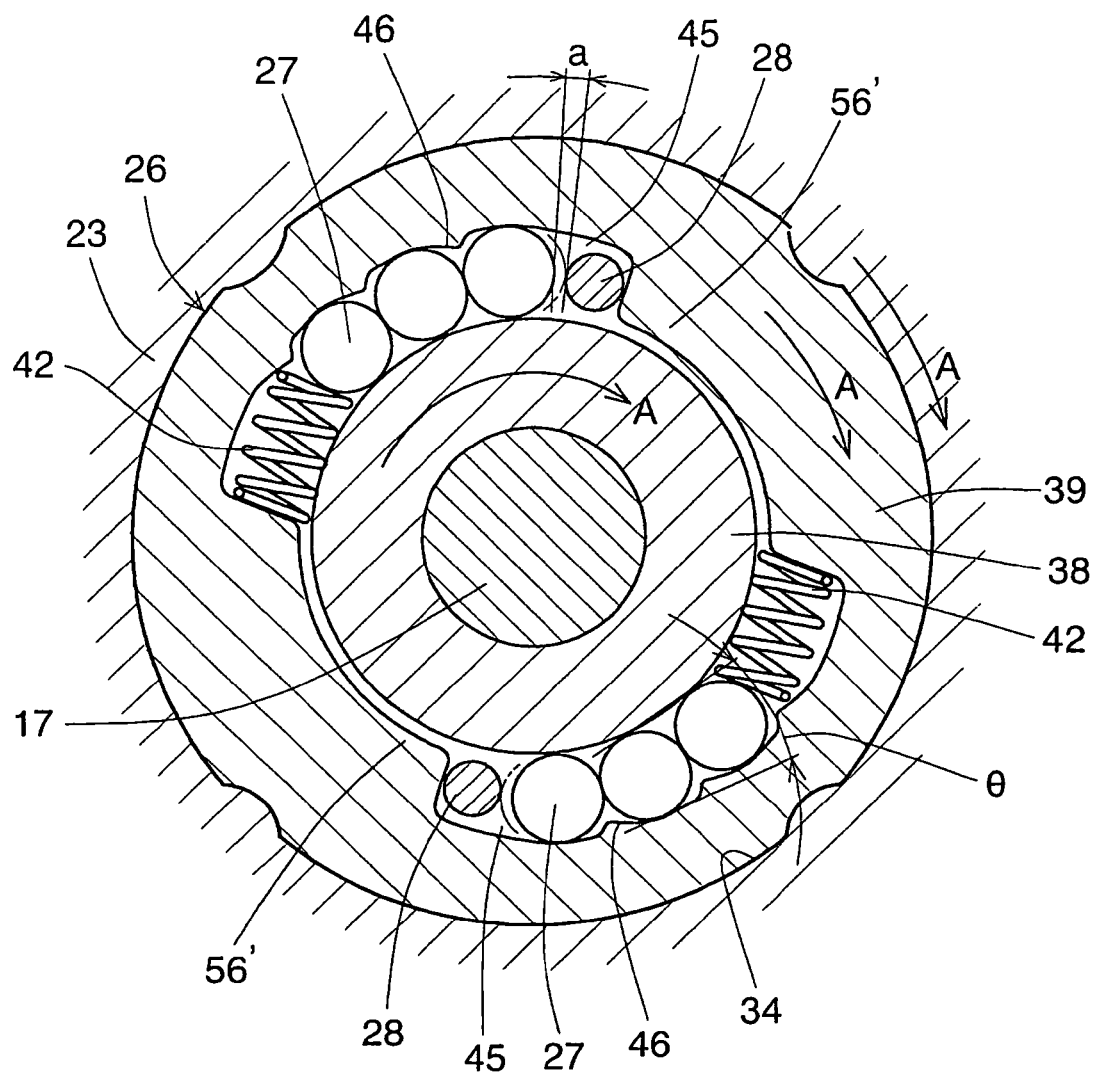
FIG. 45 is a sectional view taken along line $X_{21}$-$X_{21}$ of FIG. 43.

On the inner-diameter surface of the outer race 39, two roller receiving spaces 45 are defined by pillar members 56' provided on the positions axially symmetrical with each other (see FIG. 45). In each roller receiving space 45, three cam surfaces 46 inclined in one direction are formed on the inner-diameter surface of the outer race 39. One of the rollers 27 is provided between each cam surface 46 and the outer-diameter surface of the inner race 38. The wedge angle on the contact point of each roller 27 is shown as θ. The bias springs 42 biasing the respective rollers 27 in the direction in which the wedge angle θ narrows (the normal rotation direction A) are each provided between the roller 27 on the end of the direction in which the wedge angle θ expands and the pillar portion 56' circumferentially facing that roller 27.

In each roller receiving space 45 of the roller clutch 26, one of the lock release pins 28 is inserted in the axial direction between the roller 27 on the end of the direction in which the wedge angle θ narrows and the pillar portion 56' circumferentially facing that roller 27. The lock release pins 28 protrude in the axial direction from the inner end face of the control gear 25.

Figure 46:
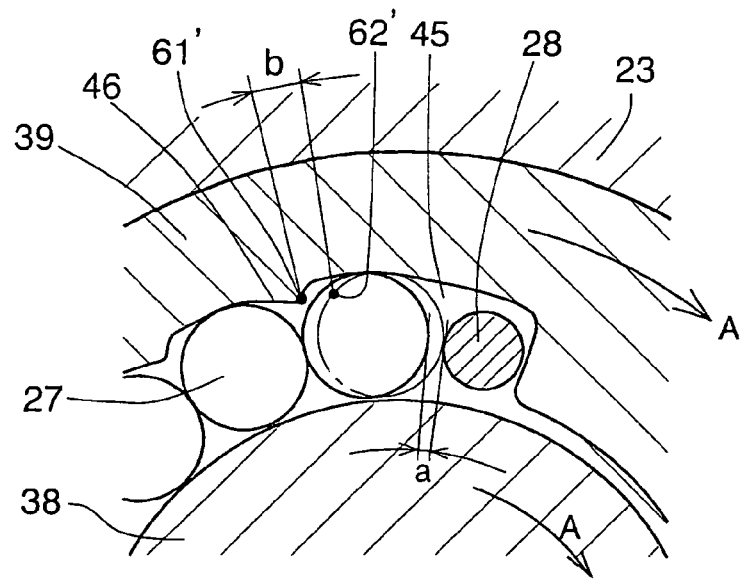
FIG. 46 is a sectional view of the roller clutch of Embodiment 6.
Figure 47:
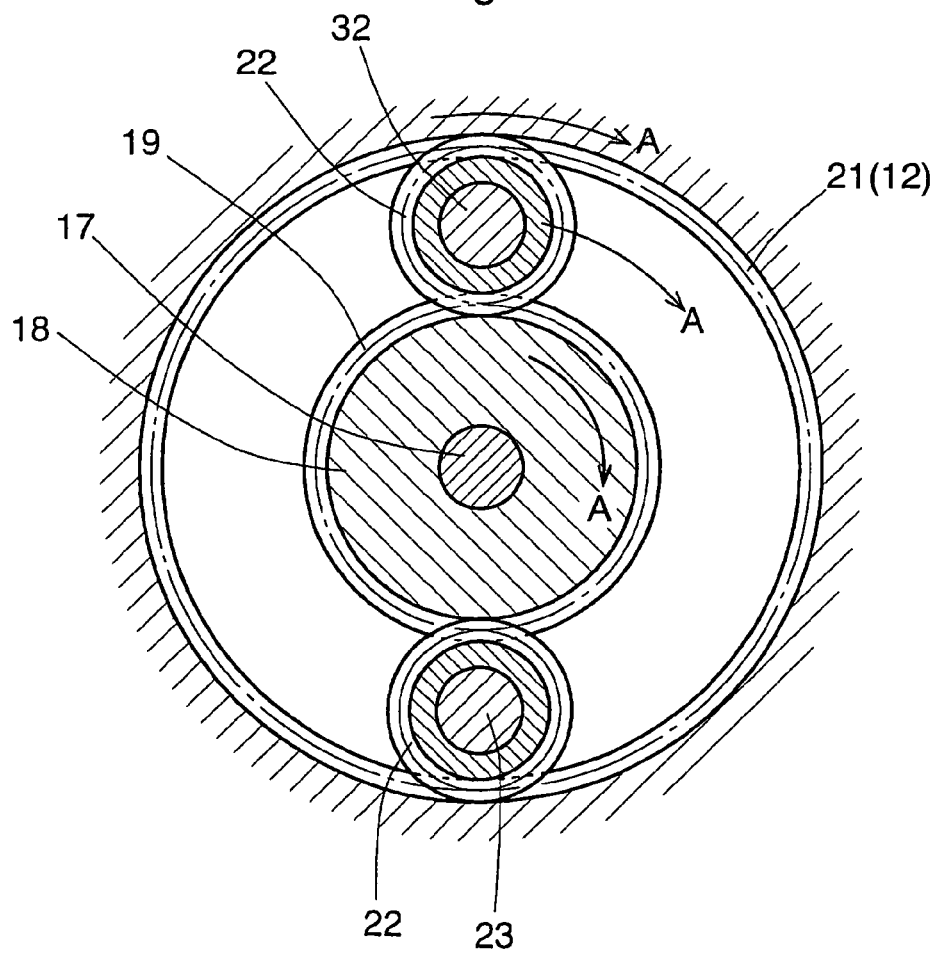
FIG. 47 is a sectional view taken along line $X_{22}$-$X_{22}$ of FIG. 43.

In a portion where the lock release pin 28 is inserted in the roller clutch 26, a predetermined clearance is provided for each locked roller 27 in the circumferential direction as shown in FIG. 46. Also, in a locked status, a predetermined control clearance b (b>a) is provided between a shoulder portion 61' of each cam surface 46 on the side to which the wedge angle θ expands and a portion 62' of the corresponding roller 27.

The device for switching between normal and reverse drive force of Embodiment 6 is as described above, and its operation is now described.

Figure 43:
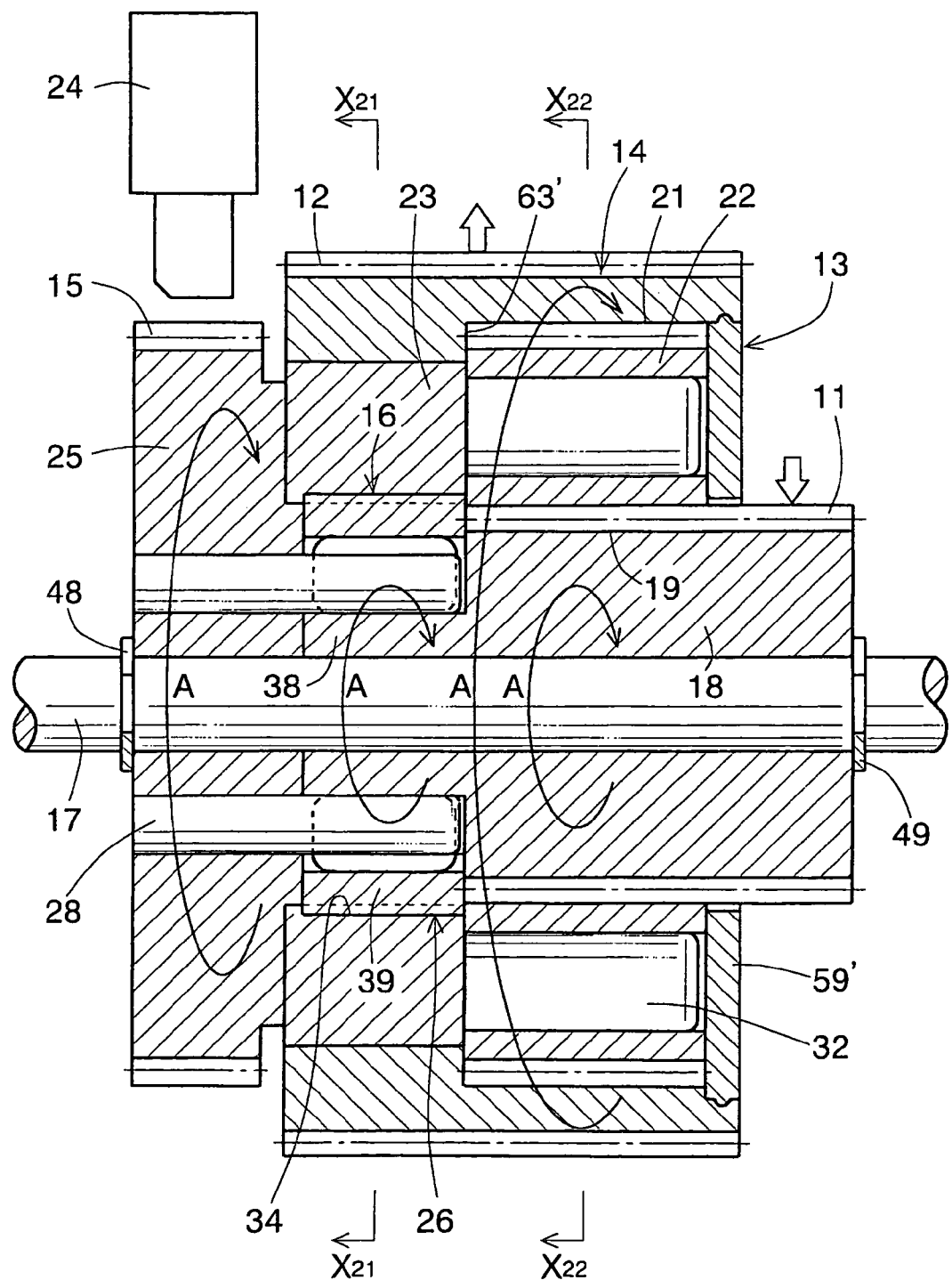
FIG. 43 is a sectional view of Embodiment 6 when the actuator is off.
Figure 44:
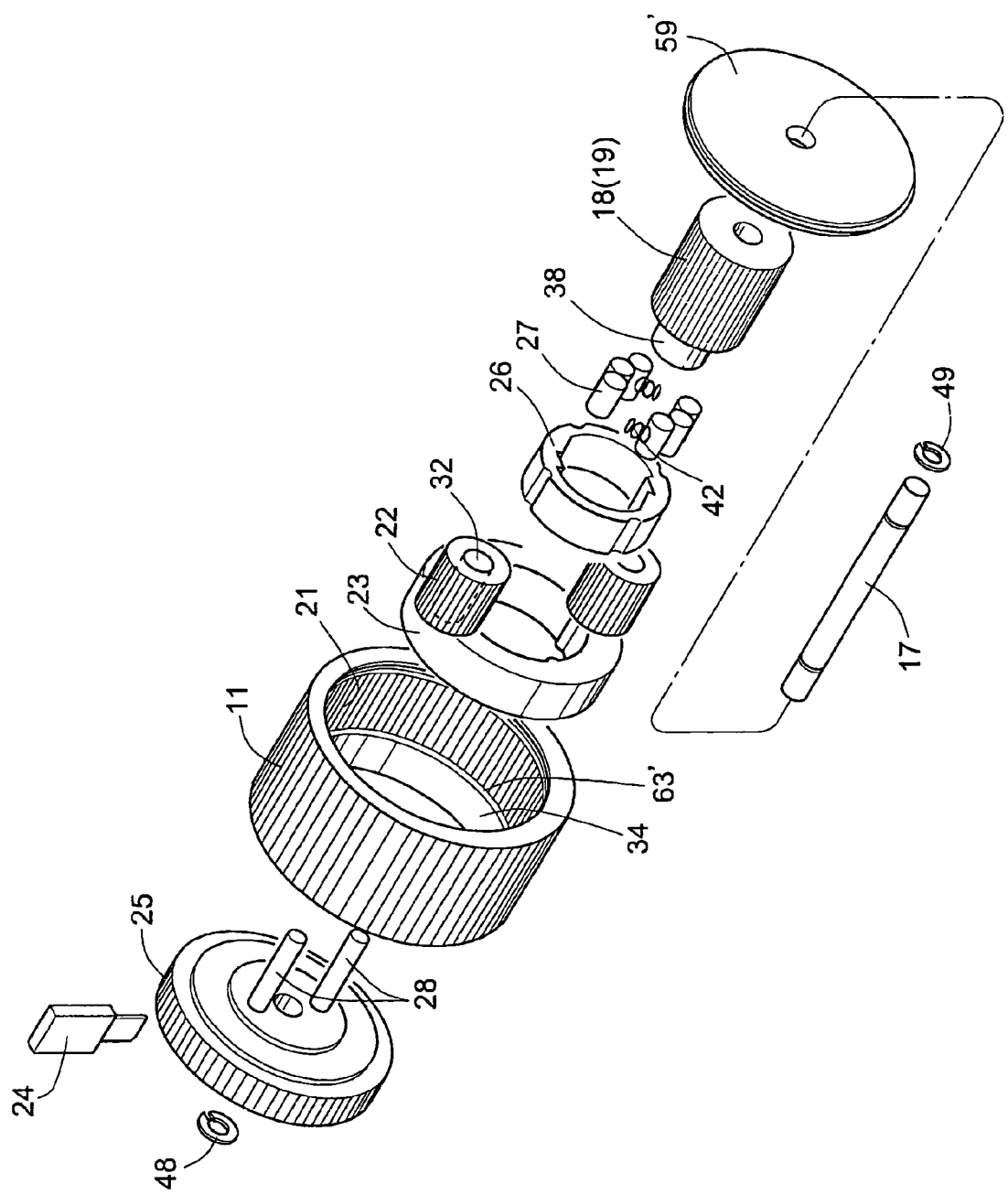
FIG. 44 is an exploded perspective view of Embodiment 6.

As shown in FIG. 43, with the actuator 24 off and the control gear 25 unlocked, when a drive torque in the normal rotation direction A is applied to the input gear 11 (see the white arrow on the input gear 11 in FIG. 43), the inner race 38 integrated with the input gear 11 rotates in the normal rotation direction A and the roller clutch 26 is locked.

At this time, the torque is also applied to the planetary gears 22 through the sun gear 19 which is integrated with the input gear 11. However, since a load is being applied to the planetary gears 22 through the output gear 12, the planetary gears 22 neither rotate nor revolve. Therefore the carrier 23 and the outer race 39 integrated with the carrier 23 are at a stop.

When the roller clutch 26 is locked, the carrier 23 integrated with the outer race 39 is rotated in the normal rotation direction A. The planetary gears 22 only revolve in the normal rotation direction A and rotate the output gear 12 integrated with the internal gear 21 in the same direction (see FIG. 45). As a result, a drive torque in the same normal rotation direction A as the input drive torque and reduced through the planetary gear mechanism 14 is produced from the output gear 12 (see the white arrow on the output gear 12 in FIG. 43).

At this time, since the control gear 25 is unlocked, the lock release pins 28 integrated with the control gear 25 are pushed by the rollers 27 in the roller clutch 26, which are rotating in the normal rotation direction A, and rotate in the same direction (see the dot-dashed line in FIG. 45). Therefore, while the clearance a is null in this state, the control clearance b exists between the portion 62 of each roller 27 and the shoulder portion 61 of the cam surface 46 since the roller clutch 26 is locked (see FIG. 37).

In this state, when the actuator 24 is switched on and the control gear 25 becomes locked as shown in FIG. 48, the lock pins integrated with the control gear 25 stop. Since the roller clutch 26 is continuously rotating in the normal rotation direction A, the rollers 27 is relatively pushed back by the lock release pins 28 until the control clearance b becomes zero, and the roller clutch 26 is stopped (see FIGS. 45 and 46). As the roller clutch 26 stops, the carrier 23 integrated with the outer race 39 also stops.

As the carrier 23 stops, revolution of the planetary gears 22 supported by the carrier 23 is stopped, and the planetary gears 22 only rotate. In this state, the input gear 11 and the sun gear 19 integrated with the input gear 11 are continuously rotating in the normal rotation direction A. As the planetary gears 22 only rotate, the internal gear 21 and the output gear 12 integrated with the internal gear 21 are rotated in the reverse rotation direction B (see the white arrow on the output gear in FIG. 48).

In Embodiment 6, when the actuator 24 is turned on, since the control clearance b exists even if the clearance a is zero, 1, a time difference can be provided from the unlock of the roller clutch 26 to its stop. Since the control clearance b is set larger than a (b>a), this time difference is reliably provided even if the clearance a is not zero.

Embodiment 7

Figure 52:
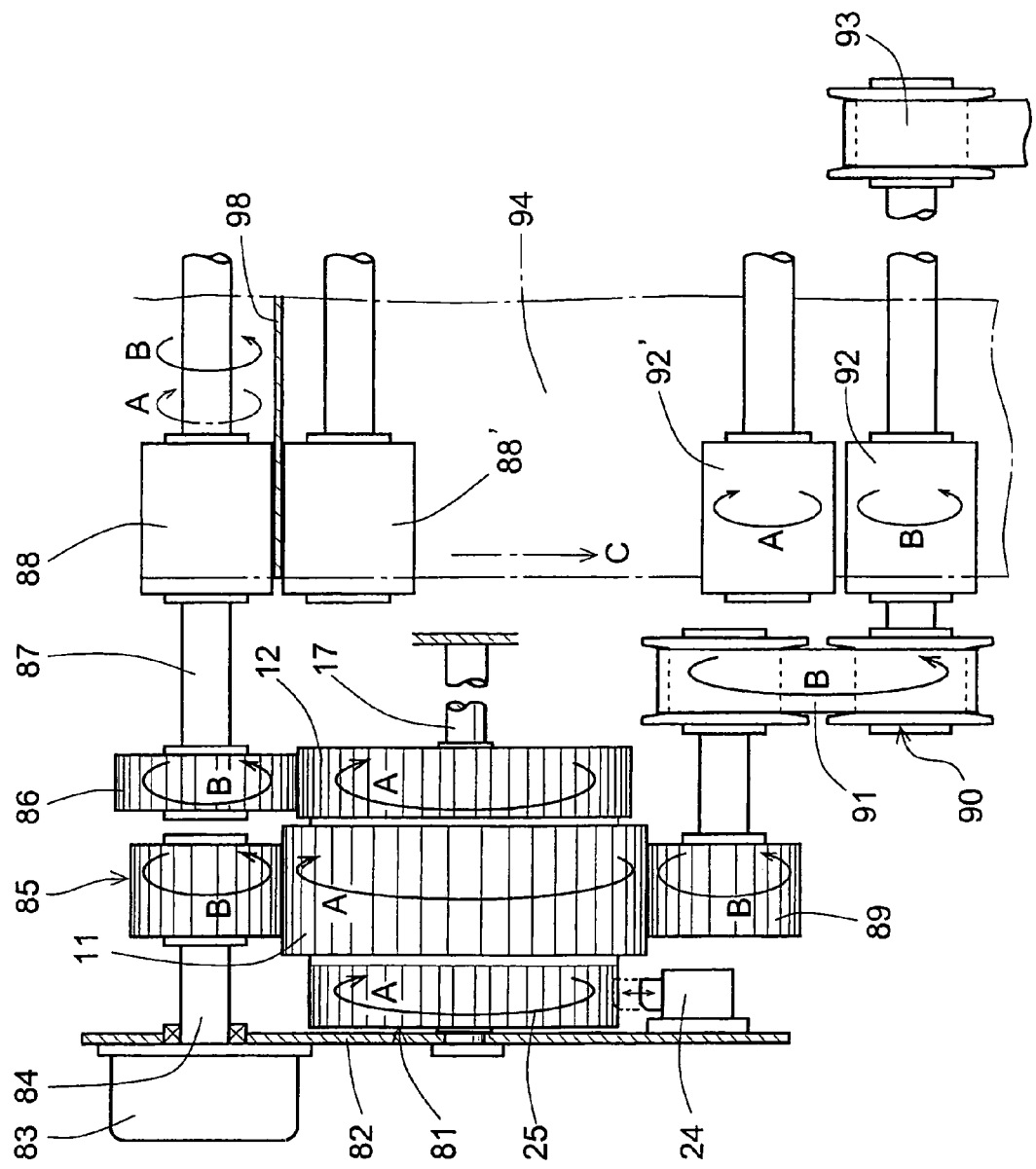
FIG. 52 is a plan view of Embodiment 7.
Figure 53:
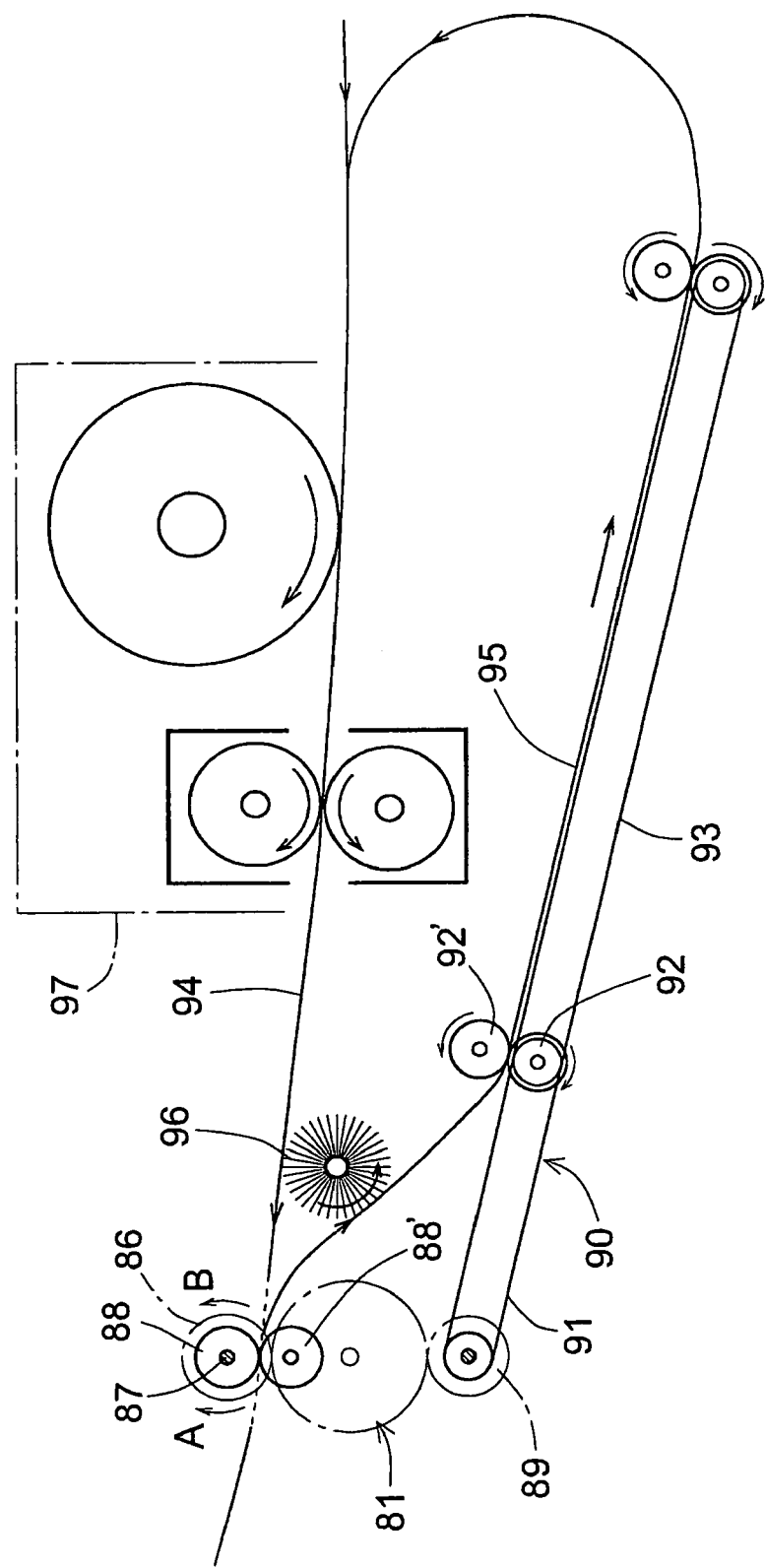
FIG. 53 is a schematic view of the printing mechanism of Embodiment 7 in which the device of Embodiment 3 is used.
Figure 54:
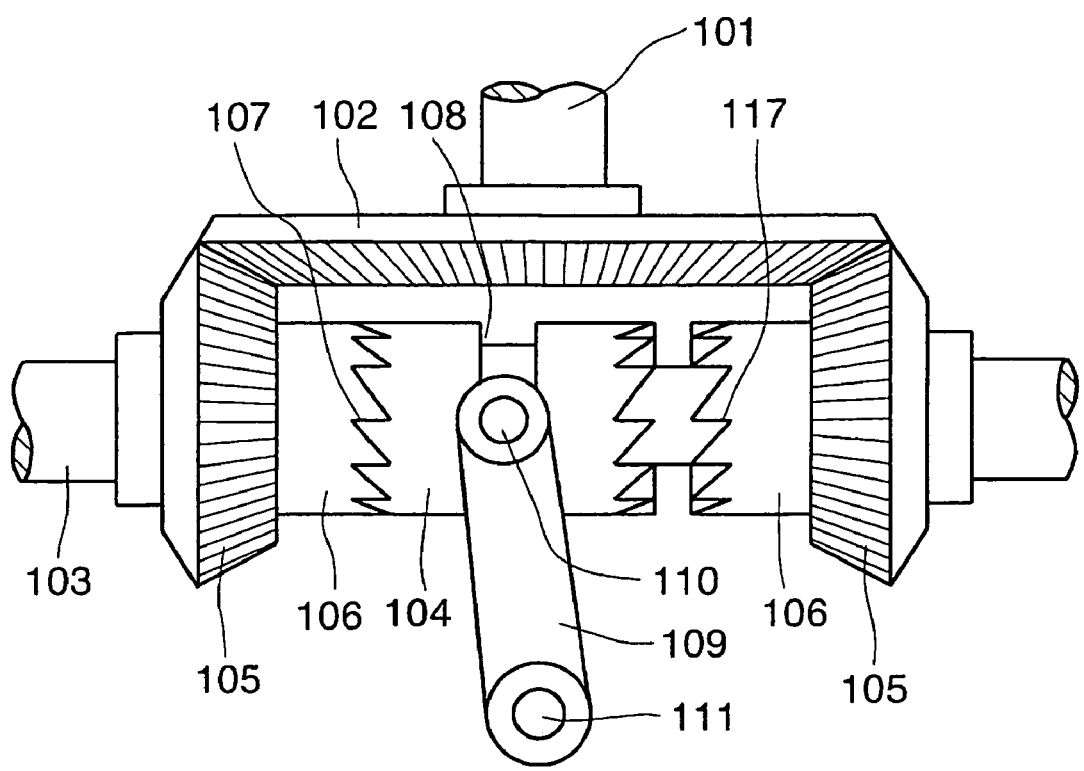
FIG. 54 is a view of a prior art example.

Embodiment 7 shown in FIGS. 52 and 53 relates to a feed roller drive device suitable for a duplex printer such as disclosed in the Patent Document 1, and it is an example of utilizing a device for switching between normal and reverse drive force 81 shown in each embodiment (for convenience, Embodiment 3 (FIGS. 17 to 25) is shown as a representative).

The fixed shaft 17 is fixed on a frame 82 and, on the inside of the frame 82, the control gear 25 is mounted to the fixed shaft 17.

On the outside of the frame 82, a drive motor 83 is fixed and a drive torque is applied through a motor shaft 84 of the drive motor 83 and a motor shaft gear 85 to the input gear 11. Switch back type feed rollers 88 and 88' are mounted to an output shaft 87 of an auxiliary output gear 86 meshing with the output gear 12. Further, by an auxiliary output gear 89 meshing with the output gear 11, a back conveyor 90 is driven. In the back conveyor 90, conveyor rollers 92 and 92' and a conveyor belt 93 are driven through a link belt 91.

As shown in FIG. 53, the path 94 of the paper extends forward through the feed rollers 88, 88'. Also, below the feed rollers 88, 88', a back path 95 turning backward diverges from the path 94, and a vane 96 is provided at the branch point. The vane 96 directs the rear end of the paper, held between the feed rollers 88, 88' and stopped, to the back path 95. The back path 95, driven by the conveyor belt 93, U-turns and runs through a printing mechanism 97, and then returns to the path 94.

The feed roller 88 is driven by the drive motor 83 through the device for switching between normal and reverse drive force 81. Suppose that the drive motor 83 is the type that is normally rotated in the reverse rotation direction B. When conveying paper 98 printed on its surface, the actuator 24 of the device for switching between normal and reverse drive force 81 is turned off and the paper is backed (see the solid line in FIG. 52), with the control gear 25 being unlocked. Thus, in the manner as described with respect to Embodiment 1, the input gear 11 and the output gear 12 rotate in the normal rotation direction A. The output torque rotates the feed roller 88 in the reverse rotation direction B through the auxiliary output gear 86, and feeds the paper 98 to the path 94.

When the rear end of the paper 98 is detected at portions where there are the feed rollers 88, 88', the actuator 24 is triggered and the control gear 25 is locked. Thus, the rotation direction is reversed by the switch mechanism 13 and the rotation of the output gear 12 is switched to the reverse rotation direction B. Then, the feed rollers 88, 88' are rotated in the normal rotation direction A, reverse to the state mentioned before. As a result, the direction of the rear end of the paper 98 is diverted to the back path 95, and then switched back to the path 94 (see the arrow C in FIGS. 52 and 53). Then backside printing is performed in the printing mechanism 97 and the printed paper is ejected from the path 94 through the feed roller 88, 88'.

As described above, with the device for switching between normal and reverse drive force 81, the output rotation direction can be switched as required, only by activating and inactivating the actuator 24 while using a drive motor 83 with unidirectional rotation.

What is claimed is:

1. A device for switching between normal and reverse drive force, comprising an input gear (11), an output gear (12) and a switch mechanism (13) that selectively switches drive torque applied to said input gear (11) and transmitted to said output gear (12),
   wherein said switch mechanism (13) comprises a planetary gear mechanism (14), a control mechanism (15) and a clutch mechanism (16),
   wherein said planetary gear mechanism (14) comprises a rotation transmission shaft (18) supported by a fixed shaft (17), a sun gear (19) coaxially integrated with said rotation transmission shaft (18), an internal gear (21) coaxially provided around said sun gear (19) and integrated with said output gear (12), planetary gears (22) provided between said sun gear (19) and said internal gear (21), and a carrier (23) for said planetary gears (22) provided coaxially with said rotation transmission shaft (18),
   wherein said control mechanism (15) comprises a control gear (25) provided rotatably and coaxially on said fixed shaft (17) and capable of being selectively locked and unlocked by an external actuator (24), said control gear (25) being integrated with said carrier (23),
   wherein said clutch mechanism (16) comprises a unidirectional roller clutch (26) provided between radially opposed surfaces of said rotation transmission shaft (18) and a clutch-mounting portion (34) provided in said carrier (23), wherein lock release pins (28) formed on said control gear (25) are provided at ends to which wedge angle (θ) narrows in said roller clutch (26), leaving predetermined clearances to adjacent rollers (27), and
   wherein said input gear (11) is integrated with said rotation transmission shaft (18).

2. A device for switching between normal and reverse drive force, according to claim 1, wherein an actuator (24) is detachably mounted to a radially outer side of said control gear (25).

3. A device for switching between normal and reverse drive force, according to claim 1, wherein a plurality of cam surfaces (46) forming a roller receiving space are formed consecutively in a rotation direction, said rollers (27) being received on the respective cam surface (46) while being in contact with each other.

4. A feeder switching device comprising a drive motor (83) and a device, for switching between normal and reverse drive force, that selectively produces output that is in the same rotation direction as the input from the motor (83), or output that is in the opposite rotation direction to that of the input from the motor (83), wherein said device for switching between normal and reverse drive force is the device for switching between normal and reverse drive force according to claim 1.

5. A feed roller drive device for a duplex printing mechanism in a machine, wherein the device for switching between normal and reverse drive force according to claim 1 is used.

6. A device for switching between normal and reverse drive force, comprising an input gear (11), an output gear (12) and a switch mechanism (13) that selectively switches drive torque applied to said input gear (11) and transmitted to said output gear (12),
   wherein said switch mechanism (13) comprises a planetary gear mechanism (14), a control mechanism (15) and a clutch mechanism (16),
   wherein said planetary gear mechanism (14) comprises a rotation transmission shaft (18) supported by a fixed shaft (17), a sun gear (19) coaxially integrated with said rotation transmission shaft (18), an internal gear (21) coaxially provided around said sun gear (19) and integrated with said output gear (12), planetary gears (22) provided between said sun gear (19) and said internal gear (21), and a carrier (23) for said planetary gears (22) provided coaxially with said rotation transmission shaft (18),
   wherein said control mechanism (15) comprises a control gear (25) provided rotatably and coaxially on said fixed shaft (17) and capable of being selectively locked and unlocked by an external actuator (24), said control gear (25) being integrated with said carrier (23),
   wherein said clutch mechanism (16) comprises a unidirectional roller clutch (26) provided between radially opposed surfaces of a boss (23c) of said carrier (23) and a clutch-mounting portion (34) provided in said internal gear (21), wherein lock release pins (28) formed on said control gear (25) are provided at ends to which wedge angle (θ) narrows in said roller clutch (26), leaving predetermined clearances to adjacent rollers (27), and wherein said output gear (12) is integrated with said rotation transmission shaft (18).

7. A device for switching between normal and reverse drive force, according to claim 6, wherein, on an inner-diameter surface of an outer race (39) of said roller clutch (26), a pair of roller receiving spaces (45a) with wedge angles (θ) having a first directional property are formed in two circumferentially quarter segments that are symmetrical about an axis, another pair of roller receiving spaces (45b) with wedge angles (θ) having a second directional property opposite to said first directional property are formed in other two circumferentially quarter segments that are symmetrical about the axis, rollers (27) and a spring 42) are received in each said roller receiving space (45a), (45b), and said release pins (28) are provided in spaces between adjacent roller receiving spaces (45a), (45b) to which said wedge angle (θ) narrows.

8. A device for switching between normal and reverse drive force, according to claim 6, wherein an actuator (24) is detachably mounted to a radially outer side of said control gear (25).

9. A device for switching between normal and reverse drive force, according to claim 6, wherein a plurality of cam surfaces (46) forming a roller receiving space are formed consecutively in a rotation direction, said rollers (27) being received on the respective cam surface (46) while being in contact with each other.

10. A feeder switching device comprising a drive motor (83) and a device for switching between normal and reverse drive force that selectively produces output that is in the same rotation direction as the input from the motor (83), or output that is in the opposite rotation direction to that of the input from the motor (83), wherein said device for switching between normal and reverse drive force is the device for switching between normal and reverse drive force according to claim 6.

11. A feed roller drive device for a duplex printing mechanism in a machine, wherein the device for switching between normal and reverse drive force according to claim 6 is used.

12. A device for switching between normal and reverse drive force according to claim 1, wherein, on an inner-diameter surface of an outer race (39) of said roller clutch (26), a pair of roller receiving spaces (45a) with wedge angles (θ) having a first directional property are formed in two circumferentially quarter segments that are symmetrical about an axis, another pair of roller receiving spaces (45b) with wedge angles (θ) having a second directional property opposite to said first directional property are formed in other two circumferentially quarter segments that are symmetrical about the axis, rollers (27) and a spring (42) are received in each said roller receiving space (45a), (45b), and said release pins (28) are provided in spaces between adjacent roller receiving spaces (45a), (45b) to which said wedge angle (θ) narrows.

13. A device for switching between normal and reverse drive force, comprising an input gear (11), an output gear (12) and a switch mechanism (13) that selectively switches drive torque applied to said input gear (11) and transmitted to said output gear (12), wherein said switch mechanism (13) comprises a planetary gear mechanism (14), a control mechanism (15) and a clutch mechanism (16), wherein said planetary gear mechanism (14) comprises a rotation transmission shaft (18) supported by a fixed shaft (17), a sun gear (19) rotatably fitted on said rotation transmission shaft (18), an internal gear (21) coaxially provided around said sun gear (19) and integrated with said output gear (12), planetary gears (22) provided between said sun gear (19) and said internal gear (21), and a carrier (23) for said planetary gears (22) provided coaxially with said rotation transmission shaft (18), wherein said control mechanism (15) comprises a control gear (25) provided rotatably and coaxially on said fixed shaft (17) and capable of being selectively locked and unlocked by an external actuator (24), said control gear (25) being integrated with said carrier (23), wherein said clutch mechanism (16) comprises a unidirectional roller clutch (26) provided between radially opposed surfaces of said fixed shaft (17) and a clutch-mounting portion (34) provided in said output gear (12), wherein lock release pins (28) formed on said sun gear (19) are provided at ends to which wedge angle (θ) narrows in said roller clutch (26), leaving predetermined clearances (a) to adjacent rollers (27), said lock release pins (28) being inserted in engaging grooves (54) leaving predetermined control clearances (b) (b>a) in a rotation direction, and wherein said output gear (12) is rotatably fitted on said rotation transmission shaft (18).

14. A device for switching between normal and reverse drive force, according to claim 13, wherein inner-diameter surfaces of axial ends of said input gear (11) are supported by guide faces (57, 58) formed on said control gear (25) and said output gear (12), respectively such that said input gear (11) is rotatable relative to said guide faces (57, 58).

15. A device for switching between normal and reverse drive force, according to claim 13, wherein an actuator (24) is detachably mounted to a radially outer side of said control gear (25).

16. A device for switching between normal and reverse drive force, according to claim 13, wherein a plurality of cam surfaces (46) forming a roller receiving space are formed consecutively in the rotation direction, said rollers (27) being received on the respective cam surface (46) while being in contact with each other.

17. A feeder switching device comprising a drive motor (83) and a device for switching between normal and reverse drive force that selectively produces output that is in the same rotation direction as the input from the motor (83), or output that is in the opposite rotation direction to that of the input from the motor (83), wherein said device for switching between normal and reverse drive force is the device for switching between normal and reverse drive force according to claim 13.

18. A feed roller drive device for a duplex printing mechanism in a machine, wherein the device for switching between normal and reverse drive force according to claim 13 is used.

19. A device for switching between normal and reverse drive force, comprising an input gear (11), an output gear (12) and a switch mechanism (13) that selectively switches drive torque applied to said input gear (11) and transmitted to said output gear (12), wherein said switch mechanism (13) comprises a planetary gear mechanism (14), a control mechanism (15) and a clutch mechanism (16), that said planetary gear mechanism (14) comprises a rotation transmission shaft (18) supported by a fixed shaft (17), a sun gear (19) coaxially integrated with said rotation transmission shaft (18), an internal gear (21) coaxially provided around said sun gear (19) and integrated with said input gear (11), planetary gears (22) provided between said sun gear (19) and said internal gear (21), and a carrier (23) for said planetary gears (22) provided coaxially with said rotation transmission shaft (18), wherein said control mechanism (15) comprises a control gear (25) provided rotatably and coaxially on said fixed shaft (17) and capable of being selectively locked and unlocked by an external actuator (24), said control gear (25) being integrated with said carrier (23), wherein said clutch mechanism (16) comprises a unidirectional roller clutch (26) provided between radially opposed surfaces of said fixed shaft (17) and a clutch-mounting portion (34) provided in said control gear (25), wherein lock release pins (28) formed on said sun gear (19) are provided at ends to which wedge angle (θ) narrows in said roller clutch (26), leaving predetermined clearances (a) to adjacent rollers (27), said lock release pins (28) being inserted in engaging holes (54') leaving predetermined control clearances (b) (b>a) in a rotation direction, and wherein said output gear (12) is rotatably fitted on said fixed shaft (17).

20. A device for switching between normal and reverse drive force, according to claim 19, wherein an actuator (24) is detachably mounted to a radially outer side of said control gear (25).

21. A device for switching between normal and reverse drive force, according to claim 19, wherein a plurality of cam surfaces (46) forming a roller receiving space are formed consecutively in the rotation direction, said rollers (27) being received on the respective cam surface (46) while being contact with each other.

22. A feeder switching device comprising a drive motor (83) and a device for switching between normal and reverse drive force that selectively produces output that is in the same rotation direction as the input from the motor (83), or output that is in the opposite rotation direction to that of the input from the motor (83), wherein said device for switching between normal and reverse drive force is the device for switching between normal and reverse drive force according to claim 19.

23. A feed roller drive device for a duplex printing mechanism in a machine, wherein the device for switching between normal and reverse drive force according to claim 19 is used.

24. A device for switching between normal and reverse drive force, comprising an input gear (11), an output gear (12) and a switch mechanism (13) that selectively switches drive torque applied to said input gear (11) and transmitted to said output gear (12), wherein said switch mechanism (13) comprises a planetary gear mechanism (14), a control mechanism (15) and a clutch mechanism (16), that said planetary gear mechanism (14) comprises a rotation transmission shaft (18) rotatably fitted on a fixed shaft (17), a sun gear (19) coaxially integrated with said rotation transmission shaft (18), an internal gear (21) coaxially provided around said sun gear (19) and integrated with said input gear (11), planetary gears (22) provided between said sun gear (19) and said internal gear (21), and a carrier (23) for said planetary gears (22) provided coaxially with said rotation transmission shaft (18), wherein said control mechanism (15) comprises a control gear (25) provided rotatably and coaxially on said fixed shaft (17) and capable of being selectively locked and unlocked by an external actuator (24), wherein said clutch mechanism (16) comprises a unidirectional roller clutch (26) provided between radially opposed surfaces of said fixed shaft (17) and a clutch-mounting portion (34) provided in said input gear (11), wherein lock release pins (28) formed on said control gear (25) are provided at ends to which wedge angle (θ) narrows in said roller clutch (26), leaving predetermined clearances (a) to adjacent rollers (27), and wherein with said roller clutch (26) locked, a shoulder portion (61) of each cam surface (46) on its expanded side faces the corresponding roller (26) with a control clearance (b) (b>a) left therebetween, and wherein an inner race (38) of said roller clutch (26) is integrated with said carrier (23).

25. A device for switching between normal and reverse drive force, according to claim 24, wherein an actuator (24) is detachably mounted to a radially outer side of said control gear (25).

26. A device for switching between normal and reverse drive force, according to claim 24, wherein a plurality of cam surfaces (46) forming a roller receiving space are formed consecutively in a rotation direction, said rollers (27) being received on the respective cam surface (46) while being in contact with each other.

27. A feeder switching device comprising a drive motor (83) and a device for switching between normal and reverse drive force that selectively produces output that is in the same rotation direction as the input from the motor (83), or output that is in the opposite rotation direction to that of the input from the motor (83), wherein said device for switching between normal and reverse drive force is the device for switching between normal and reverse drive force according to claim 24.

28. A feed roller drive device for a duplex printing mechanism in a machine, wherein the device for switching between normal and reverse drive force according to claim 24 is used.

29. A device for switching between normal and reverse drive force, comprising an input gear (11), an output gear (12) and a switch mechanism (13) that selectively switches drive torque applied to said input gear (11) and transmitted to said output gear (12), wherein said switch mechanism (13) comprises a planetary gear mechanism (14), a control mechanism (15) and a clutch mechanism (16), wherein said planetary gear mechanism (14) comprises a rotation transmission shaft (18) rotatably fitted on a fixed shaft (17), a sun gear (19) coaxially integrated with said rotation transmission shaft (18), an internal gear (21) coaxially provided around said sun gear (19) and integrated with said output gear (12), planetary gears (22) provided between said sun gear (19) and said internal gear (21), and a carrier (23) for said planetary gears (22) provided coaxially with said rotation transmission shaft (18), wherein said control mechanism (15) comprises a control gear (25) provided rotatably and coaxially on said fixed shaft (17) and capable of being selectively locked and unlocked by an external actuator (24), wherein said clutch mechanism (16) comprises a unidirectional roller clutch (26) provided between radially opposed surfaces of said fixed shaft (17) and a clutch-mounting portion (34) provided in said carrier (23), wherein lock release pins (28) formed on said control gear (25) are provided at ends to which wedge angle (θ) narrows in said roller clutch (26), leaving predetermined clearances (a) to adjacent rollers (27), and wherein with said roller clutch (26) locked, a shoulder portion (61) of each cam surface (46) on its expanded side faces the corresponding roller (26) with a control clearance (b) (b>a) left therebetween, and wherein an inner race (38) of said roller clutch (26) is integrated with said rotation transmission shaft (18).

30. A device for switching between normal and reverse drive force, according to claim 29, wherein an actuator (24) is detachably mounted to a radially outer side of said control gear (25).

31. A device for switching between normal and reverse drive force, according to claim 29, wherein a plurality of cam surfaces (46) forming a roller receiving space are formed consecutively in a rotation direction, said rollers (27) being received on the respective cam surface (46) while being in contact with each other.

32. A feeder switching device comprising a drive motor (83) and a device for switching between normal and reverse drive force that selectively produces output that is in the same rotation direction as the input from the motor (83), or output that is in the opposite rotation direction to that of the input from the motor (83), wherein said device for switching between normal and reverse drive force is the device for switching between normal and reverse drive force according to claim 29.

33. A feed roller drive device for a duplex printing mechanism in a machine, wherein the device for switching between normal and reverse drive force according to claim 29 is used.

* * * * *